US011724631B1

(12) United States Patent
Arnall

(10) Patent No.: US 11,724,631 B1
(45) Date of Patent: Aug. 15, 2023

(54) FOLDABLE BRACKET ASSEMBLY FOR SUPPORTING A GRILL OR TABLE

(71) Applicant: Randall E. Arnall, Springfield, MO (US)

(72) Inventor: Randall E. Arnall, Springfield, MO (US)

( * ) Notice: Subject to any disclaimer, the term of this patent is extended or adjusted under 35 U.S.C. 154(b) by 0 days.

(21) Appl. No.: 17/510,832

(22) Filed: Oct. 26, 2021

Related U.S. Application Data

(63) Continuation-in-part of application No. 16/844,595, filed on Apr. 9, 2020, now abandoned.

(60) Provisional application No. 63/106,542, filed on Oct. 28, 2020, provisional application No. 62/988,529, filed on Mar. 12, 2020, provisional application No. 62/831,394, filed on Apr. 9, 2019.

(51) Int. Cl.
*B60N 3/00* (2006.01)
*A47J 36/34* (2006.01)

(52) U.S. Cl.
CPC .............. *B60N 3/007* (2013.01); *A47J 36/34* (2013.01)

(58) Field of Classification Search
CPC ..................................................... B60N 3/007
See application file for complete search history.

(56) References Cited

U.S. PATENT DOCUMENTS

| 746,504 | A | 12/1903 | Hardy et al. | 81/143 |
|---|---|---|---|---|
| 1,006,057 | A | 10/1911 | Brown | 81/143 |
| 1,061,876 | A | 5/1913 | Showalter | 81/139 |
| 1,155,278 | A | 9/1915 | Rush | 18/143 |
| 1,169,750 | A | 1/1916 | Walsh | 18/143 |
| 1,367,456 | A | 2/1921 | Brown | 81/143 |
| 1,609,330 | A | 12/1926 | Thibodeau | 440/103 |
| 1,988,240 | A | 1/1935 | Ellis | 269/220 |
| 2,026,001 | A | 12/1935 | Rapnet | 81/357 |
| 2,114,227 | A | 4/1938 | Kriss | 269/145 |
| 2,253,895 | A | 8/1941 | Denovich | 81/139 |
| 2,470,878 | A | 5/1949 | Tate | 248/215 |
| 2,493,833 | A | 1/1950 | Reynolds | 114/361 |
| 2,504,721 | A | 4/1950 | Ortoman | 81/138 |
| 2,618,285 | A | 11/1952 | Heisig | 135/90 |
| 2,650,788 | A | 9/1953 | Hulstein | 248/231.71 |
| 2,714,387 | A | 8/1955 | Meldrum | 114/361 |
| 2,882,774 | A | 4/1959 | Guttfeld | 81/139 |
| 2,914,283 | A | 11/1959 | Jorgensen | 248/125.1 |
| 3,032,046 | A | 5/1962 | Coonradt | 135/90 |
| 3,124,330 | A | 3/1964 | Robinson | 248/228.2 |
| 3,354,892 | A | 11/1967 | Frieder | 114/361 |
| 3,367,349 | A | 2/1968 | O'Link | 114/361 |
| 3,530,623 | A | 9/1970 | Burton | 52/86 |
| 3,664,626 | A | 5/1972 | Sneller | 248/214 |
| 3,745,329 | A | 7/1973 | Runey, Jr. | 362/209 |
| 3,792,829 | A | 2/1974 | Fickett | 248/354 |
| 4,230,089 | A | 10/1980 | Barden | 126/30 |

(Continued)

FOREIGN PATENT DOCUMENTS

| AU | 2003100679 A4 | 9/2003 |
|---|---|---|
| DE | 102017006150 A1 | 1/2018 |

*Primary Examiner* — Leon W Rhodes, Jr.
(74) *Attorney, Agent, or Firm* — Jonathan A. Bay

(57) ABSTRACT

A bracket assembly is put to use in a cooking apparatus or else a food service table support system for attaching to a rail of a balcony or deck, or a tailgate of a pickup truck (or other vehicle, even the tailgate of a UTV or trailer, tube inserted inside the hitch receiver of a motor vehicle, or hung off the side of a passenger door of a motor vehicle.

20 Claims, 57 Drawing Sheets

(56) References Cited

U.S. PATENT DOCUMENTS

| | | |
|---|---|---|
| D258,108 S | 2/1981 | Cone .............................. D7/332 |
| 4,352,668 A | 10/1982 | Beevers et al. ............... 114/344 |
| 4,528,768 A | 7/1985 | Anderson ...................... 43/21.2 |
| 4,672,898 A | 6/1987 | Davidson .......................... 108/6 |
| 4,786,022 A | 11/1988 | Grieshaber ................ 248/287.1 |
| 4,836,127 A | 6/1989 | Wille ............................. 114/343 |
| D305,299 S | 1/1990 | Freeman ........................ 248/214 |
| 4,979,456 A | 12/1990 | Steward ........................ 114/351 |
| 4,993,346 A | 2/1991 | Rupp ............................. 114/255 |
| 5,070,807 A | 12/1991 | Lewis ............................ 114/361 |
| 5,118,059 A | 6/1992 | Mainer .......................... 248/215 |
| 5,222,420 A | 6/1993 | Sorensen et al. ............... 81/487 |
| 5,305,034 A | 4/1994 | Aratani ......................... 224/265 |
| 5,310,147 A | 5/1994 | Billman ......................... 248/214 |
| 5,389,466 A | 2/1995 | Inoue et al. ................... 429/178 |
| 5,413,063 A | 5/1995 | King .............................. 114/221 |
| 5,492,258 A | 2/1996 | Bunner .......................... 224/321 |
| 5,494,553 A | 2/1996 | Colucci ......................... 156/580 |
| 5,513,838 A | 5/1996 | Van Rossum ................. 269/203 |
| 5,749,602 A * | 5/1998 | Delaney ................ B01D 46/42 |
| | | 285/64 |
| 5,832,793 A | 11/1998 | Collins ............................ 81/138 |
| 5,845,885 A | 12/1998 | Carnevali .................... 248/118.1 |
| 5,953,999 A | 9/1999 | Kanehl ..................... B60N 3/007 |
| 6,260,505 B1 | 7/2001 | Polidan ......................... 114/361 |
| 6,474,632 B1 | 11/2002 | Liou ................................. 269/6 |
| 6,561,471 B1 | 5/2003 | Hawie ........................... 248/201 |
| D483,250 S | 12/2003 | Klein .............................. D8/373 |
| D491,054 S | 6/2004 | Caterinacci, Jr. ............... D8/381 |
| D494,050 S | 8/2004 | Klein .............................. D6/513 |
| D494,051 S | 8/2004 | Klein .............................. D8/373 |
| D494,454 S | 8/2004 | Klein .............................. D8/373 |
| 6,978,731 B2 | 12/2005 | Erbetta ......................... 114/361 |
| 7,063,297 B2 | 6/2006 | Jopling ...................... 248/292.12 |
| 7,077,711 B1 | 7/2006 | Moore ........................... 439/864 |
| 7,555,994 B1 | 7/2009 | Arnall ..................... B63B 17/02 |
| 7,603,960 B1 | 10/2009 | Perry et al. .................... 114/364 |
| 7,909,314 B2 | 3/2011 | Roesch et al. ..................... 269/6 |
| 7,934,711 B2 | 5/2011 | Wong .............................. 269/45 |
| 8,226,074 B1 | 7/2012 | Hughey ......................... 269/155 |
| 8,381,372 B1 | 2/2013 | Arnall ..................... B25B 5/082 |
| 8,844,917 B2 | 9/2014 | Buske ........................... 269/143 |
| 9,079,636 B1 | 7/2015 | Arnall ..................... B25B 5/006 |
| 10,259,399 B2 | 4/2019 | Yang ....................... H04M 1/04 |
| D876,210 S | 2/2020 | Arnall ............................ D8/380 |
| 2004/0040553 A1 | 3/2004 | McKoski ...................... 126/276 |
| 2004/0045492 A1 | 3/2004 | Dierssen ....................... 114/361 |
| 2004/0164211 A1 | 8/2004 | Orona .................... B61D 33/005 |
| 2005/0188507 A1 | 9/2005 | Adams ............... A47G 25/0614 |
| 2005/0247747 A1 | 11/2005 | Henry ............................ 224/401 |
| 2006/0086306 A1 | 4/2006 | Murphy ........................ 114/361 |
| 2006/0090686 A1 | 5/2006 | Thompson .................... 114/631 |
| 2006/0137593 A1 | 6/2006 | Brooks et al. ................. 114/361 |
| 2021/0330122 A1 | 10/2021 | Cook ....................... F24C 15/005 |

* cited by examiner

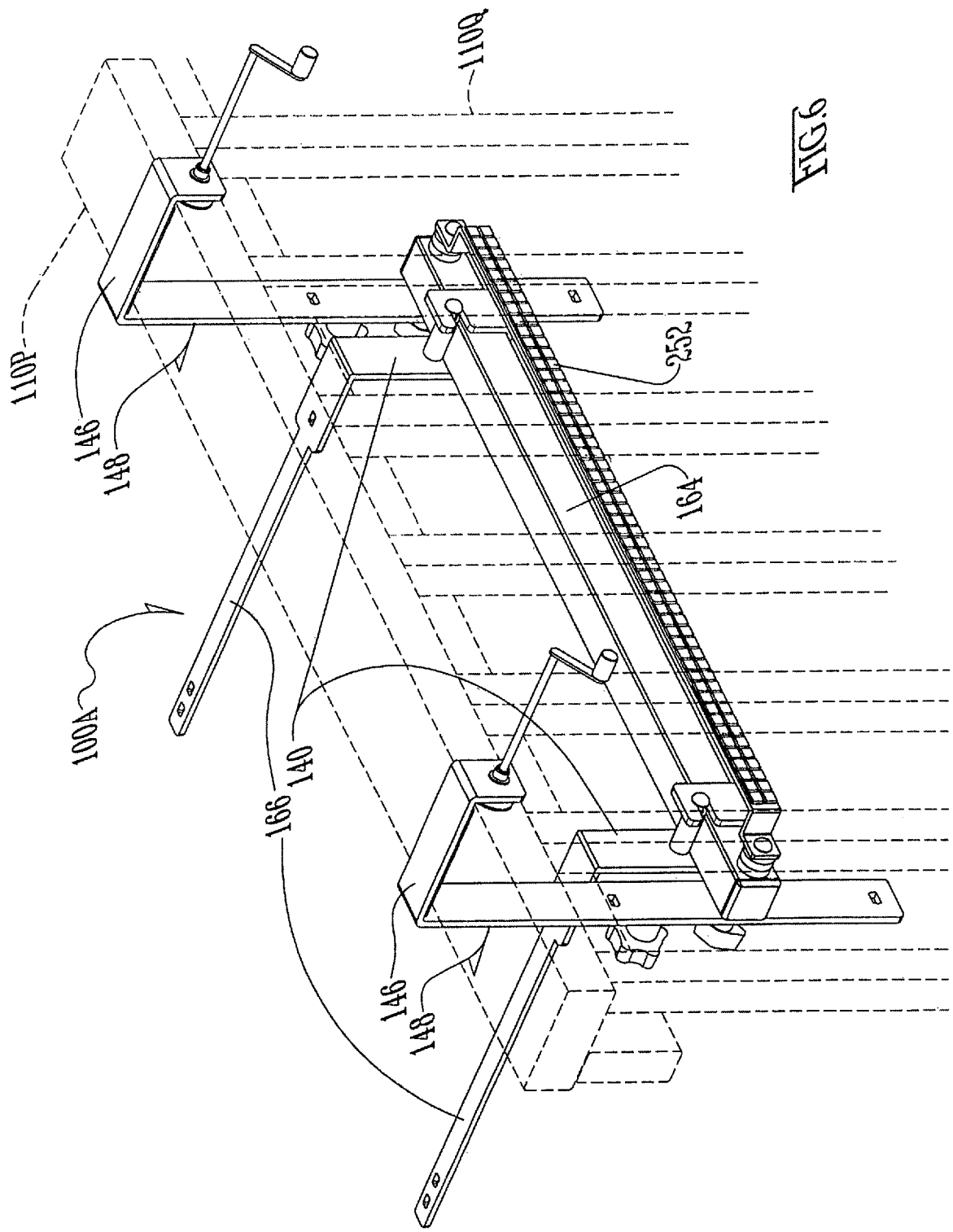

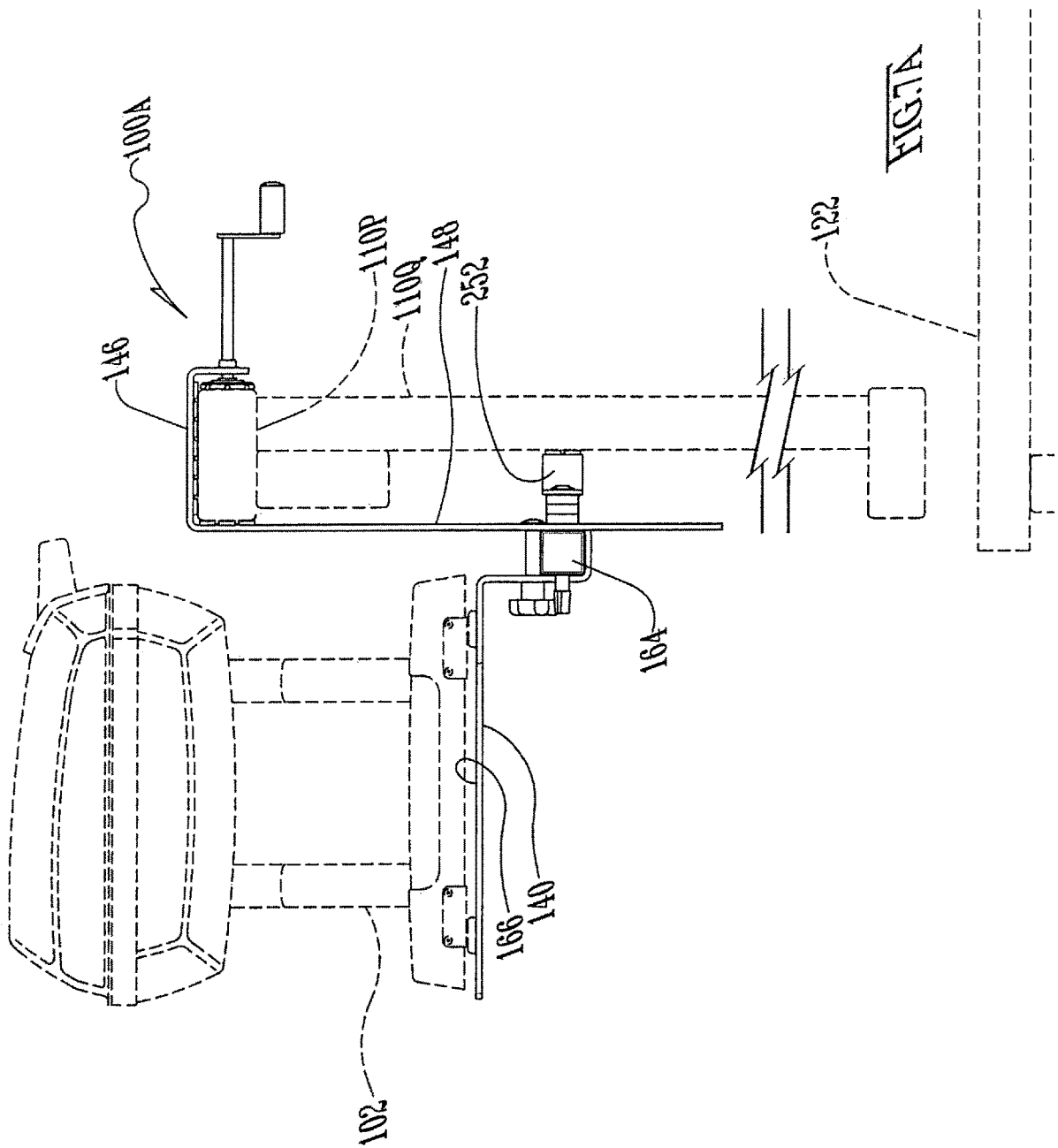

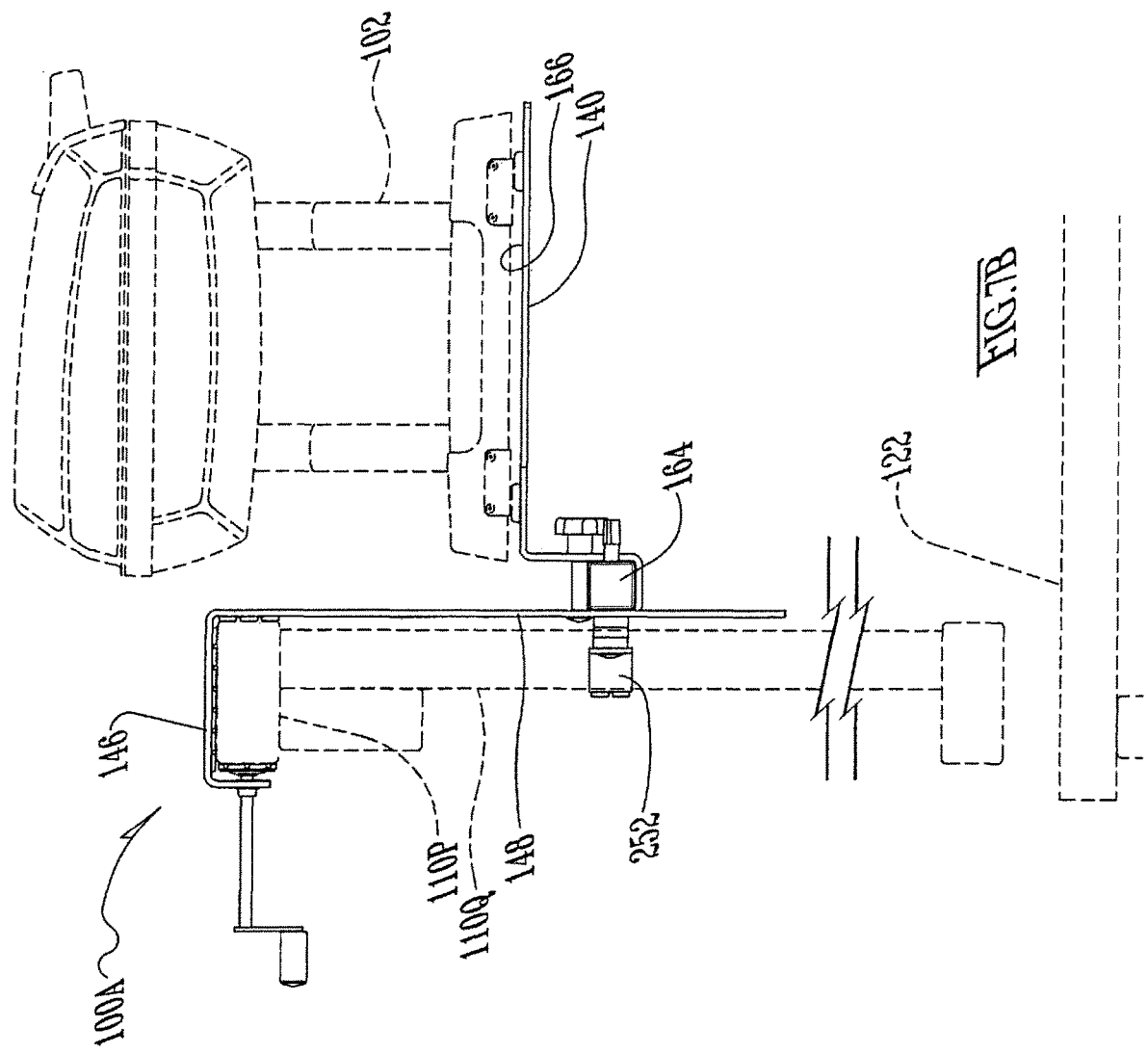

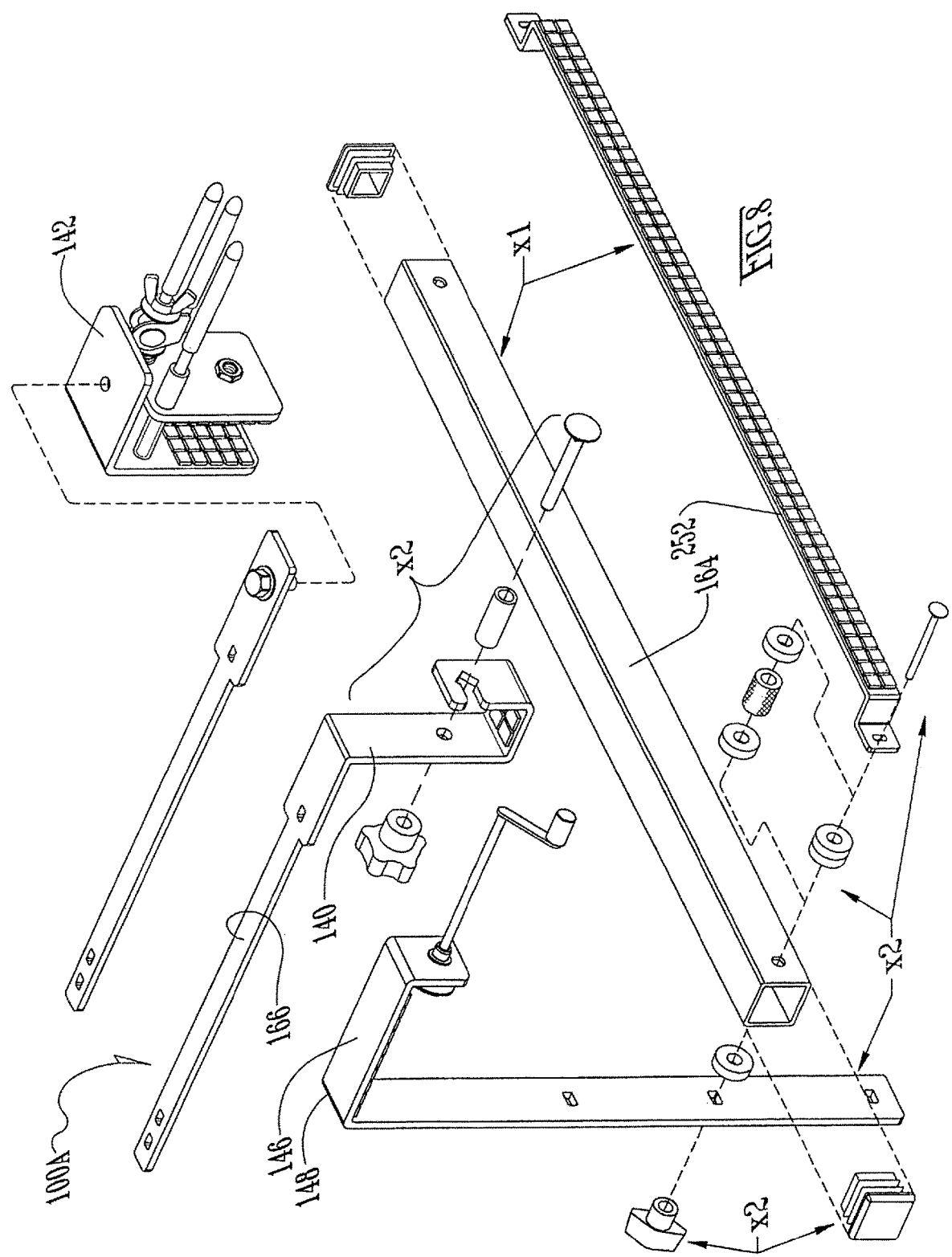

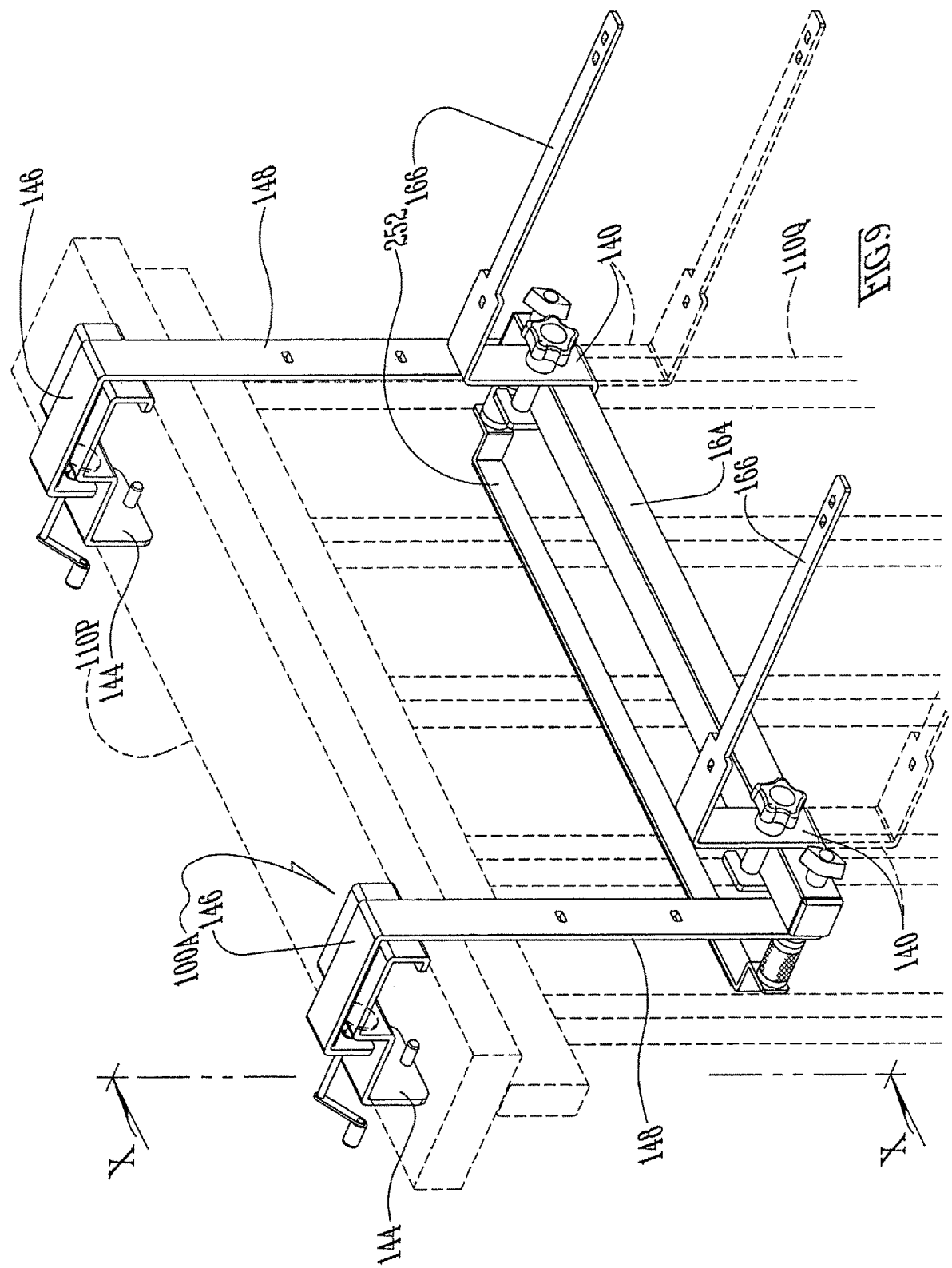

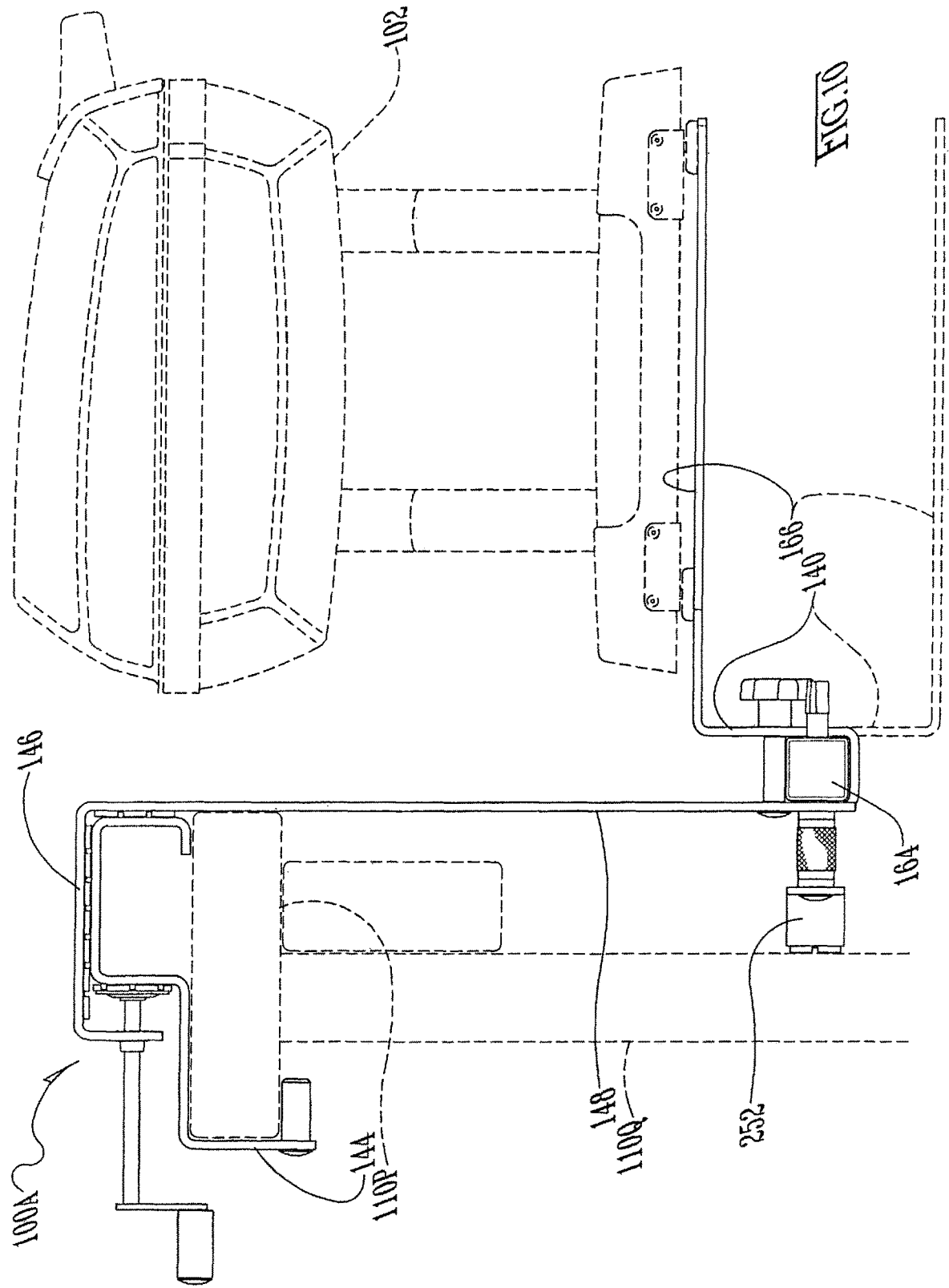

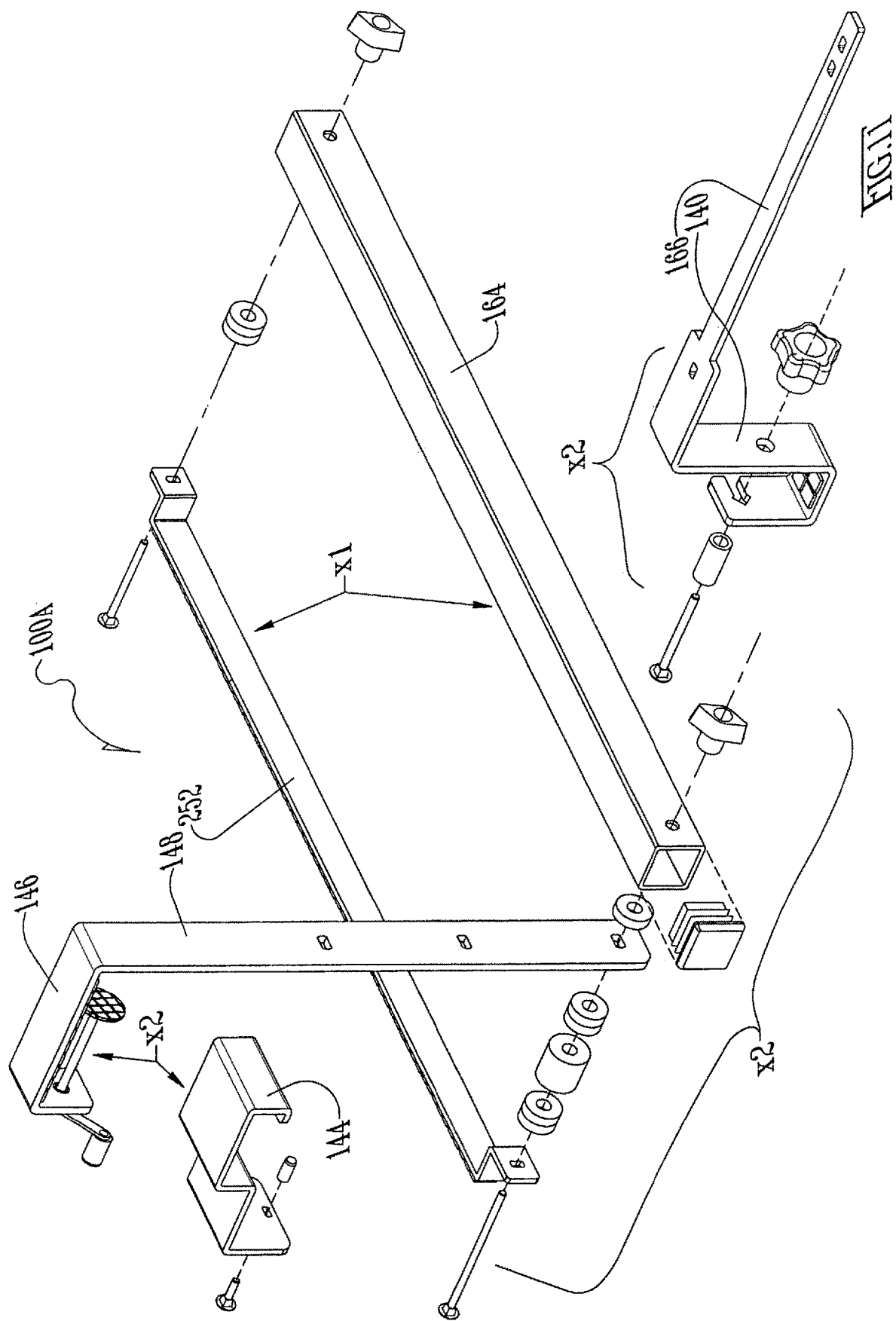

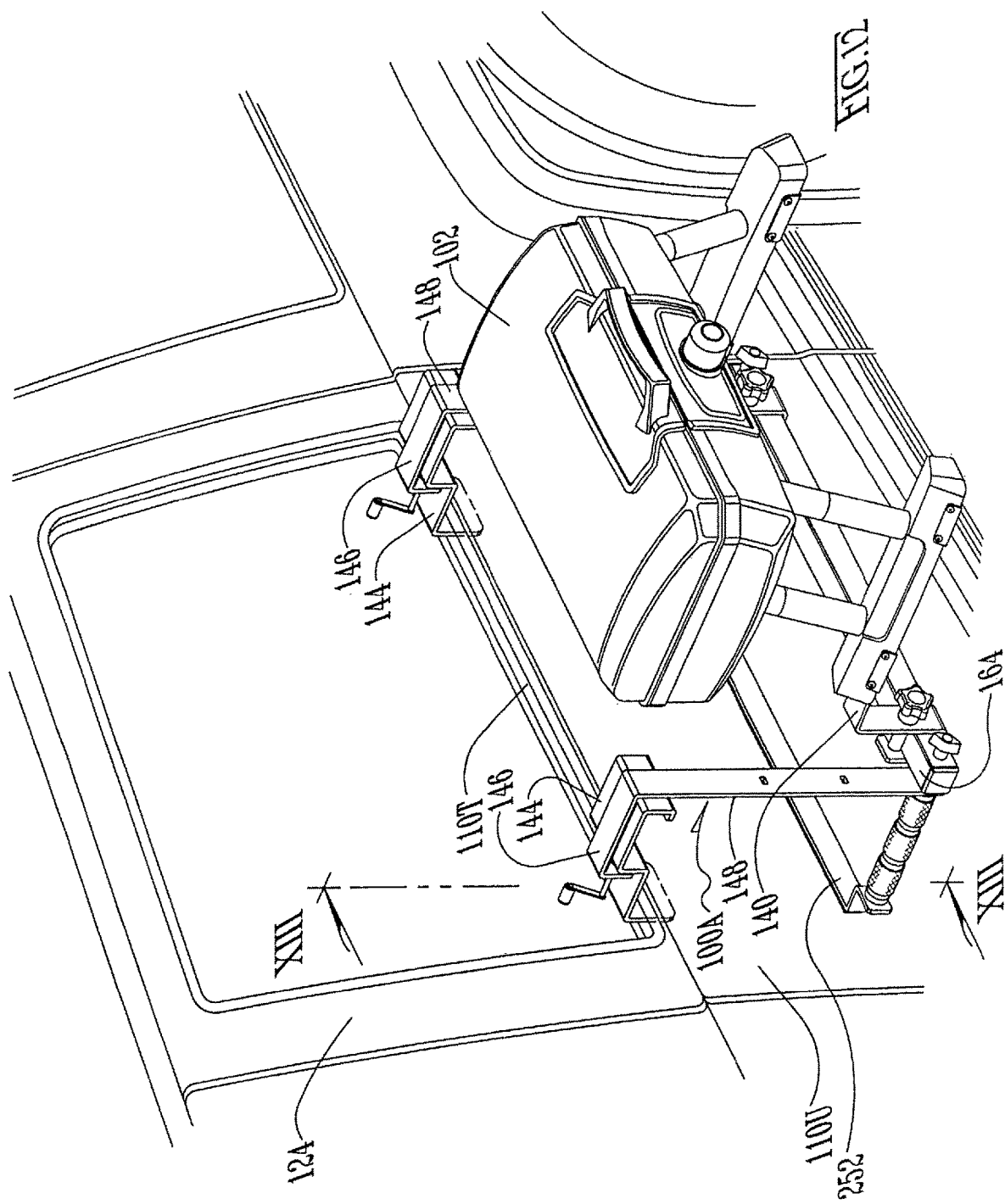

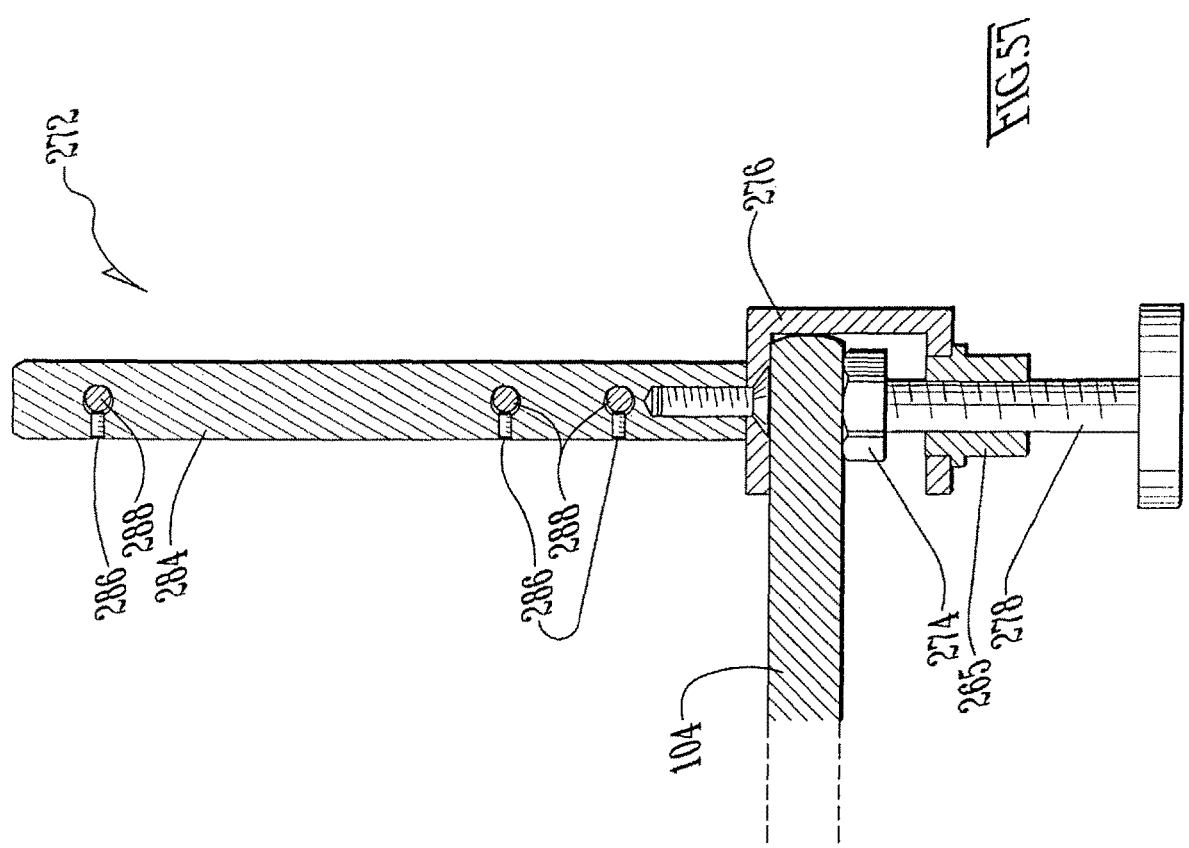

FOLDABLE BRACKET ASSEMBLY FOR SUPPORTING A GRILL OR TABLE

CROSS-REFERENCE TO RELATED APPLICATION(S)

This application is a continuation-in-part of U.S. patent application Ser. No. 16/844,595, filed Apr. 9, 2020, which claims the benefit of U.S. Provisional Application No. 62/831,394, filed Apr. 9, 2019 and U.S. Provisional Application No. 62/988,529, filed Mar. 12, 2020.

This application also claims the benefit of U.S. Provisional Application No. 63/106,542, filed Oct. 28, 2020.

The foregoing patent disclosure(s) is(are) fully incorporated herein by this reference thereto.

BACKGROUND AND SUMMARY OF THE INVENTION

The invention relates to a foldable bracket assembly for supporting a grill or table. The foregoing patents are commonly-owned and commonly invented by the present inventor hereof, Randall E. Arnall, and are fully incorporated herein by this reference thereto:—

U.S. Des. Pat. No. D876,210—Grill mounting bracket for railings and receiver hitches, U.S. Pat. No. 9,079,636—Clamp for gunwales of fiberglass hulls, U.S. Pat. No. 8,381,372—Camming clamp for gunwales or pontoon-boat rails, and U.S. Pat. No. 7,555,994—Pontoon boat cover system without ridge or guy poles.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 6 is a perspective view comparable to FIG. 5 except with the grill removed from view;

FIG. 7A is a side elevational view taken in the direction of arrows VII-VII in FIG. 5, wherein the grill (shown in broken lines) is shown hung outside the railing of the deck or balcony;

FIG. 7B is a side elevational view comparable to FIG. 7B, wherein the grill (shown in broken lines) is shown hung inside the railing of the deck or balcony;

FIG. 8 is an exploded perspective view of FIG. 6 except showing the elongated horizontal mounting bracket on the left side of the view replaced on the right side by a cam lever action clamp assembly;

FIG. 9 is a perspective view comparable to FIG. 2 except showing an adapter for the upper hanger portions for adapting from hanging on a nominal 2×4 hand rail to a nominal 2×6 hand rail or the like;

FIG. 10 is a side elevational view taken in the direction of arrows X-X in FIG. 9, wherein the grill is re-inserted in the view and shown in broken lines;

FIG. 11 is an exploded perspective view of FIG. 10 with the grill removed from view;

FIG. 12 is a perspective view comparable to FIG. 9 except showing the adapter in FIG. 9 in service of hanging the foldable bracket/cooking apparatus/food service table support system in accordance with the invention from a rail of a deck or balcony (as shown in FIG. 9) now hung on the window sill of a passenger door of a motor vehicle;

FIG. 57 is an enlarged-scale perspective view taken along line LVII-LVII in FIG. 55.

DETAILED DESCRIPTION OF THE PREFERRED EMBODIMENTS

Figure 1:
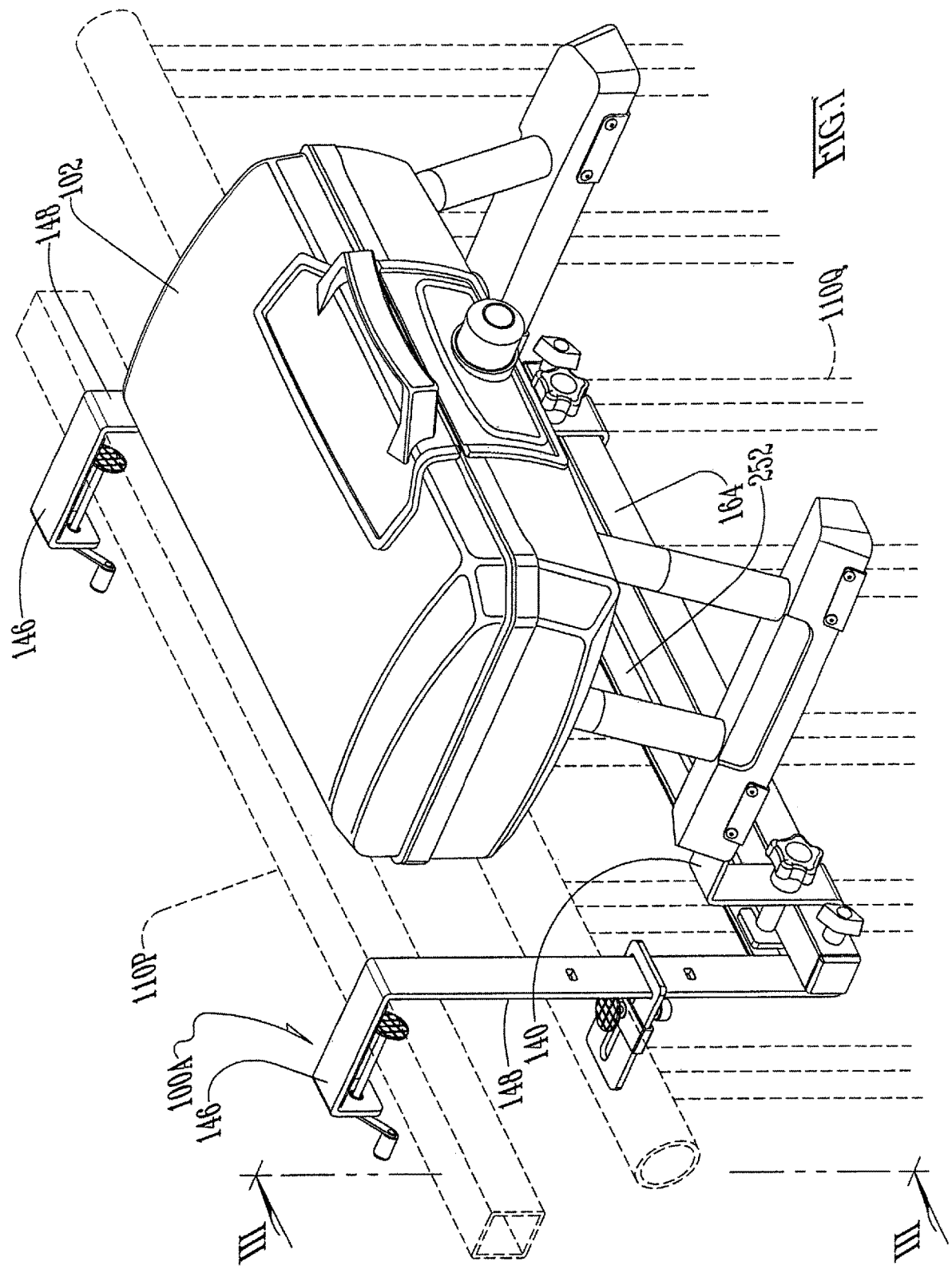
FIG. 1 is a perspective view of a foldable bracket assembly in accordance with the invention for supporting a grill or table (eg., a cooking apparatus or else a food service table support system) for attaching to a rail of a balcony or deck as shown, or a tailgate of a truck (see FIG. 14), a tube inserted inside hitch receiver of a motor vehicle (see FIG. 16), or a passenger door of a motor vehicle (see FIG. 12) making the grill or table accessible to a user inside the vehicle by reaching out a partially opened window.

FIG. 1 is a perspective view of a foldable bracket assembly 100A in accordance with the invention for supporting a grill 102 or table 104 (eg., a cooking apparatus/food service table support system 100A) for attaching to a rail 110P of a balcony or deck 122 as shown, or a tailgate 110W of a truck 124 (see FIG. 14), a tube 110R inserted inside a hitch receiver 126 of a motor vehicle 124 (see FIG. 16), or a passenger door 110T/110U of a motor vehicle 124 (see FIG. 12) making the grill 102 or table 104 accessible to a user inside the vehicle 124 by reaching out a partially opened window 132.

Figure 2:
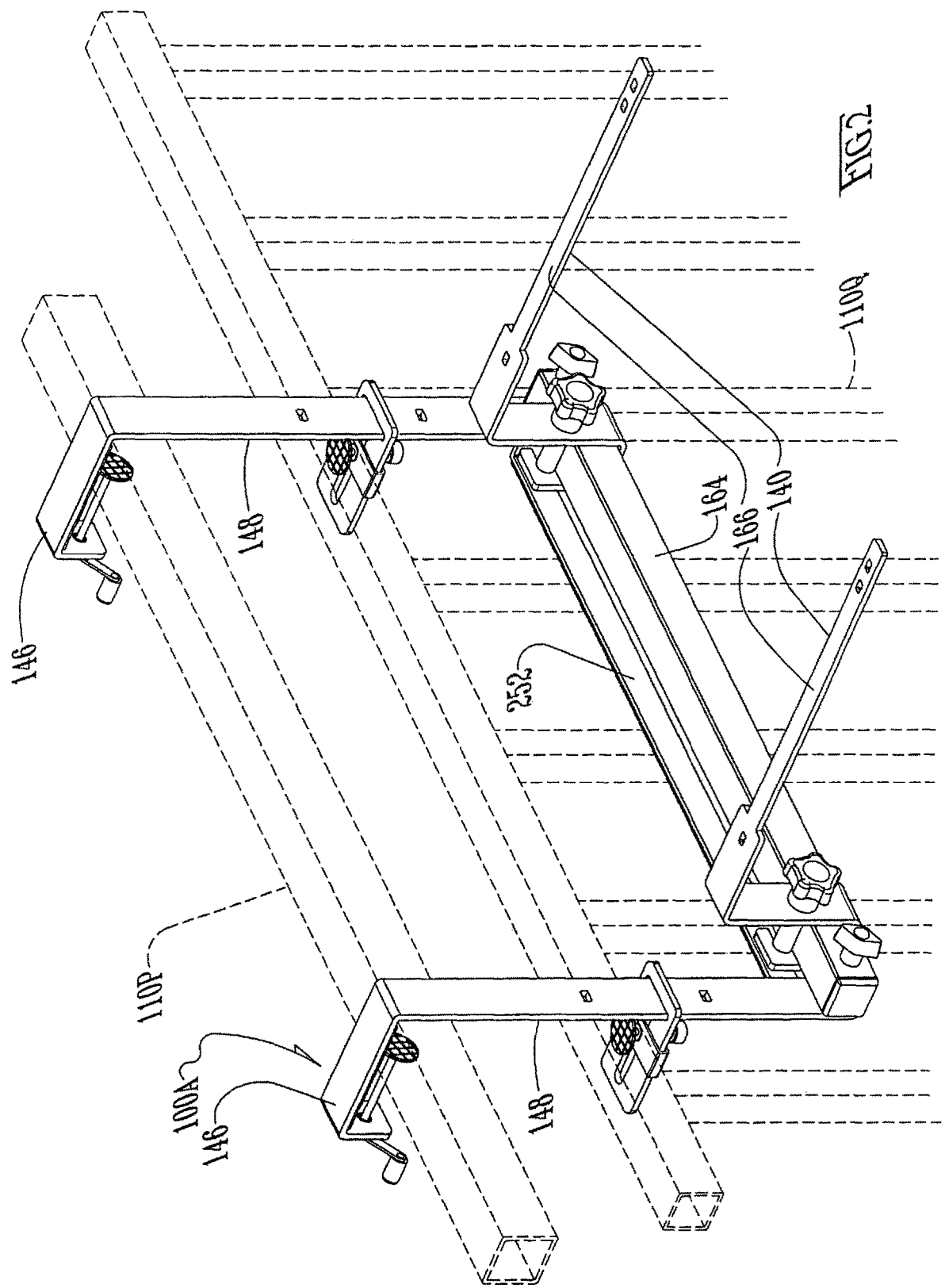
FIG. 2 is a perspective view comparable to FIG. 1 except with the grill removed from view.

FIG. 2 is a perspective view comparable to FIG. 1 except with the grill 102 removed from view.

Figure 3:
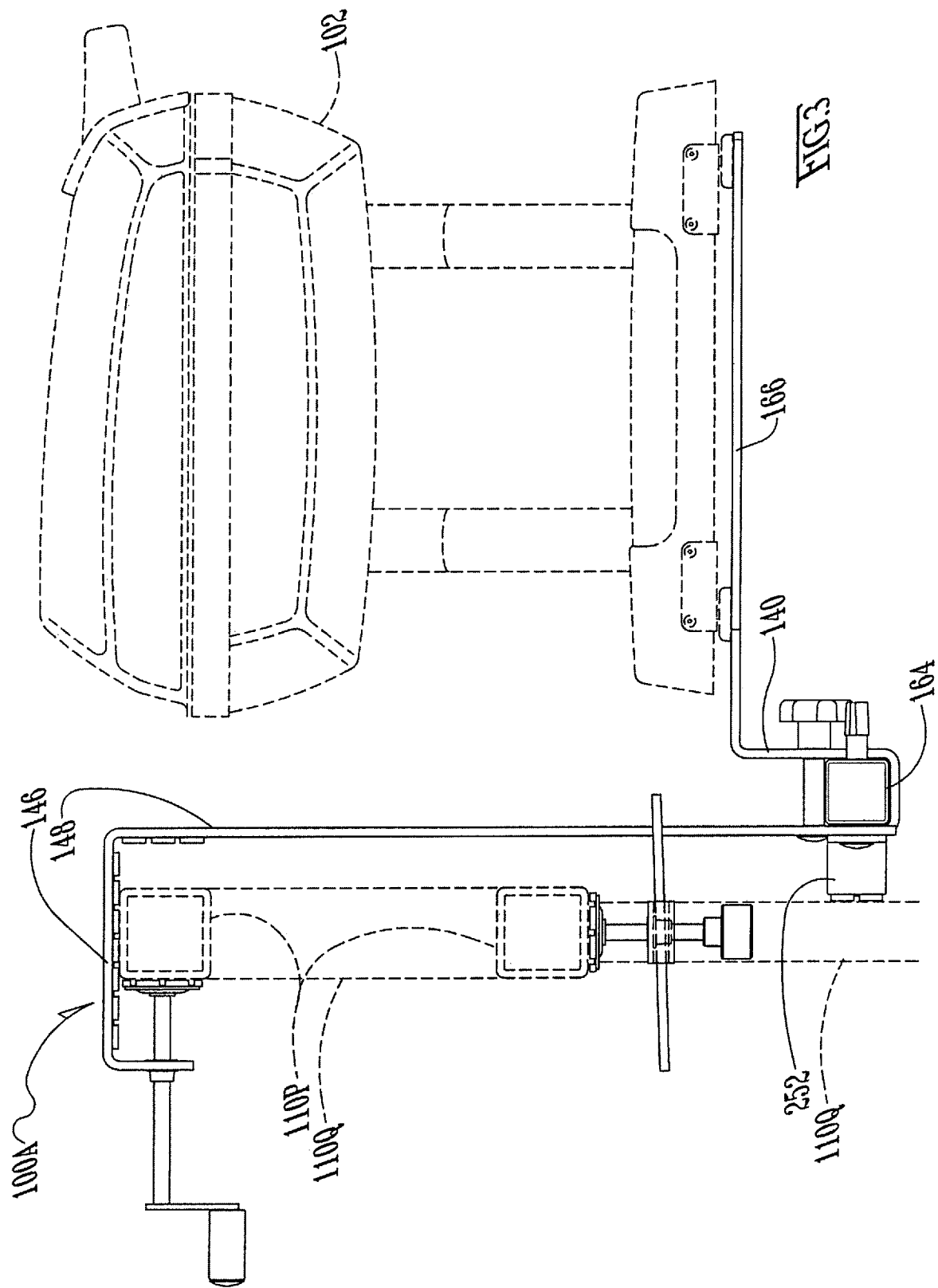
FIG. 3 is a side elevational view taken in the direction of arrows III-III in FIG. 1, wherein the grill is shown in broken lines.

FIG. 3 is a side elevational view taken in the direction of arrows III-III in FIG. 1, wherein the grill 102 is shown in broken lines.

Figure 4:
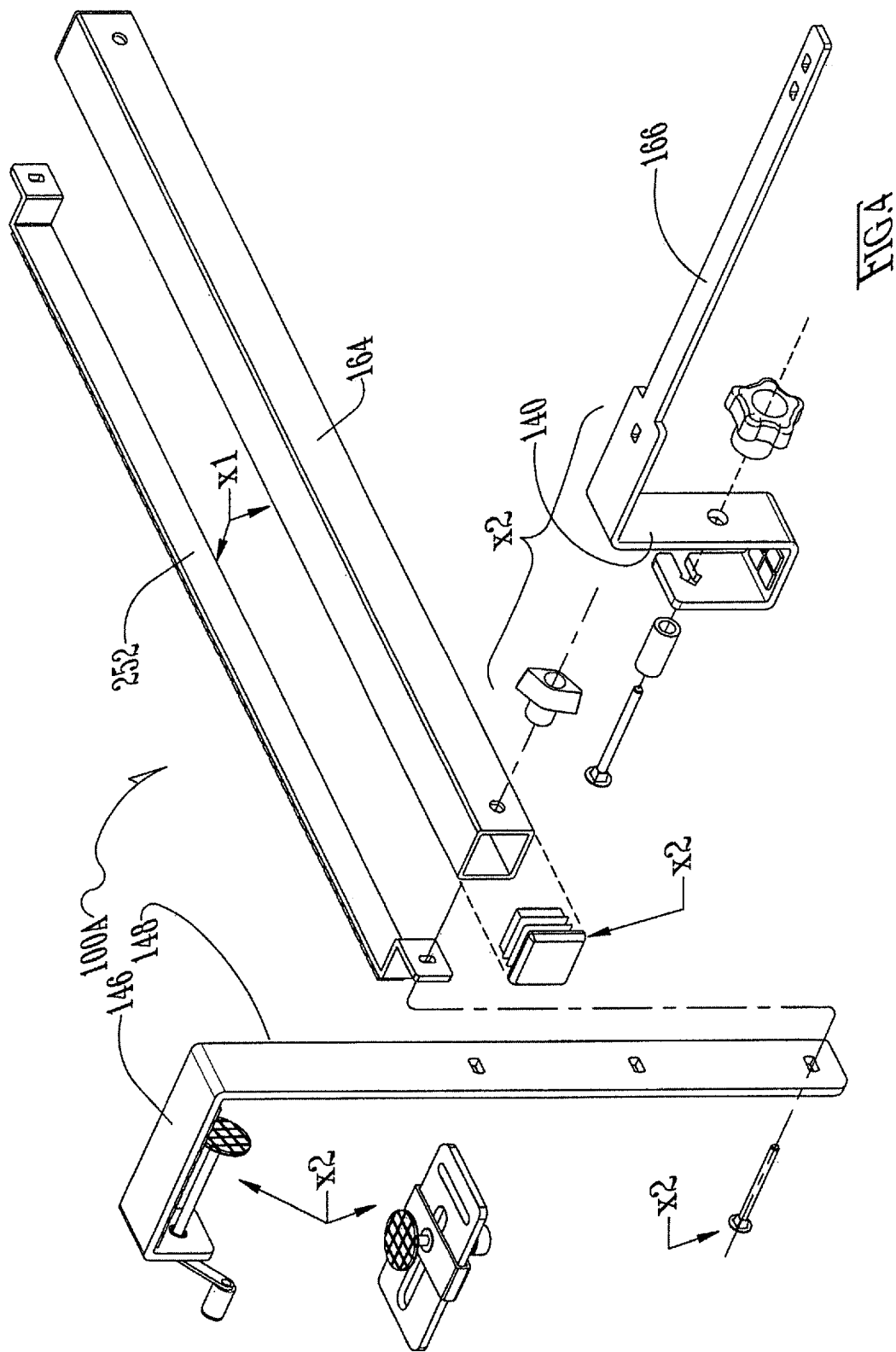
FIG. 4 is an exploded perspective view of FIG. 2.

FIG. 4 is an exploded perspective view of FIG. 2.

Figure 5:
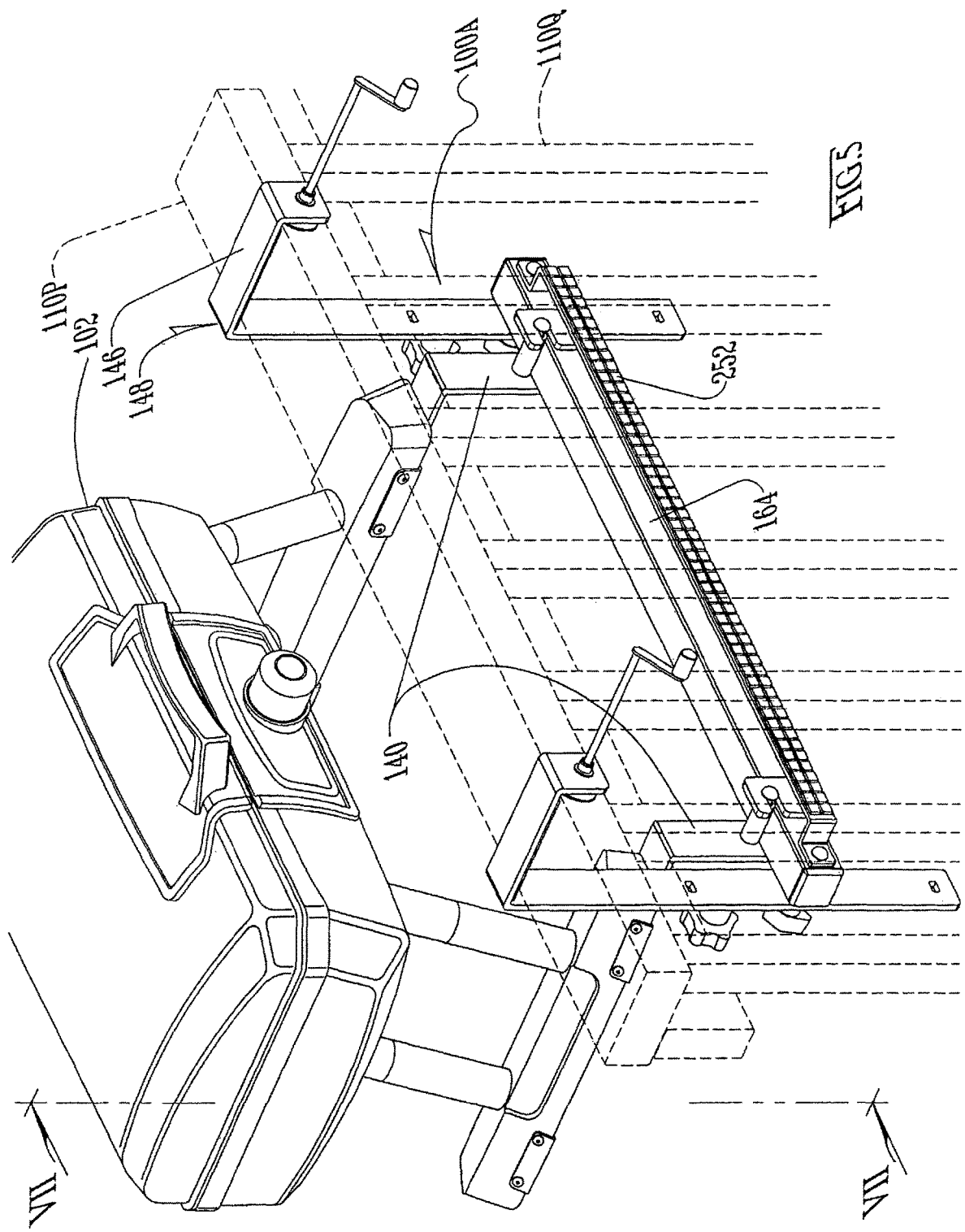
FIG. 5 is a perspective view comparable to FIG. 1 except showing the foldable bracket/cooking apparatus/food service table support system in accordance with the invention spun around on the hand rail to hold the grill out over space instead of the floor of the deck or balcony.

FIG. 5 is a perspective view comparable to FIG. 1 except showing the foldable bracket/cooking apparatus/food service table support system 100A in accordance with the invention spun around on the hand rail 110P to hold the grill 102 out over space instead of the floor of the deck or balcony 122.

FIG. 6 is a perspective view comparable to FIG. 5 except with the grill 102 removed from view.

FIG. 7A is a side elevational view taken in the direction of arrows VII-VII in FIG. 5, wherein the grill 102 (shown in broken lines) is shown hung outside the railing 110Q, ie., vertical posts that prop up the hand rail 110P as well as provide a protective barrier for the deck or balcony 122.

FIG. 7B is a side elevational view comparable to FIG. 7B, wherein the grill 102 (shown in broken lines) is shown hung inside the railing 110Q of the deck or balcony 122.

FIG. 8 is an exploded perspective view of FIG. 6 except showing the elongated horizontal mounting bracket 140 on the left side of the view replaced on the right side by a cam lever action clamp 142 assembly.

FIG. 9 is a perspective view comparable to FIG. 2 except showing an adapter 144 for the upper hanger portions 146 of the mounting hook 148 for adapting from hanging on a nominal two inch by four inch hand rail 110P to a nominal two inch by six inch hand rail 110P or the like.

FIG. 10 is a side elevational view taken in the direction of arrows X-X in FIG. 9, wherein the grill 102 is re-inserted in the view and shown in broken lines.

FIG. 11 is an exploded perspective view of FIG. 10 with the grill 102 removed from view.

FIG. 12 is a perspective view comparable to FIG. 9 except showing the adapter 144 in FIG. 9 in service of hanging the foldable bracket/cooking apparatus/food service table support system 100A in accordance with the invention from a rail 110P of a deck or balcony 122 (as shown in FIG. 9) now hung on the window sill 110T of a passenger door 110U of a motor vehicle 124.

Figure 13:
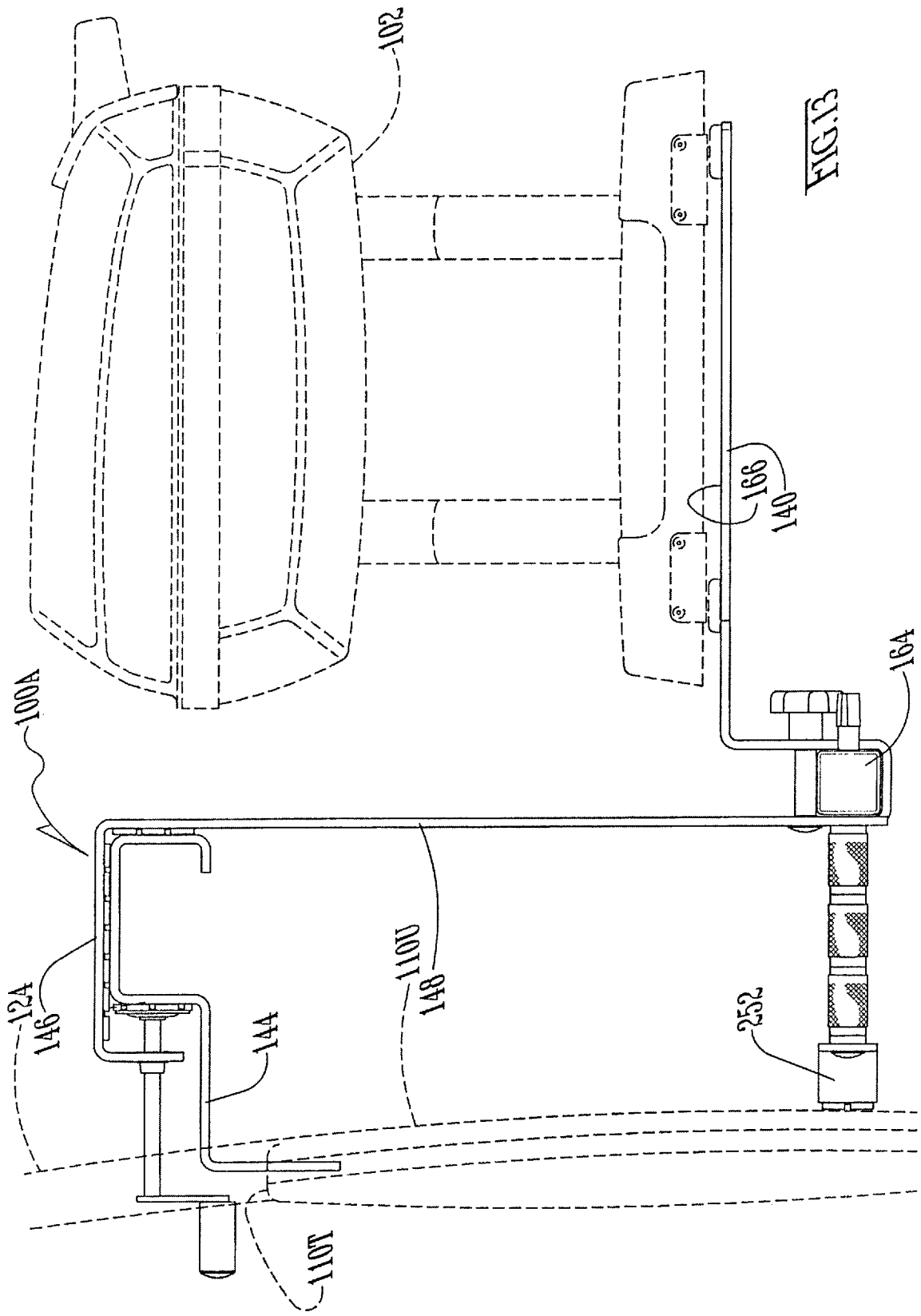
FIG. 13 is a side elevational view taken in the direction of arrows XIII-XIII in FIG. 12, wherein the grill is shown in broken lines.

FIG. 13 is a side elevational view taken in the direction of arrows XIII-XIII in FIG. 12, wherein the grill 102 is shown in broken lines.

Figure 14:
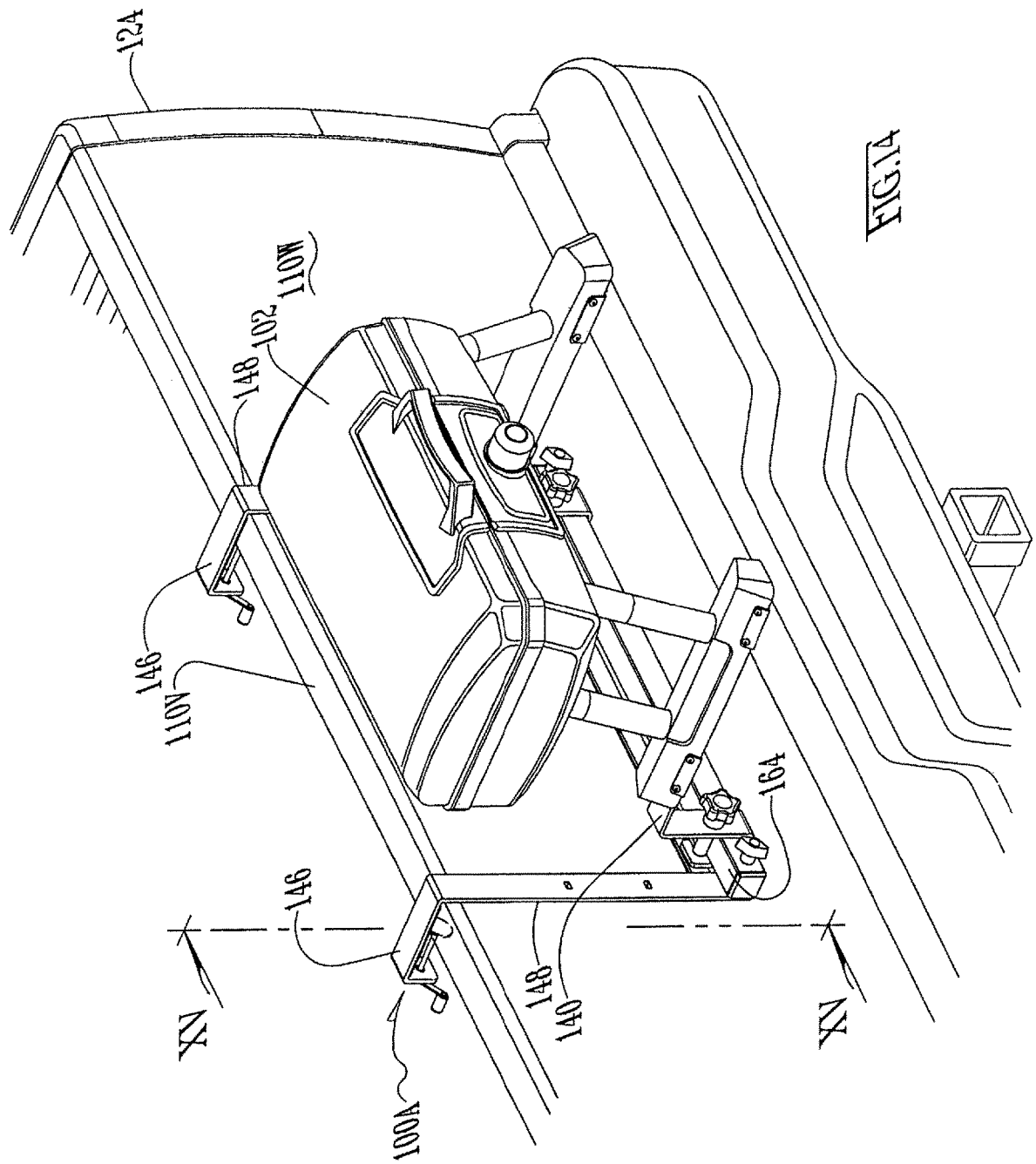
FIG. 14 is a perspective view comparable to FIG. 1 except showing the foldable bracket/cooking apparatus/food service table support system in accordance with the invention hung over the top rail of a tailgate of a pickup, or over a cap or any trim on the top rail of the tailgate.

FIG. 14 is a perspective view comparable to FIG. 1 except showing the foldable bracket/cooking apparatus/food service table support system 100A in accordance with the invention hung over the top rail 110V of a tailgate 110W of a pickup 124, or over a cap or any trim on the top rail 110V of the tailgate 110W.

Figure 15:
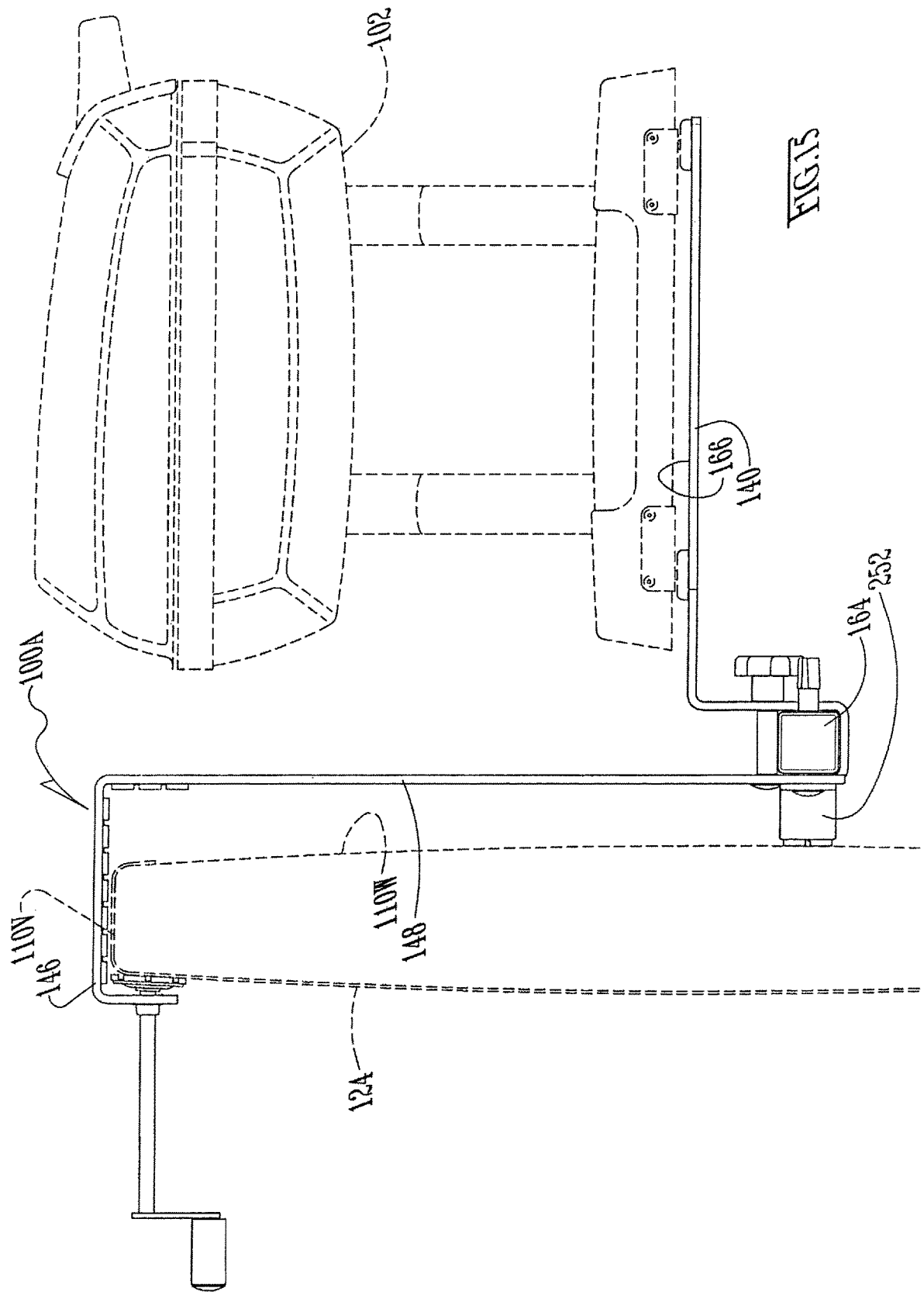
FIG. 15 is a side elevational view taken in the direction of arrows XV-XV in FIG. 14, wherein the grill is shown in broken lines.

FIG. 15 is a side elevational view taken in the direction of arrows XV-XV in FIG. 14, wherein the grill 102 is shown in broken lines.

Figure 16:
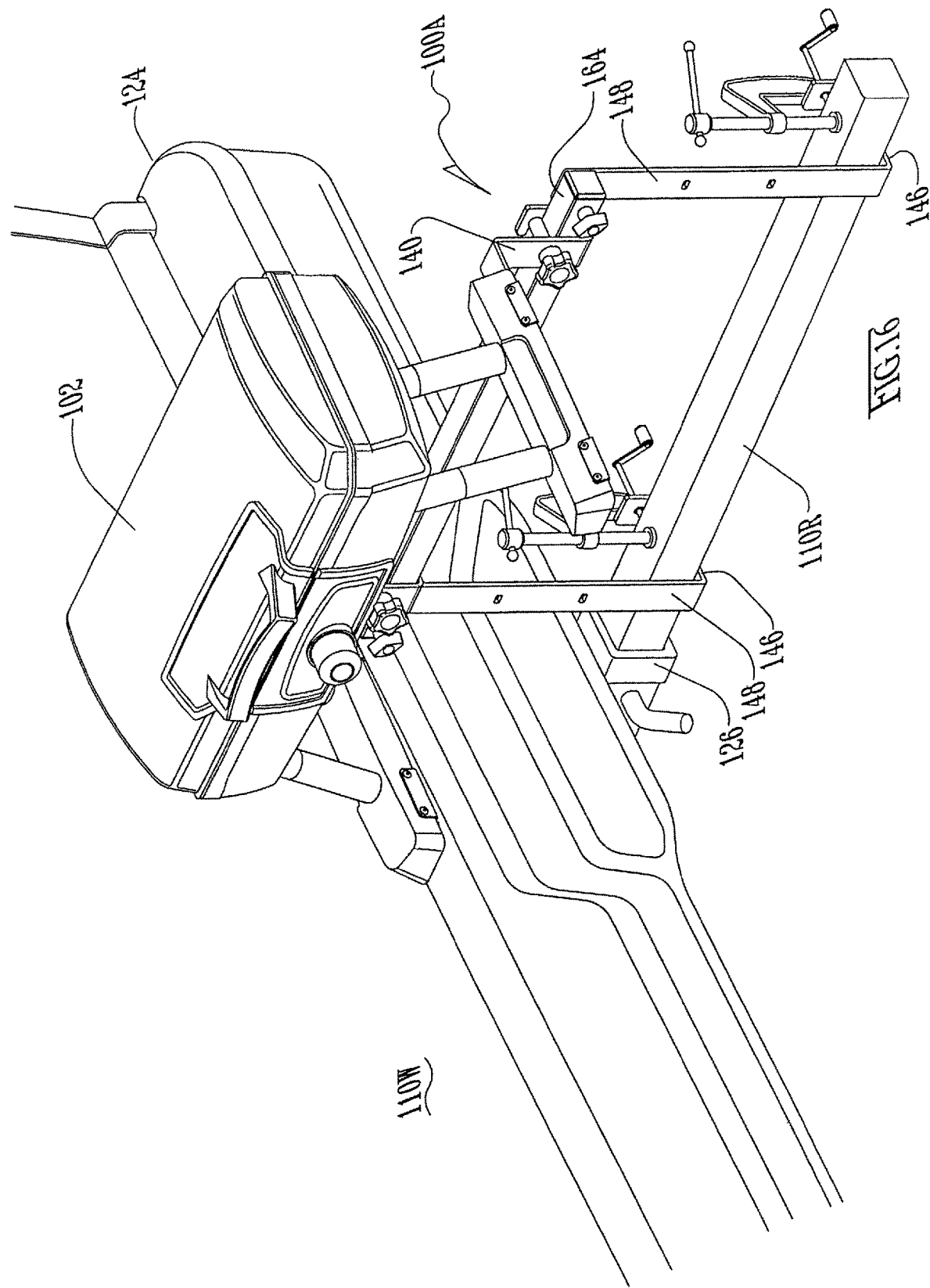
FIG. 16 is a perspective view roughly comparable to FIG. 1 except showing the foldable bracket/cooking apparatus/food service table support system in accordance with the invention standing up off a tube inserted inside hitch receiver of a motor vehicle.

FIG. 16 is a perspective view roughly comparable to FIG. 1 except showing the foldable bracket/cooking apparatus/food service table support system 100A in accordance with the invention standing up off a tube 110R inserted inside hitch receiver 126 of a motor vehicle 124.

Figure 17:
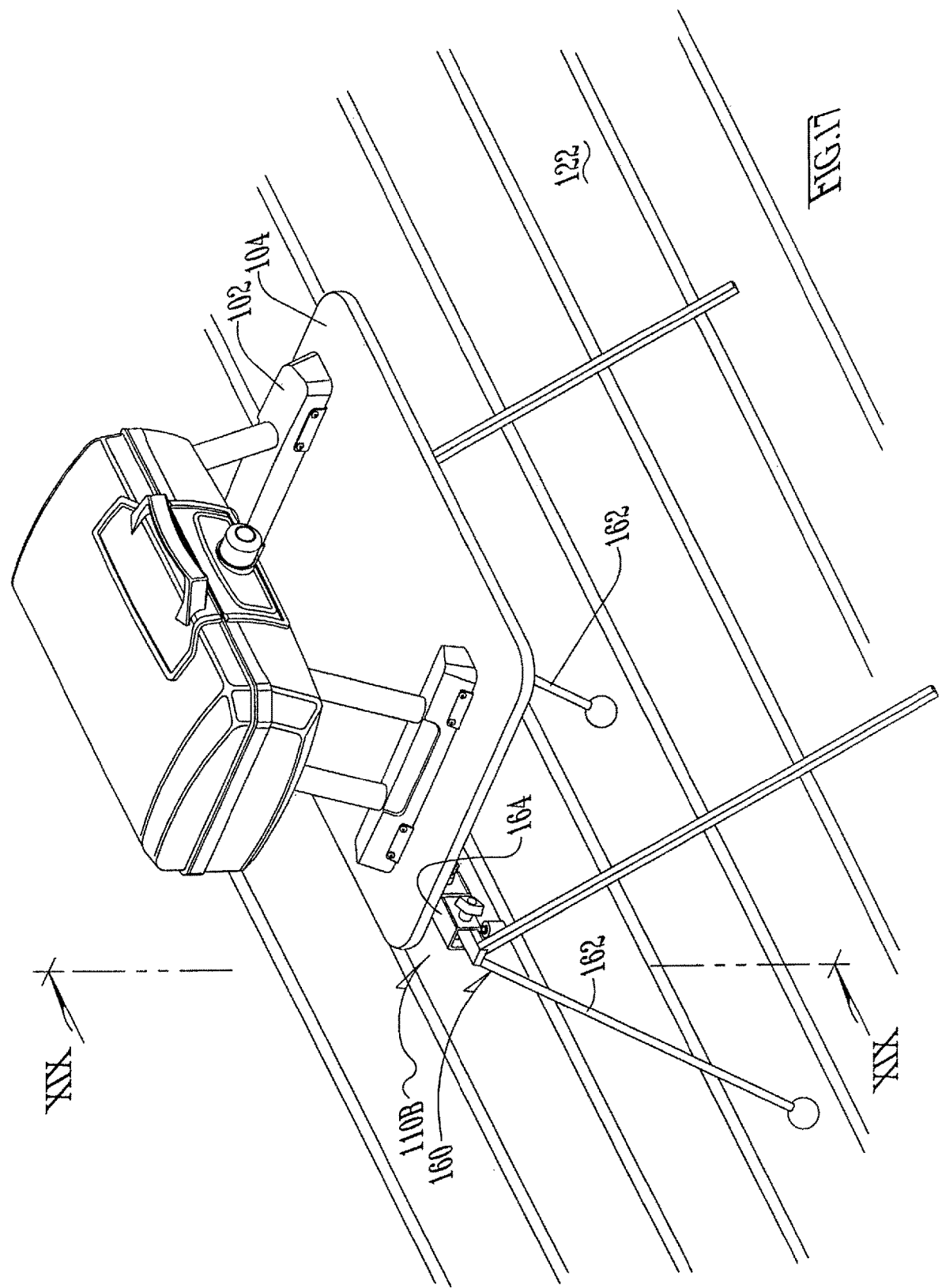
FIG. 17 is a perspective view of an alternative embodiment of a cooking apparatus/food service table support system in accordance with the invention, now characterized by a sawhorse-resembling collapsible leg structure comprising a pair of inverted-V shaped leg assemblies supporting a cross beam which in turn supports the horizontal bracket, which can alternatively support a grill in isolation (see FIG. 19), a table panel in isolation (see FIG. 18) or a table panel and grill at the same time (as shown in this FIG. 17)

FIG. 17 is a perspective view of an alternative embodiment of a cooking apparatus/food service table support system 100B in accordance with the invention, now characterized by a sawhorse-resembling collapsible leg structure 160 comprising a pair of inverted-V shaped leg assemblies 162 supporting a cross beam 164 which in turn supports the horizontal bracket 140, which can alternatively support a grill 102 in isolation (see FIG. 19), a table panel 104 in isolation (see FIG. 18) or a table panel 104 and grill 102 at the same time (as shown in this FIG. 17).

Figure 18:
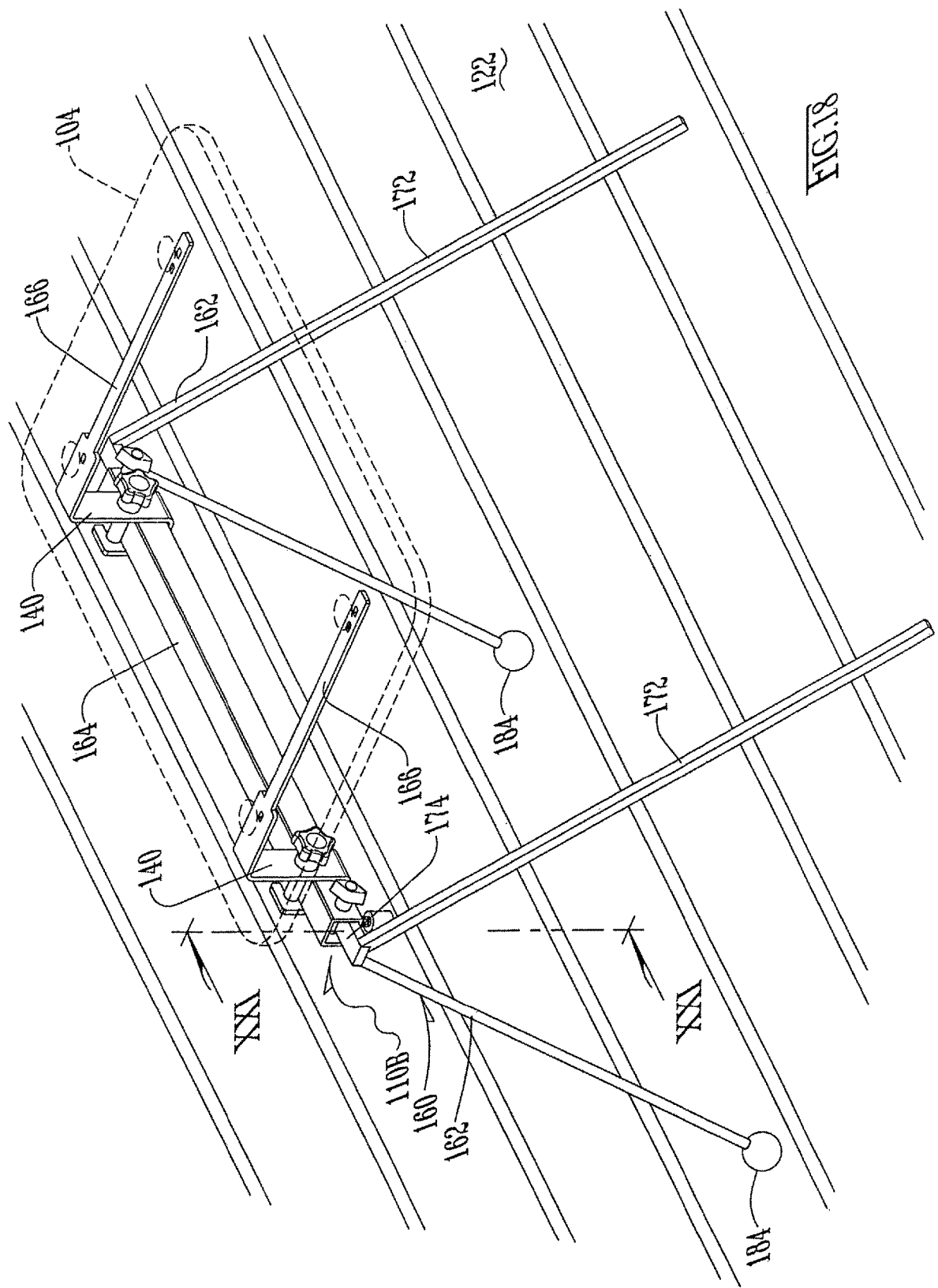
FIG. 18 is an enlarged-scale perspective view of FIG. 17 except with the table panel shown in broken lines, and, with the grill removed from view.

FIG. 18 is an enlarged-scale perspective view of FIG. 17 except with the table panel 104 shown in broken lines, and, with the grill 102 removed from view.

Figure 19:
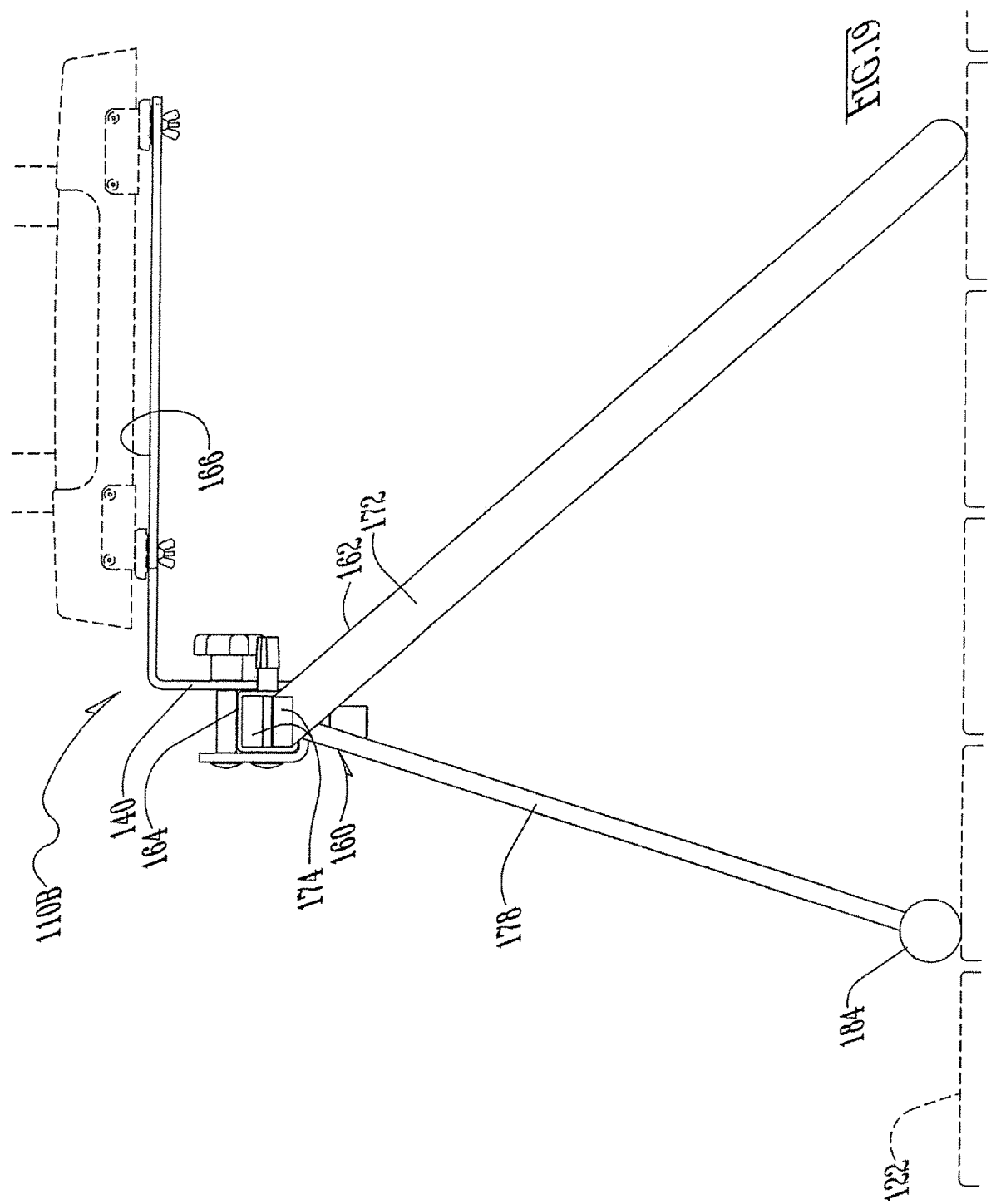
FIG. 19 is a side elevational view of FIG. 18, wherein the table panel is removed from view and hence no longer is interposed between the grill and the horizontal runs (of the horizontal brackets), wherein the grill is partly broken away and the remaining portions are shown in broken lines.

FIG. 19 is a side elevational view of FIG. 18, wherein the table panel 104 is removed from view and hence no longer is interposed between the grill 102 and the horizontal runs 166 (of the horizontal brackets 140), wherein the grill 102 is partly broken away and the remaining portions are shown in broken lines.

Figure 20:
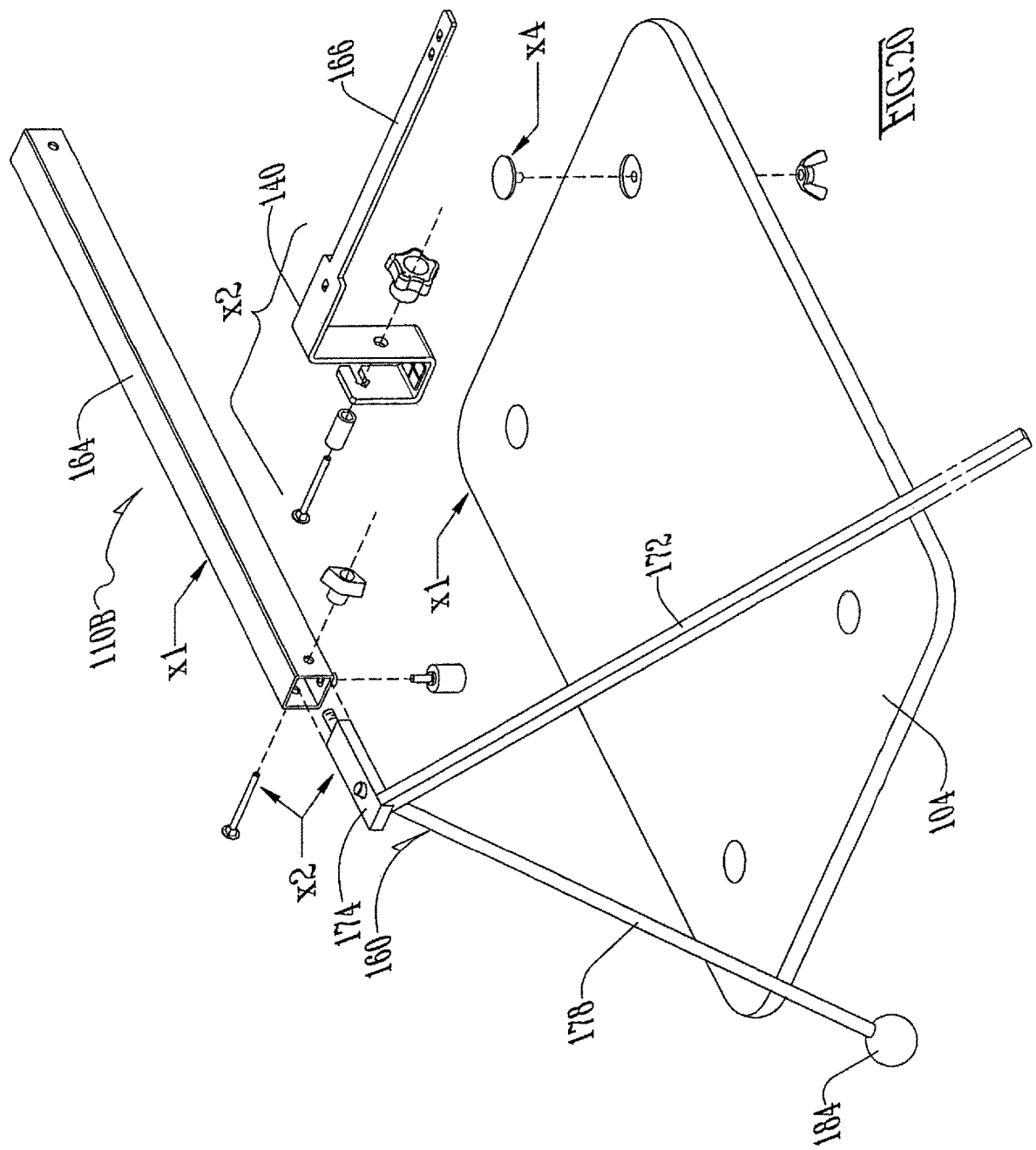
FIG. 20 is an exploded perspective view of FIG. 18, with the table shown in solid lines and showing one elevator bolt exploded of the four elevator bolts that fasten the table top to the pair of horizontal runs of the pair of horizontal brackets, wherein each inverted-V shaped leg assembly (one shown, the other being a mirror opposite) comprises one rectangular bar stock leg (preferably aluminum) having welded to its upper end a horizontal tab that for assembly purposes inserts inside one open end of the cross beam tube, and wherein the other leg is metal rod (preferably aluminum) with both ends provided with a section of external screw thread that, for assembly purposes, the lower end screws into the threaded socket of a spherical foot and the upper end screws into a threaded socket for it in the horizontal tab.

FIG. 20 is an exploded perspective view of FIG. 18, with the table 104 shown in solid lines and showing one elevator bolt 168 exploded of the four elevator bolts 168 that fasten the table top 104 to the pair of horizontal runs 166 of the pair of horizontal brackets 140, wherein each inverted-V shaped leg assembly 162 (one shown, the other being a mirror opposite) comprises one rectangular bar stock leg 172 (preferably aluminum) having welded to its upper end a horizontal tab 174 that for assembly purposes inserts inside one open end of the cross beam tube 164, and wherein the other leg 178 is metal rod (preferably aluminum) with both ends provided with a section 182 of external screw thread that, for assembly purposes, the lower end 182 screws into the threaded socket of a spherical foot 184 and the upper end 182 screws into a threaded socket for it in the horizontal tab 174.

Figure 21:
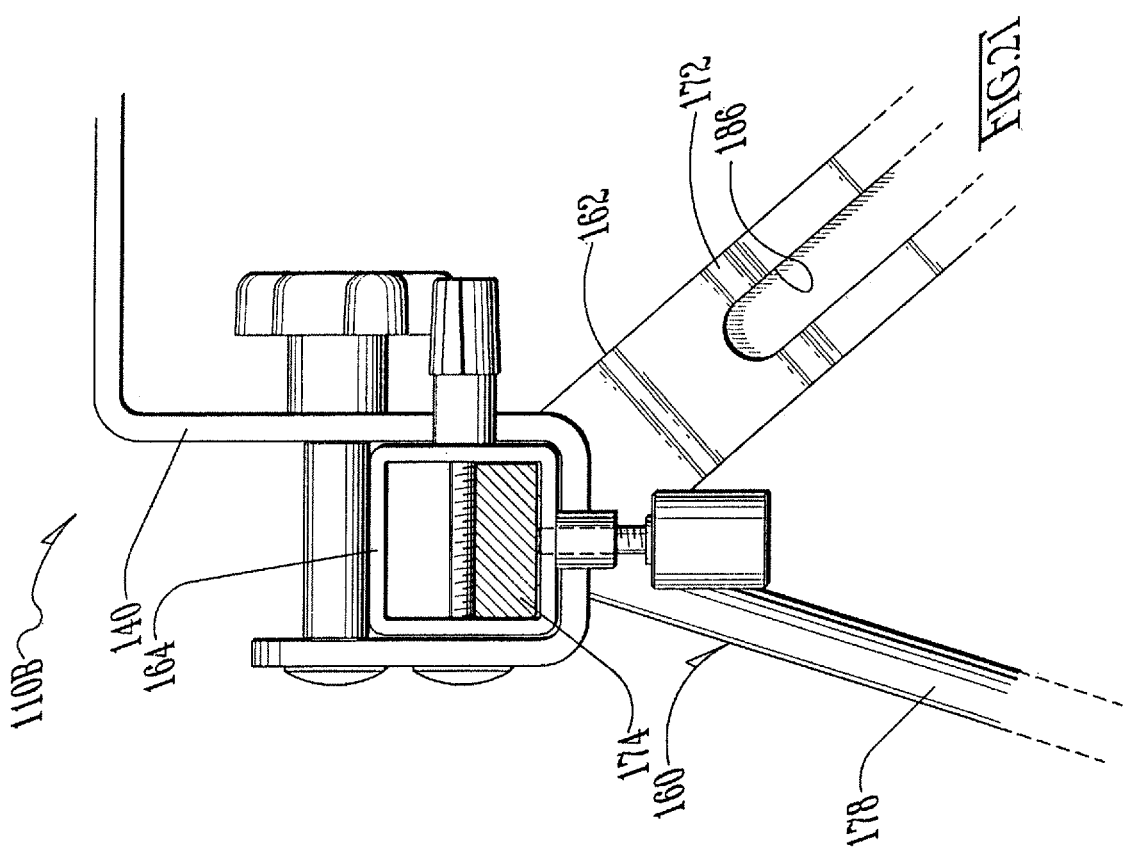
FIG. 21 is an enlarged-scale section view taken along line XXI-XXI shown in FIG. 18, wherein returning to FIG. 20, during disassembly and storage in a collapsed state, the rod leg is unscrews from both its spherical foot and the tab that is monolithic with the bar leg, and here in this FIG. 21 the bar leg is shown recessed with a closed end channel in which the taken apart rod leg nests, and both bar legs are slid into the square tubular cross beam during storage:—the horizontal tabs will lie outside the cross beam and preferably their inboard ends have a small threaded stud affixed thereto for storage of the spherical ball feet.

FIG. 21 is an enlarged-scale section view taken along line XXI-XXI shown in FIG. 18, wherein returning to FIG. 20, during disassembly and storage in a collapsed state, the rod leg 178 is unscrews from both its spherical foot 184 and the tab 174 that is monolithic with the bar leg 172, and here in this FIG. 21 the bar leg 172 is shown recessed with a closed end channel 186 in which the taken apart rod leg 178 nests, and both bar legs 172 are slid into the square tubular cross beam 164 during storage:—the horizontal tabs 174 will lie outside the cross beam 164 and preferably their inboard ends have a small threaded stud 188 (see FIG. 29) affixed thereto for storage of the spherical ball feet 184.

Figure 22:
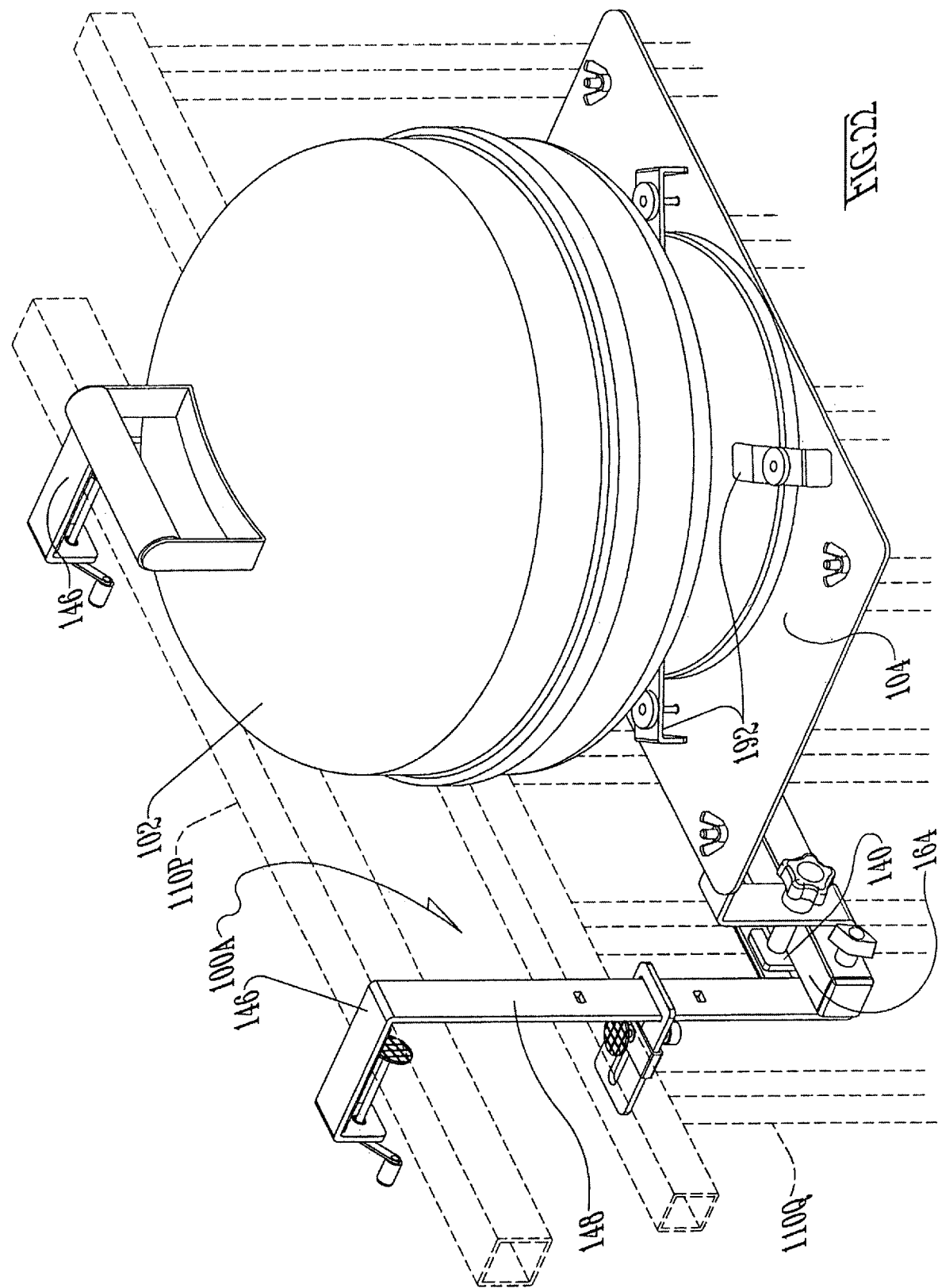
FIG. 22 is a perspective view comparable to FIG. 1 except showing the horizontal runs of the mounting brackets supporting a table panel in accordance with the invention, which in turn supports a grill that is clamped to the table top by means of setup-style clamp hardware.

FIG. 22 is a perspective view comparable to FIG. 1 except showing the horizontal runs 166 of the mounting brackets 140 supporting a table panel 104 in accordance with the invention, which in turn supports a grill 102 that is clamped to the table top 104 by means of setup-style clamp hardware 192.

Figure 23:
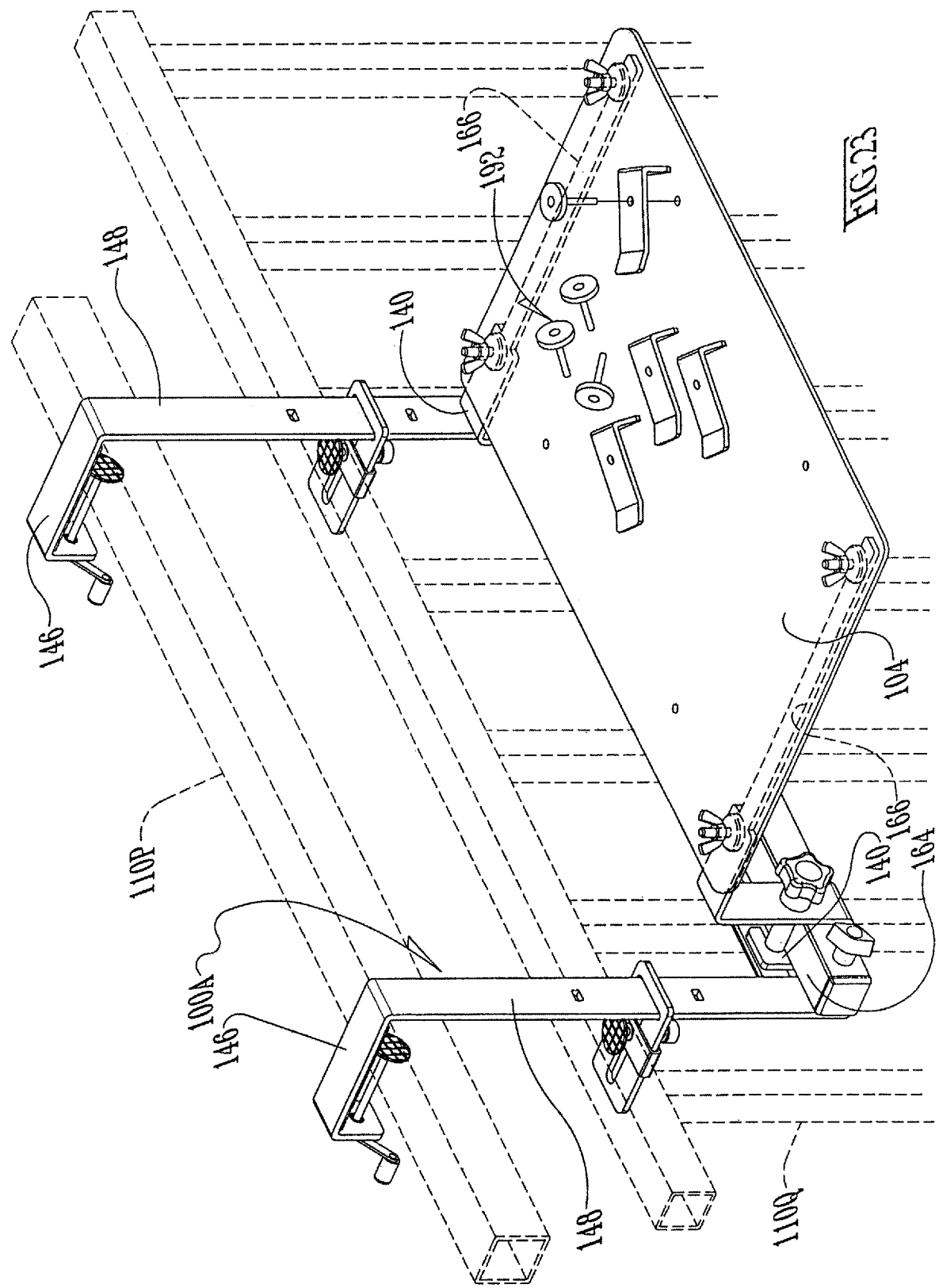
FIG. 23 is a perspective view of FIG. 22 except showing the grill removed from view and showing the setup-style clamp hardware laying in disassembly.

FIG. 23 is a perspective view of FIG. 22 except showing the grill 102 removed from view and showing the setup-style clamp hardware 192 laying in disassembly.

Figure 24:
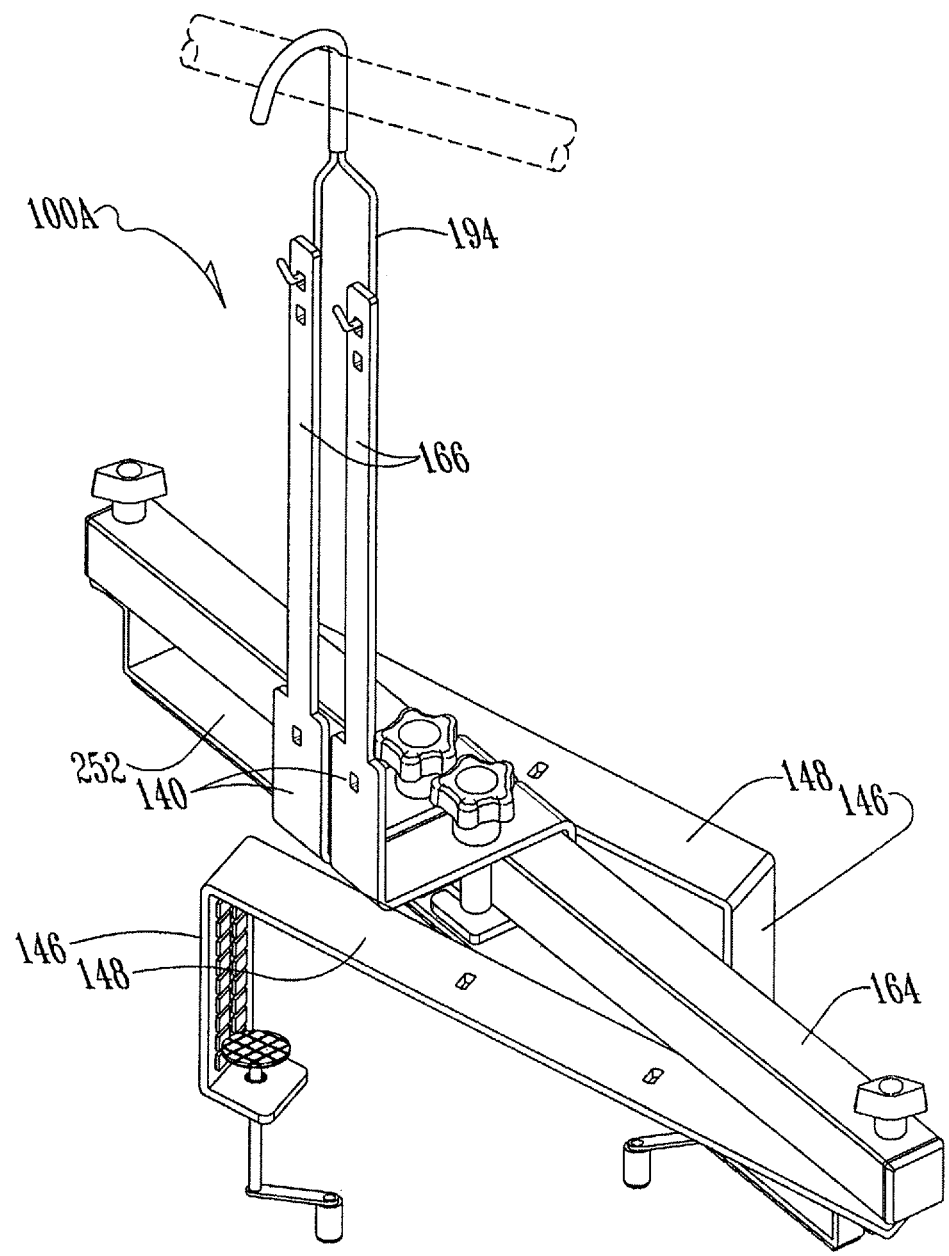
FIG. 24 is a perspective view of FIG. 23 except showing the table panel and setup-style clamp hardware removed from view, as well as showing the main cross beam spun a quarter of a turn counter-clockwise and with the hanging hooks folded relatively flush with the main cross beam and the horizontal brackets slid side-by-side each other to be hung in storage during non-use by a special hanger therefor.

FIG. 24 is a perspective view of FIG. 23 except showing the table panel 104 and setup-style clamp hardware 192 removed from view, as well as showing the main cross beam 164 spun a quarter of a turn counter-clockwise and with the hanging hooks 148 folded relatively flush with the main cross beam 164 and the horizontal brackets 140 slid side-by-side each other to be hung in storage during non-use by a special hanger 194 therefor.

Figure 25:
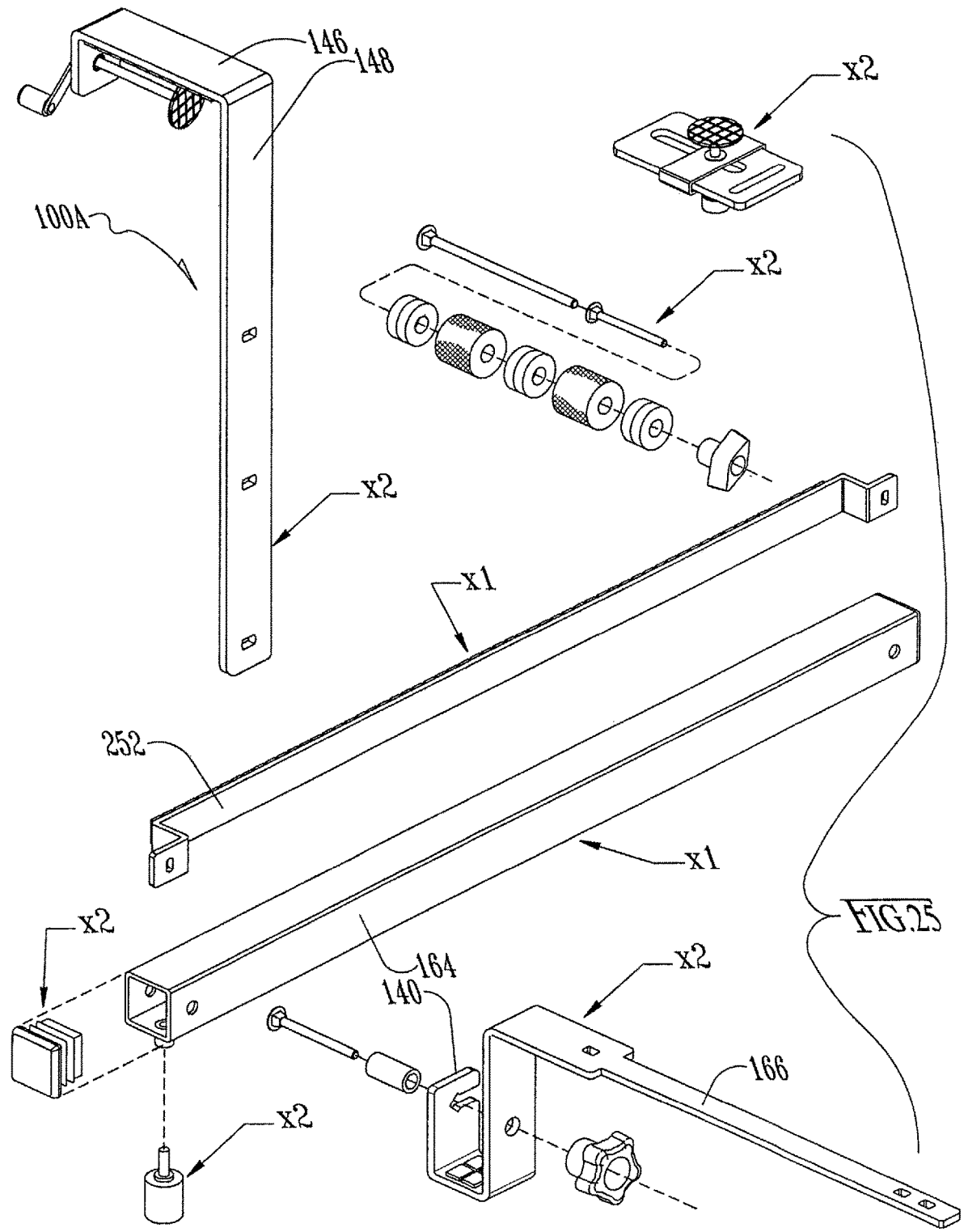
FIG. 25 is an exploded perspective view of FIG. 23, except with the table panel and setup-style clamp hardware removed from view.

FIG. 25 is an exploded perspective view of FIG. 23, except with the table panel 104 and setup-style clamp hardware 192 removed from view.

Figure 26:
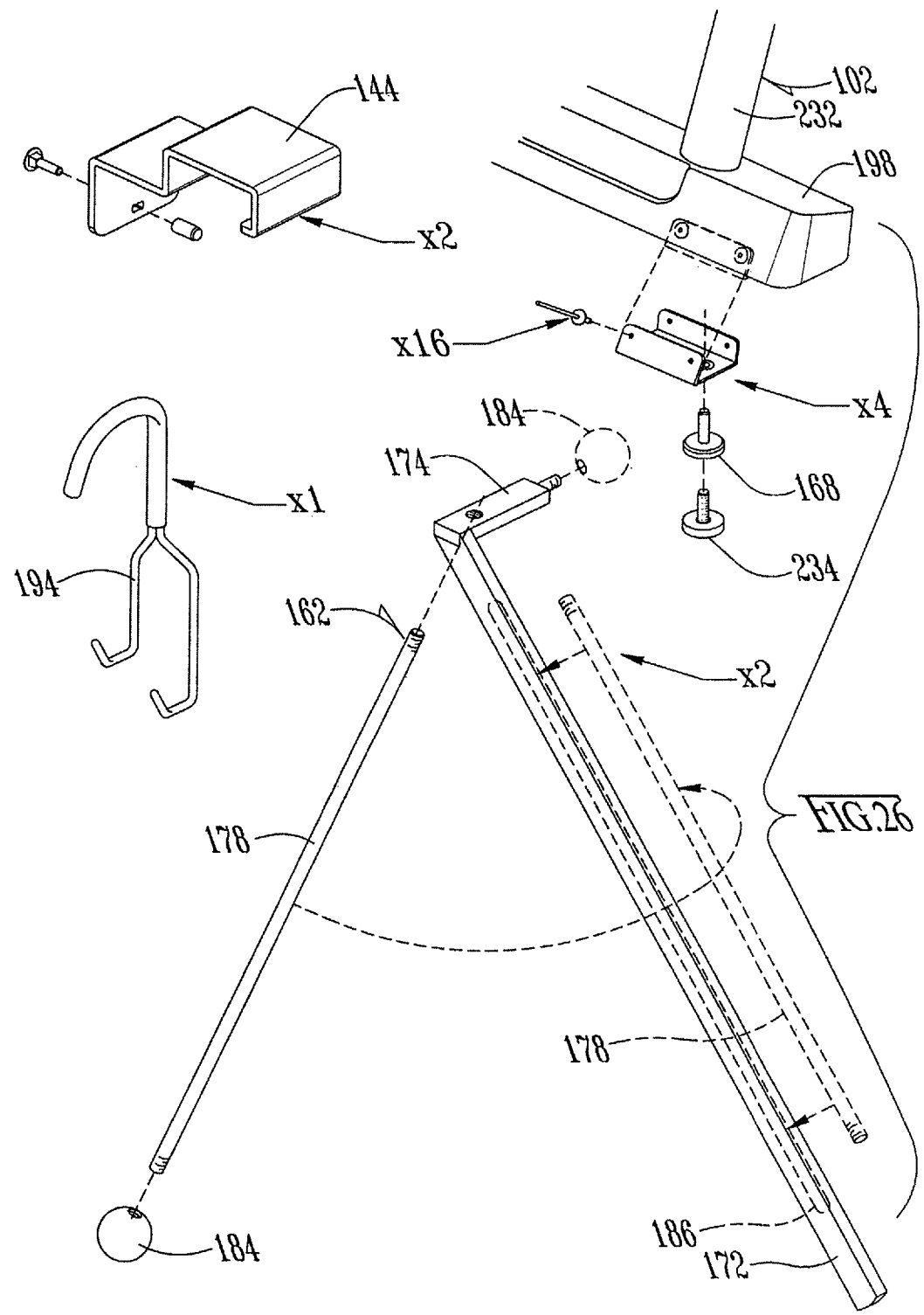
FIG. 26 is an exploded perspective view of FIG. 19 or 20 (at least in part in both cases), including showing how the rod leg of the inverted-V shaped leg assembly can be unscrewed from both the horizontal tab and the spherical foot and nest inside the closed channel therefor in the bar leg.

FIG. 26 is an exploded perspective view of FIG. 19 or 20 (at least in part in both cases), including showing how the rod leg 178 of the inverted-V shaped leg assembly 162 can be unscrewed from both the horizontal tab 174 and the spherical foot 184 and nest inside the closed channel 186 therefor in the bar leg 172.

Figure 27:
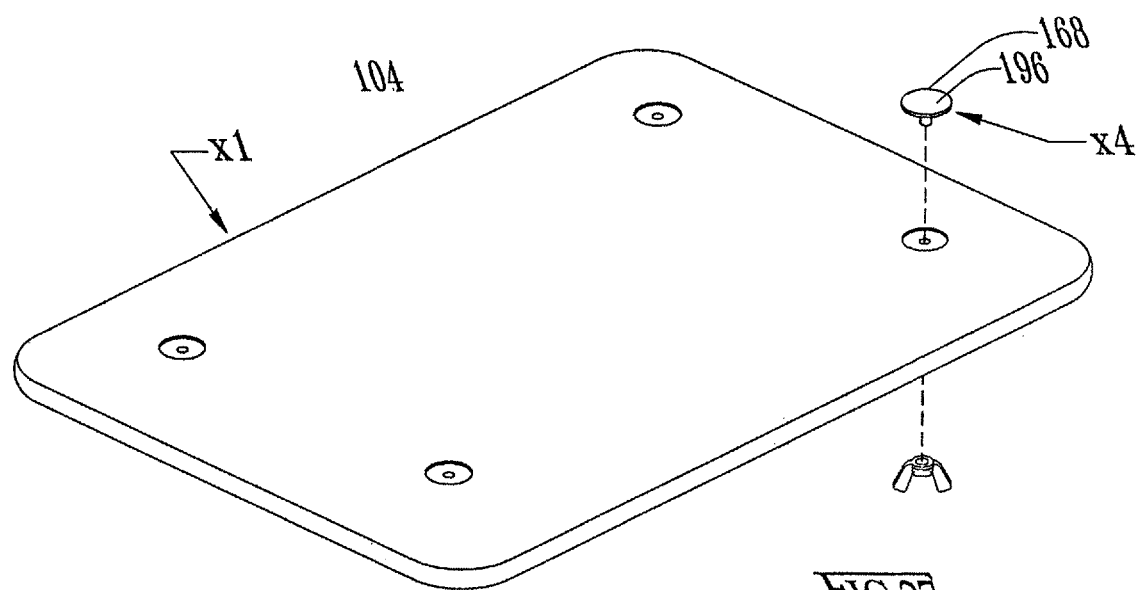
FIG. 27 is a perspective view of the table panel of FIG. 17 showing manner of fastening the table panel to the horizontal runs of the mounting brackets (not in view) by elevator bolts (eg., wide flat head, and preferably all-thread rather than square-shouldered), wherein the heads are a ferromagnetic steel material and hence provide mating surfaces for magnets under or inside of the bunks of the grill.
Figure 38:
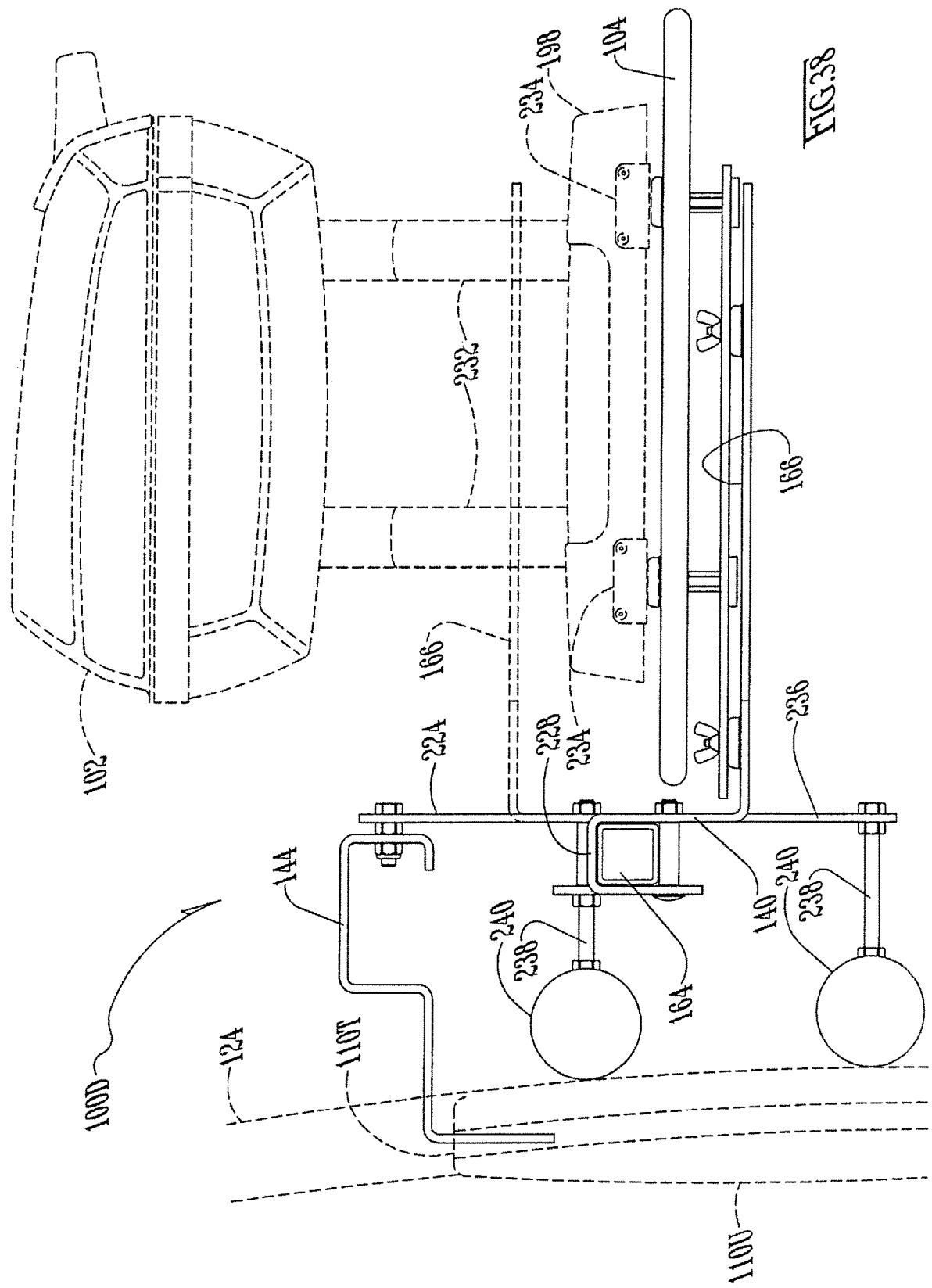
FIG. 38 is a side elevational view taken in the direction of arrows XXXVIII-XXXVIII in FIG. 37.
Figure 39:
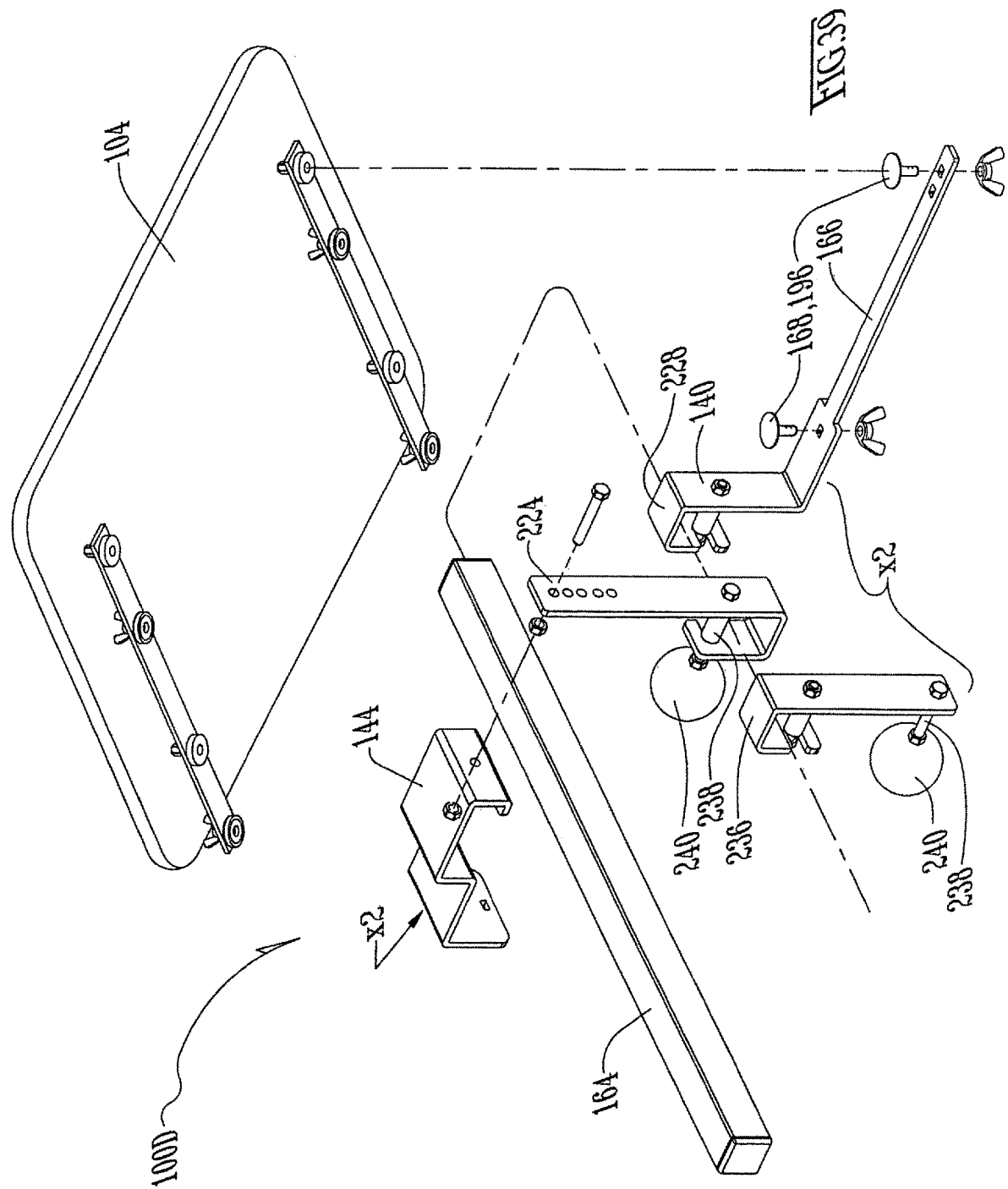
FIG. 39 is an exploded perspective view of FIG. 37, except with the table panel shown in solid lines.

FIG. 27 is a perspective view of the table panel 104 of FIG. 17 showing manner of fastening the table panel 104 to the horizontal runs 166 of the mounting brackets 140 (not in view) by elevator bolts 168 (eg., wide flat head, and preferably all-thread rather than square-shouldered), wherein the heads 196 of the elevator bolts 168 are a ferromagnetic steel material and hence provide mating surfaces for magnets (eg., magnetic shoes 234 indicated in FIGS. 36 and 38) under or inside of the bunks 198 of the grill 102.

Figure 28:
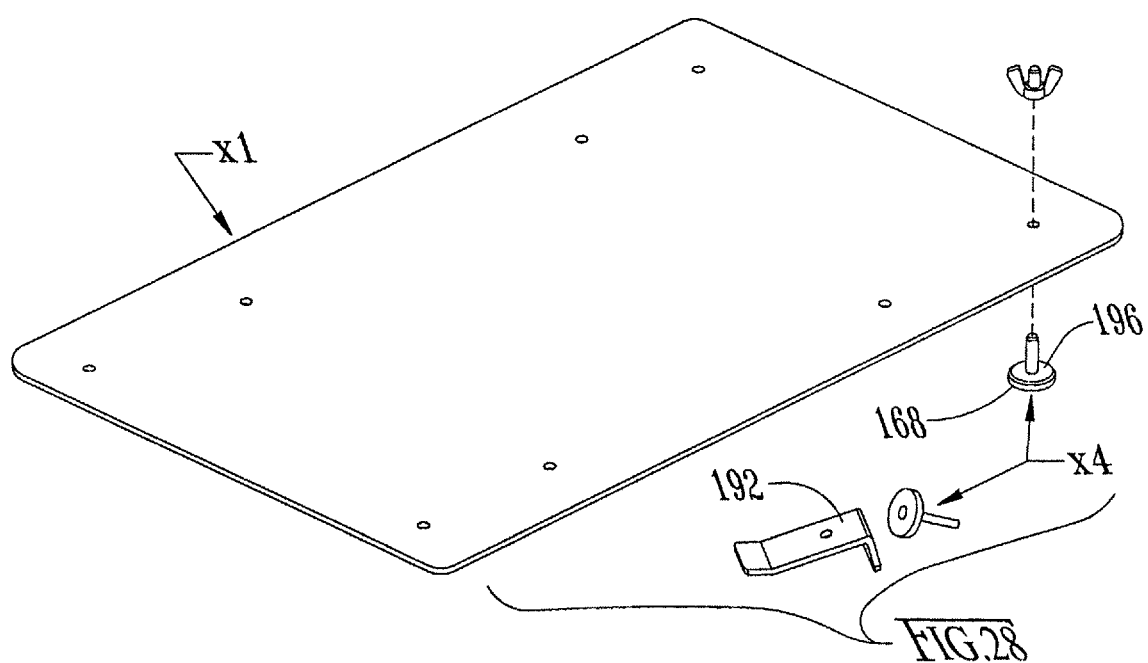
FIG. 28 is a perspective view of FIG. 27 except inverted and including showing additional holes and the setup-style clamp hardware in disassembly.

FIG. 28 is a perspective view of FIG. 27 except inverted and including showing additional holes and the setup-style clamp hardware 192 in disassembly.

Figure 29:
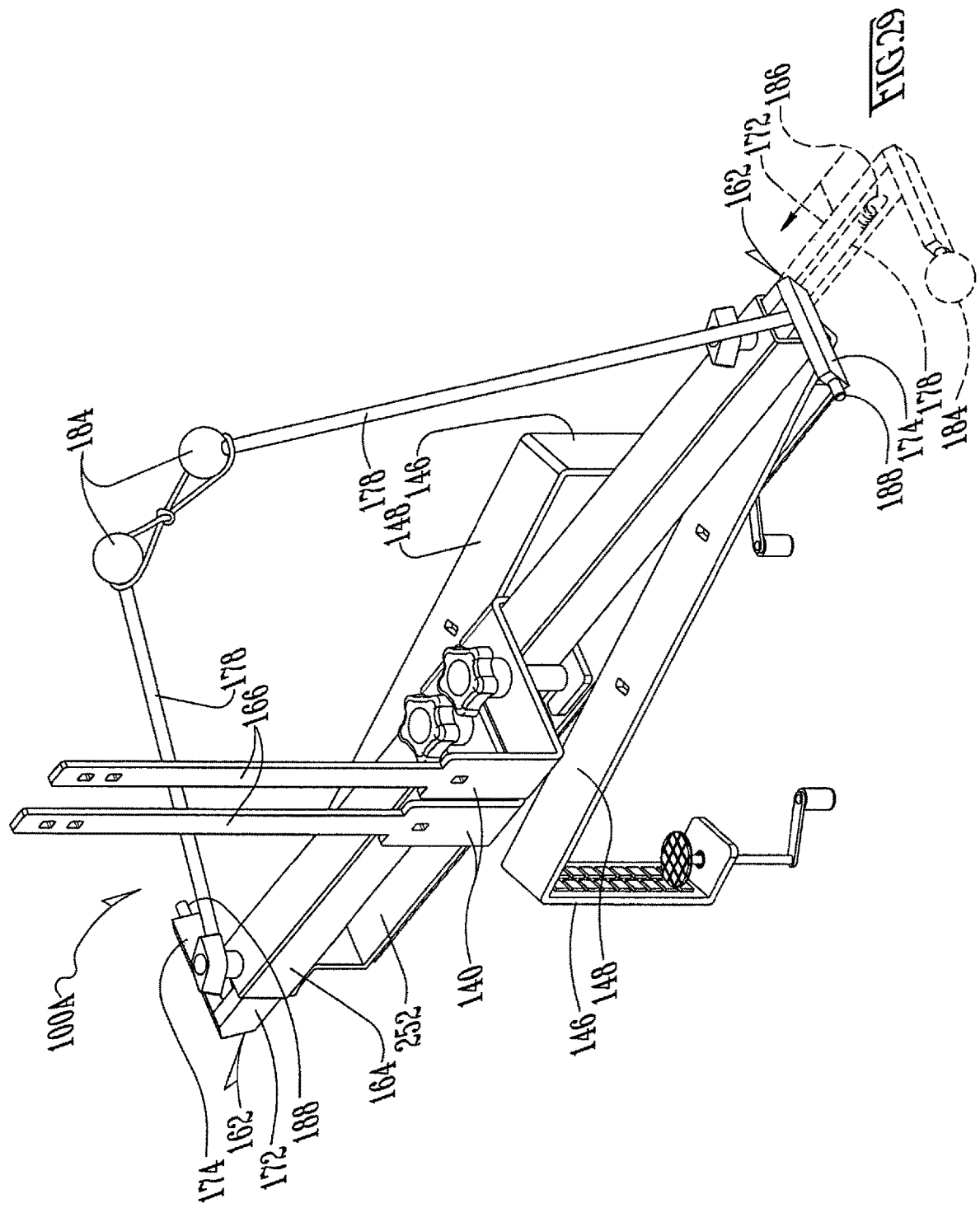
FIG. 29 is a perspective view combining parts of FIGS. 24 and 26, except showing in broken lines the sawhorse-resembling collapsible leg structure as disassembled as shown in FIG. 26 and stored slid inside the cross beam:— alternatively, the inverted-V shaped leg assemblies can be stored as shown in solid lines.

FIG. 29 is a perspective view combining parts of FIGS. 24 and 26, except showing in broken lines the sawhorse-resembling collapsible leg structure 160 as disassembled as shown in FIG. 26 and stored slid inside the cross beam 164:—alternatively, the inverted-V shaped leg assemblies 162 can be stored as shown in solid lines.

Figure 30:
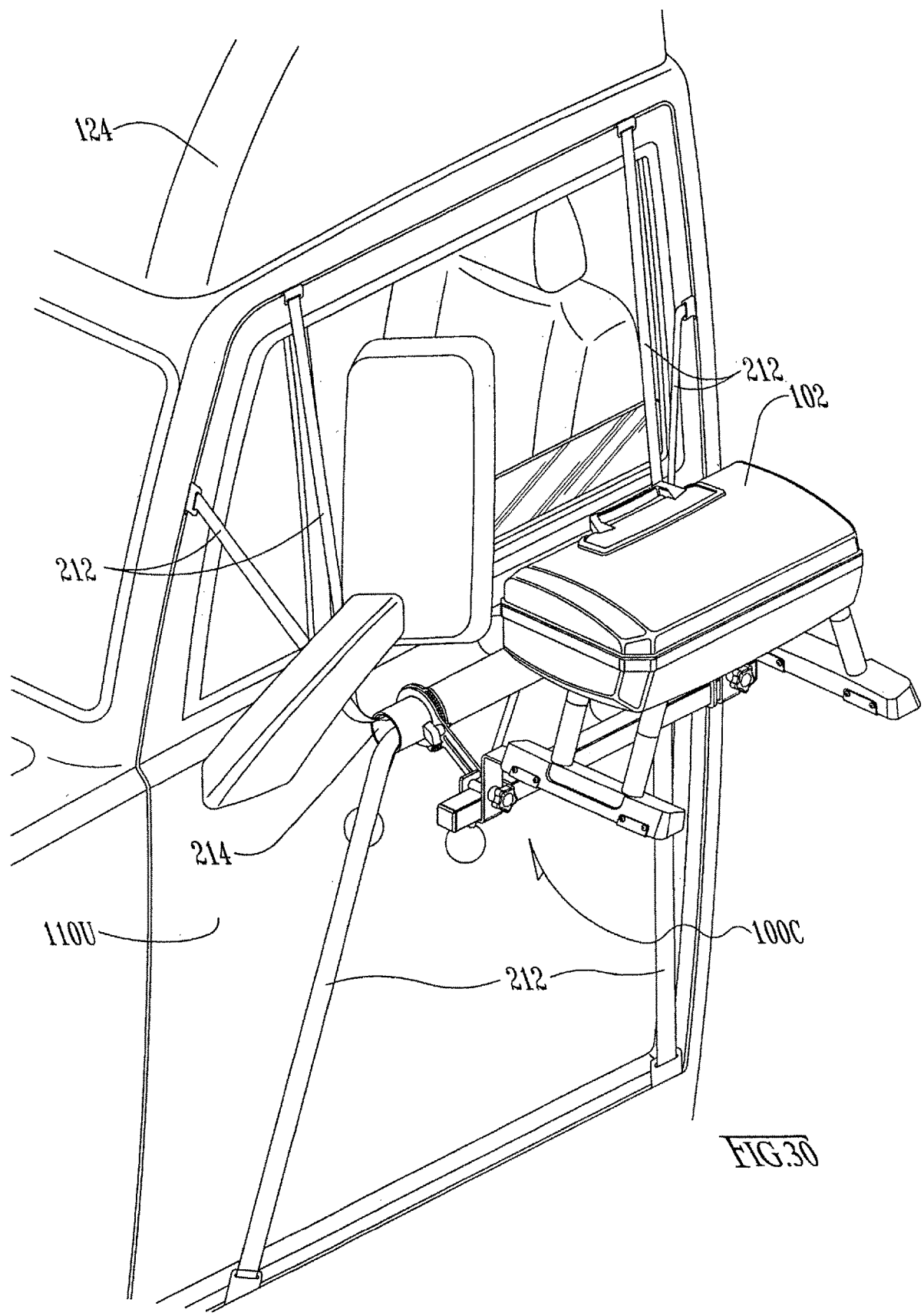
FIG. 30 is a perspective view comparable to FIG. 12 except showing and alternate embodiment of a cooking apparatus/food service table support system in accordance with the invention for the particular environment of hanging off the side of a passenger door of a motor vehicle, wherein the hanger provisions which hook into the sill of the window opening are eliminated and are here replaced by tethering straps.

FIG. 30 is a perspective view comparable to FIG. 12 except showing an alternate embodiment of a cooking apparatus/food service table support system 100C in accordance with the invention for the particular environment of hanging off the side of a passenger door 110U of a motor vehicle 124, wherein the hanger provisions 144 and 146 which hook into the sill 110T of the window opening 132 are eliminated and are here replaced by tethering straps 212.

Figure 31:
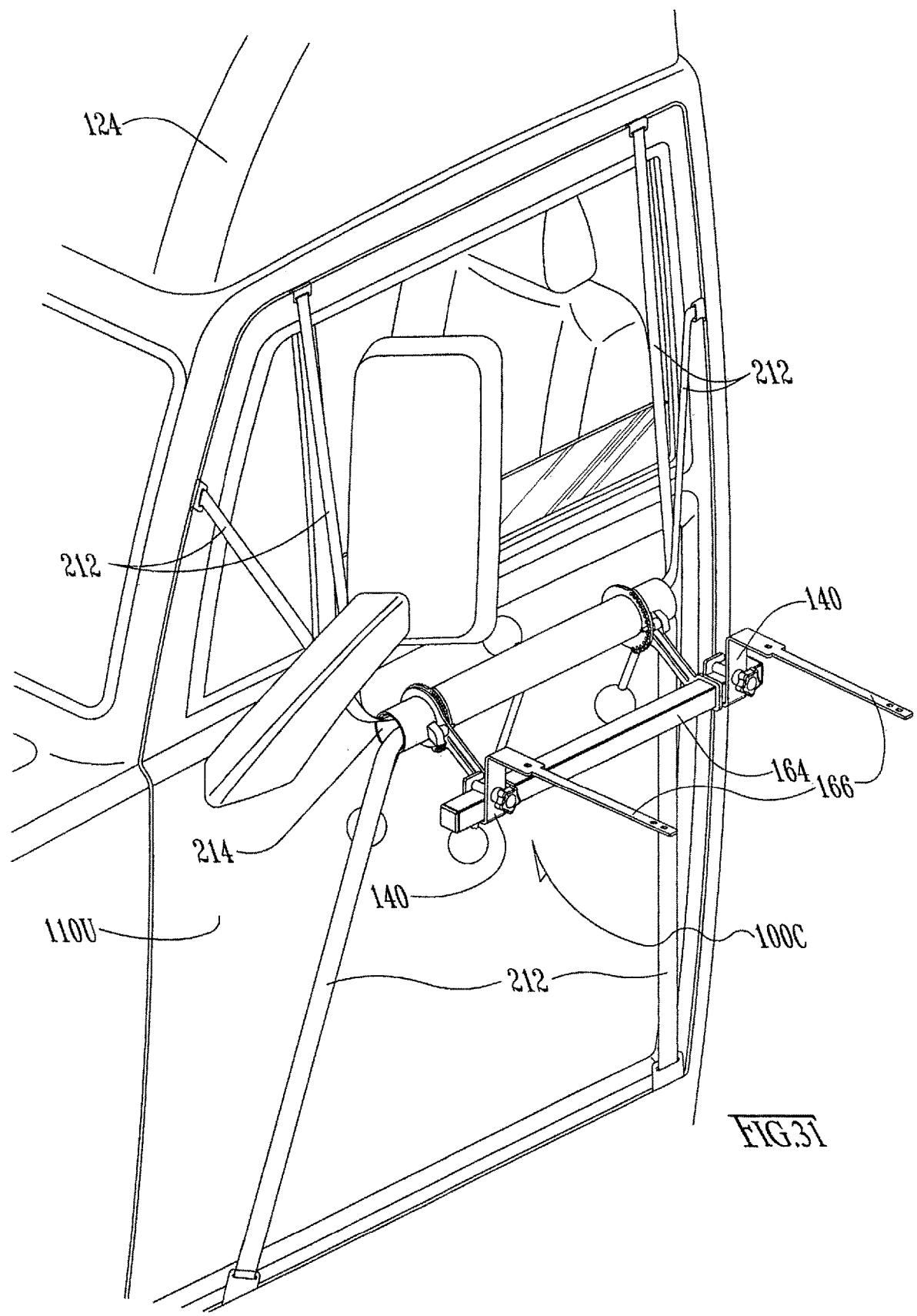
FIG. 31 is a perspective view comparable to FIG. 30 except with the grill removed from view.

FIG. 31 is a perspective view comparable to FIG. 30 except with the grill 102 removed from view.

Figure 32:
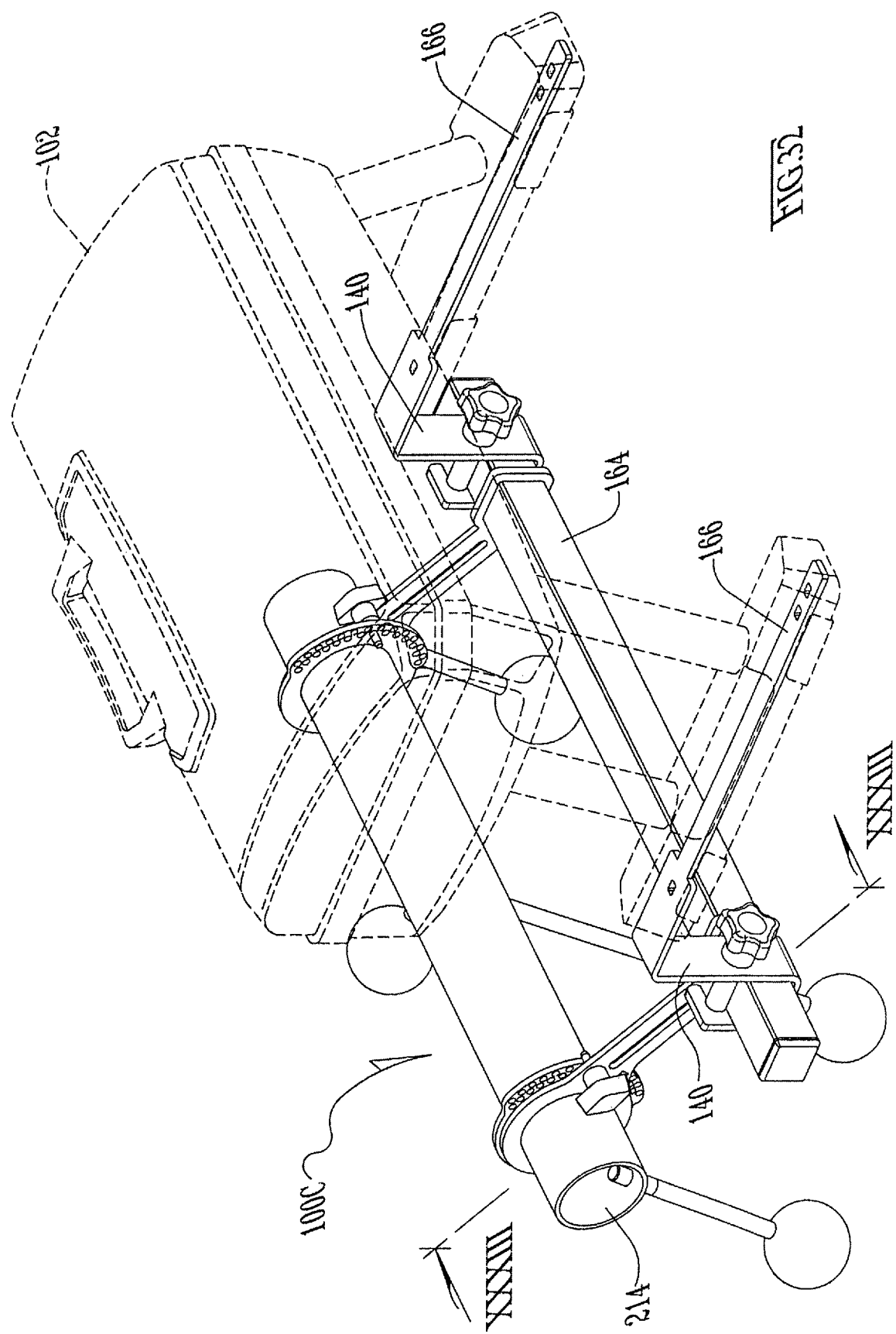
FIG. 32 is an enlarged-scale perspective view of the cooking apparatus/food service table support system in accordance with the invention of FIG. 30 except with the motor vehicle and the tethering strap system removed from view, and, with the grill shown in broken lines.

FIG. 32 is an enlarged-scale perspective view of the cooking apparatus/food service table support system 100C in accordance with the invention of FIG. 30 except with the motor vehicle 124 and the tethering strap system 212 removed from view, and, with the grill 102 shown in broken lines.

Figure 33:
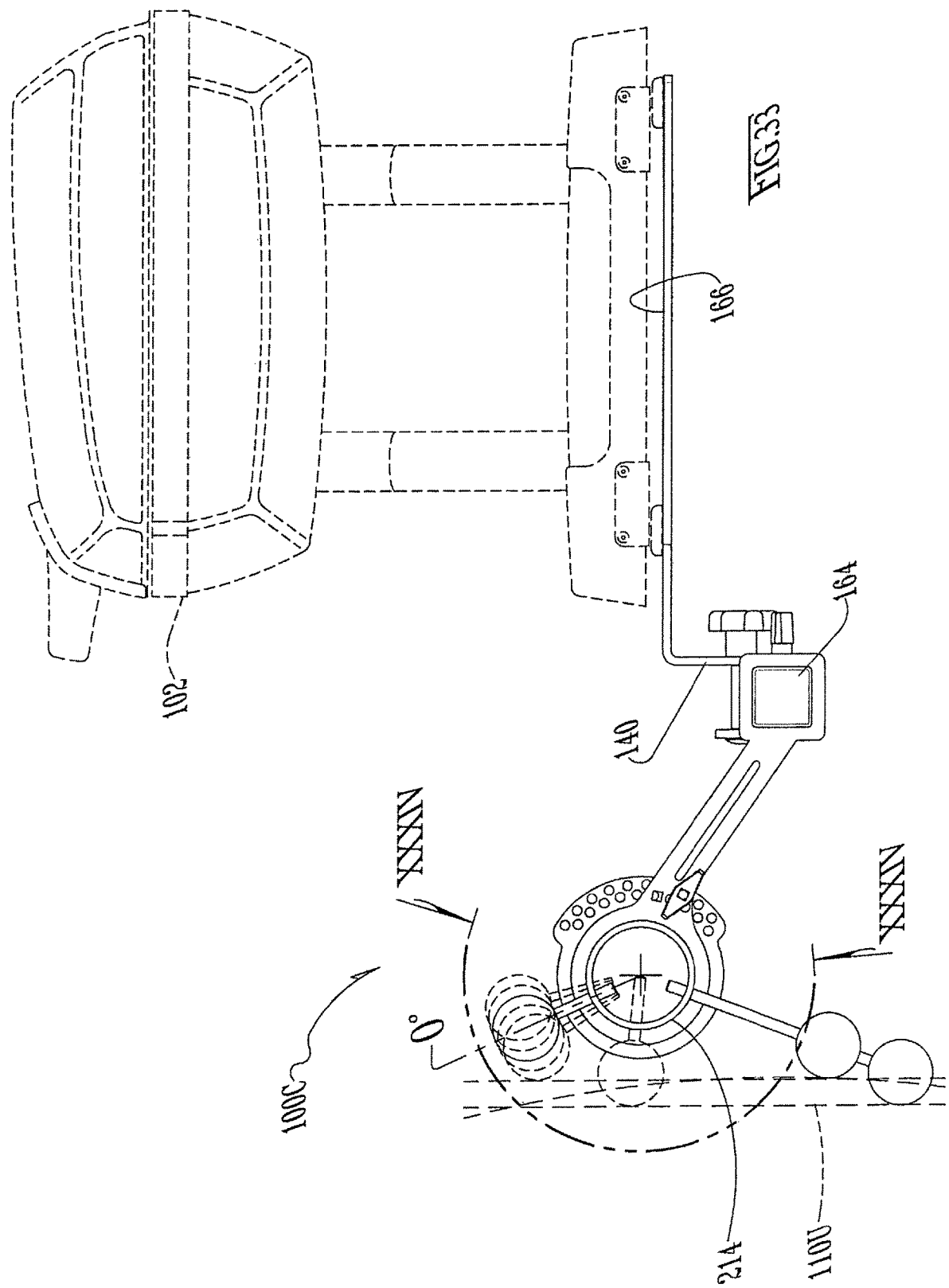
FIG. 33 is a side elevational view taken in the direction of arrows XXXIII-XXXIII in FIG. 32.

FIG. 33 is a side elevational view taken in the direction of arrows XXXIII-XXXIII in FIG. 32.

Figure 34:
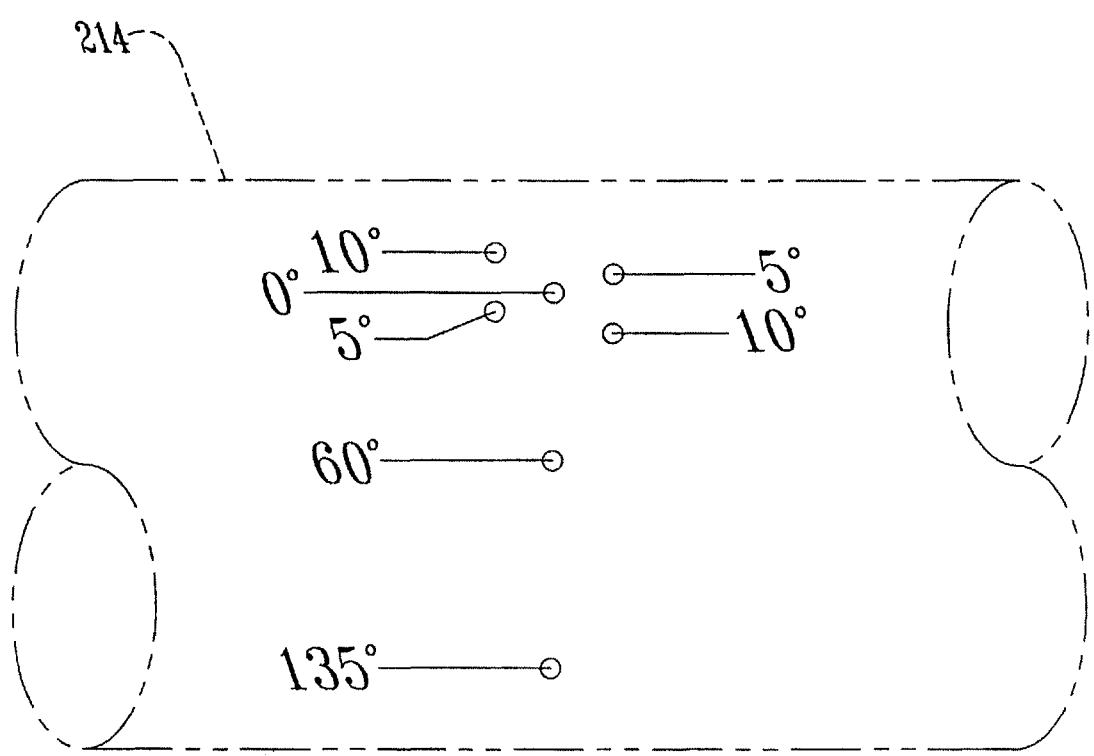
FIG. 34 is a flat pattern view obtained by unwrapping until flat the view taken by looking radially inward all along cylindrical surface XXXIV-XXXIV in FIG. 33.

FIG. 34 is a flat pattern view obtained by unwrapping until flat the view taken by looking radially inward all along cylindrical surface XXXIV-XXXIV of cylindrical cross bar 214 in FIG. 33.

Figure 35:
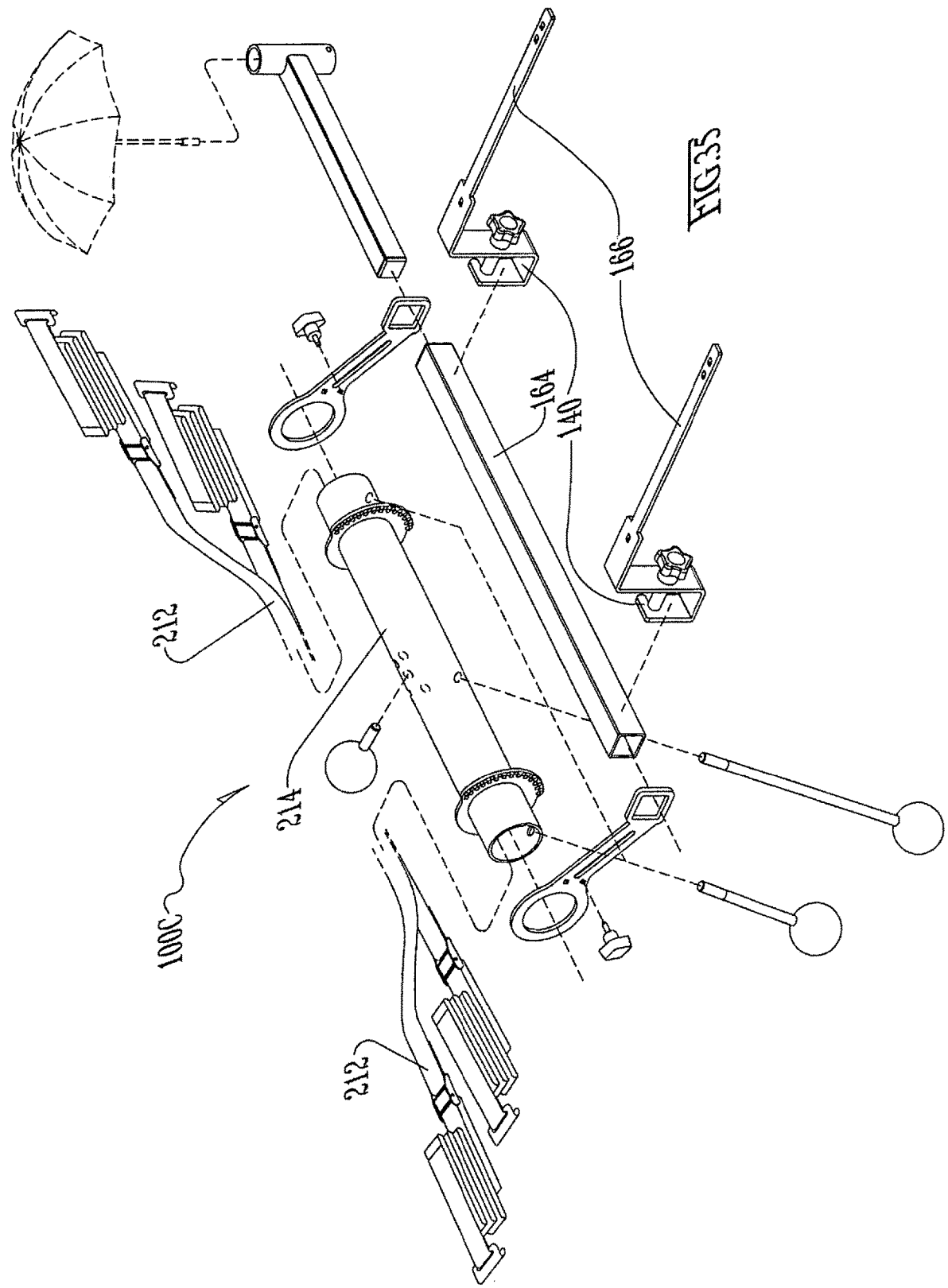
FIG. 35 is an exploded perspective view of FIG. 31, except with the motor vehicle removed from view.

FIG. 35 is an exploded perspective view of FIG. 31, except with the motor vehicle 124 removed from view.

To turn to FIGS. 36-39, these views show a cooking apparatus/food service table support system 100D in accordance with the invention for the particular environment of hanging off the side of a passenger door 110U of a motor vehicle 124.

The cooking apparatus/food service table support system 100D comprises a main cross beam 164, which can be produced from (for example) square steel tube, about one inch square and two feet in length (~sixty cm).

The cross beam 164 is hung by a spaced pair of inverted-J shaped vertical hangers 144 and 224 which have a columnar vertical run 224 terminating in upper hanger provisions 144 which hook into the sill 110T of the window opening 132, which can be produced (for example) from formed plate steel.

Affixed on the cross beam 164 are a spaced pair of horizontal brackets 140 which have elongated horizontal runs 166 extending away from fixture ends 228 affixed on the cross beam 164, and these too can be produced from formed plate steel.

Figure 37:
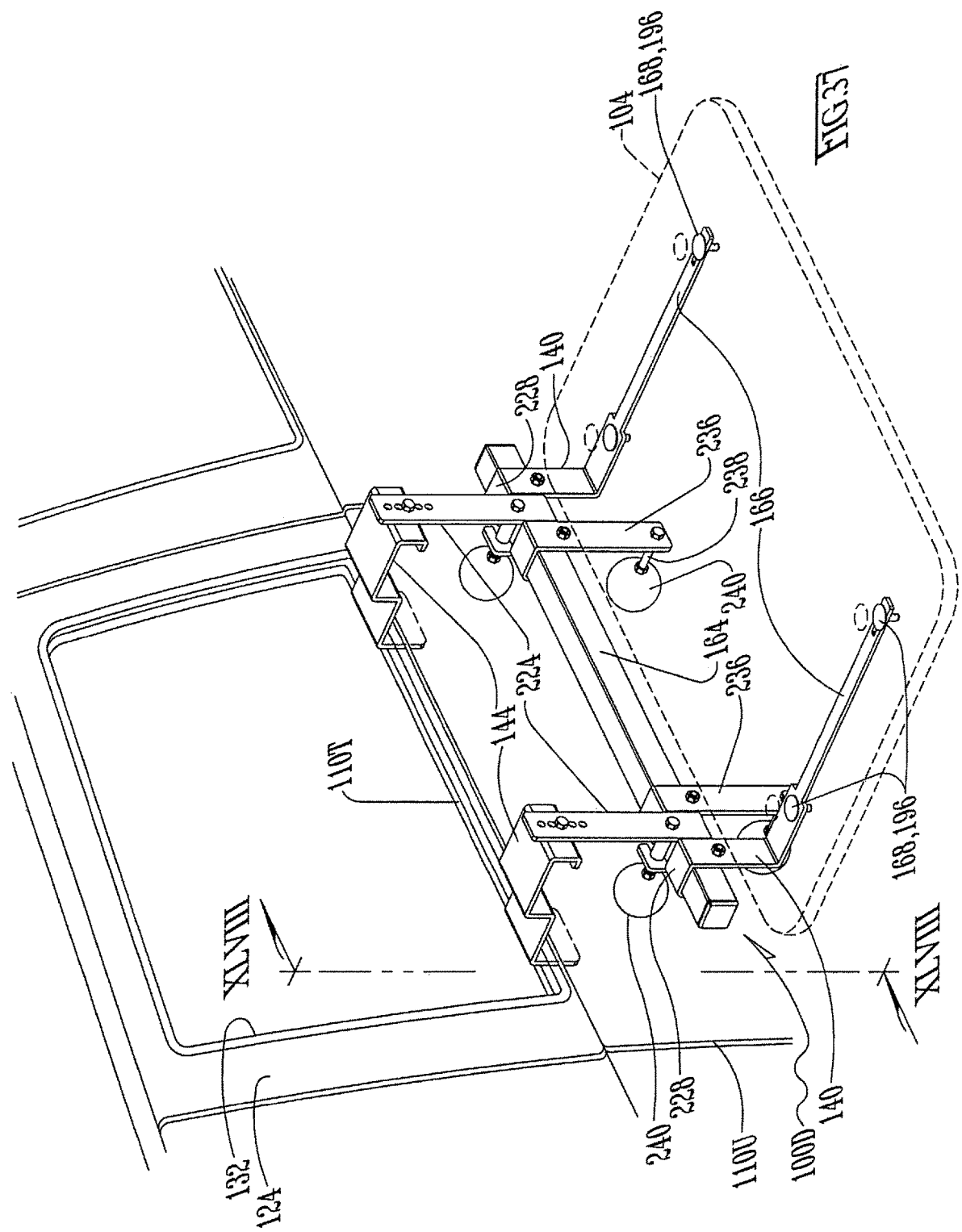
FIG. 37 is a perspective view comparable to FIG. 30 except with the grill removed from view, and, with the table top shown in broken lines.

The horizontal runs 166 extend away from the vehicle door 110U and can alternatively carry a grill 102 directly (see, eg., FIG. 1) or carry a table top 104 (as shown in FIG. 37) which can serve various food service functions, such as food preparation, grill support and so on.

It is preferred to fasten the table top 104 by elevator bolts 168, with their wide flat heads 196 exposed on the top of the table surface 104. The grill 102 has a left pair of legs 232 extending up from a left runner or bunk 198, and likewise a right pair of legs 232 extending up from a right runner or bunk 198. Each bunk 198 is provided with spaced pair of magnetic shoes 234. The elevator bolt 168 heads 196 and the magnetic shoes 234 are cooperatively spaced such that the magnetic shoes 234 land on the elevator bolt 168 heads 196. This provides a measure of coupling between the grill 102 and the cooking apparatus/food service table support system 100D in accordance with the invention.

The relative direction referred to here as the "inside" of the cooking apparatus/food service table support system 100D in accordance with the invention is the side closest to the door 110U. Arranged on the inside is support structure 224 and 236 for supporting four spaced ball mounts 238 which in turn carry elastomeric balls 240 for making contact with the vehicle door 110U but without damaging or marking the vehicle door 110U. The support structure can be any of the cross beam 164 directly, or structure 224 and 236 extending from the cross beam 164 including portions 224 of the vertical hanging provisions 144 and 224.

Figure 36:
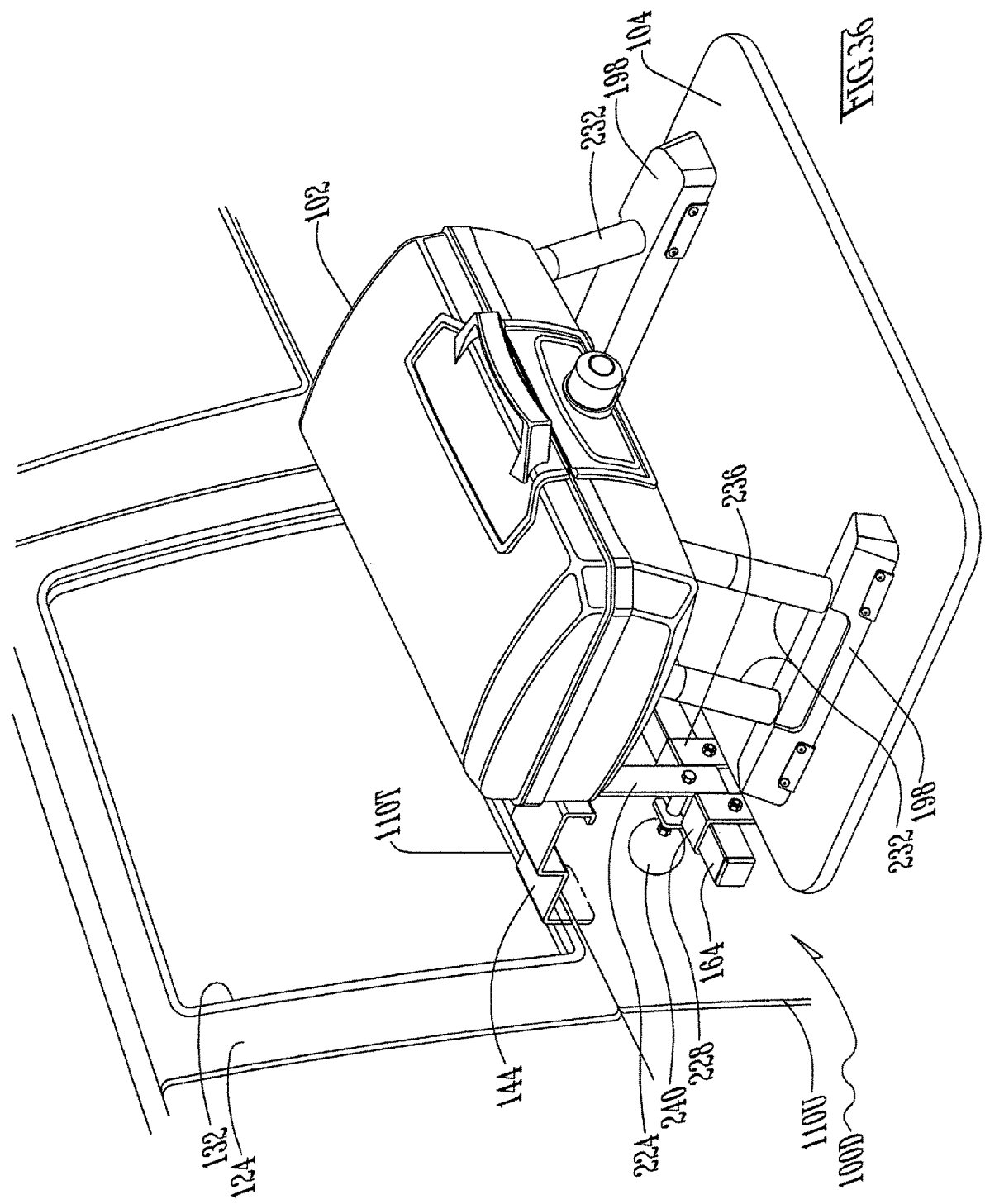
FIG. 36 is a perspective view comparable to FIG. 30 except of a second embodiment of a cooking apparatus/food service table support system in accordance with the invention for the particular environment of hanging off the side of a passenger door of a motor vehicle, wherein the hanger provisions of FIG. 12 return in part.
Figure 40:
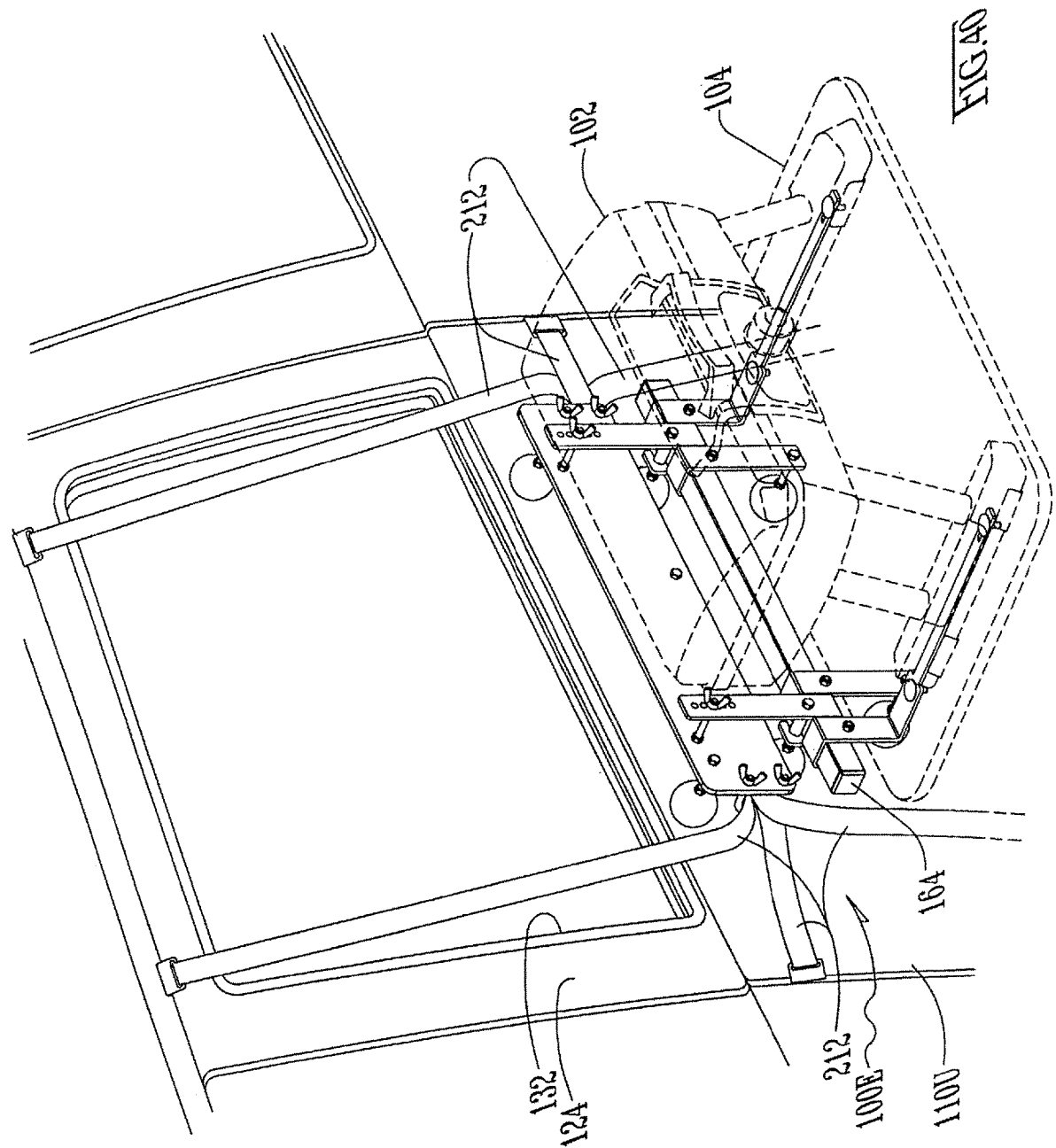
FIG. 40 is a perspective view comparable to FIG. 36 except of a fifth embodiment of a cooking apparatus/food service table support system in accordance with the invention for the particular environment of hanging off the side of a passenger door of a motor vehicle, wherein the strap tethering provisions of FIG. 30 return in part.
Figure 41:
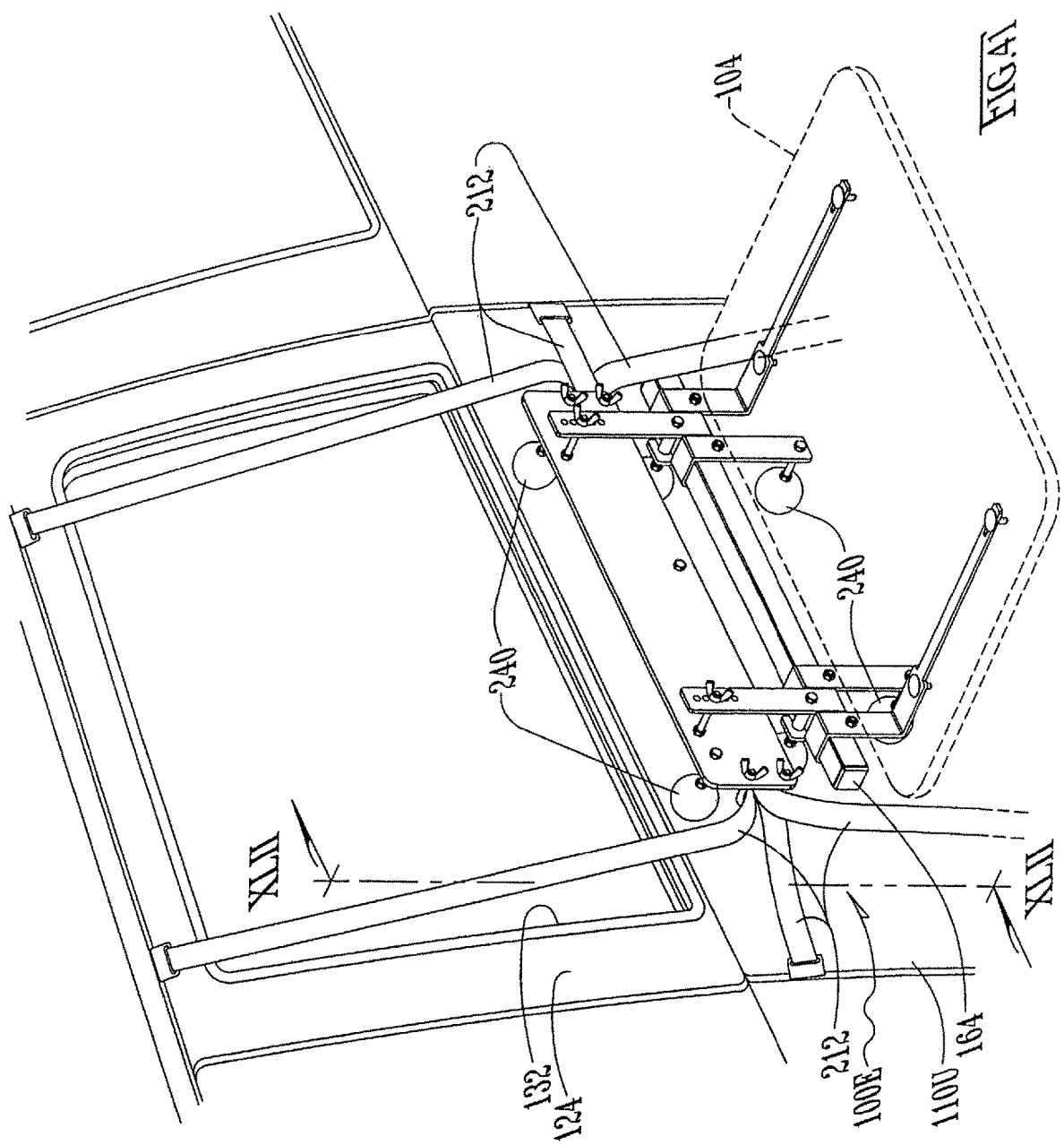
FIG. 41 is a perspective view comparable to FIG. 40 except with the grill removed from view, and, with the table top shown in broken lines.
Figure 42:
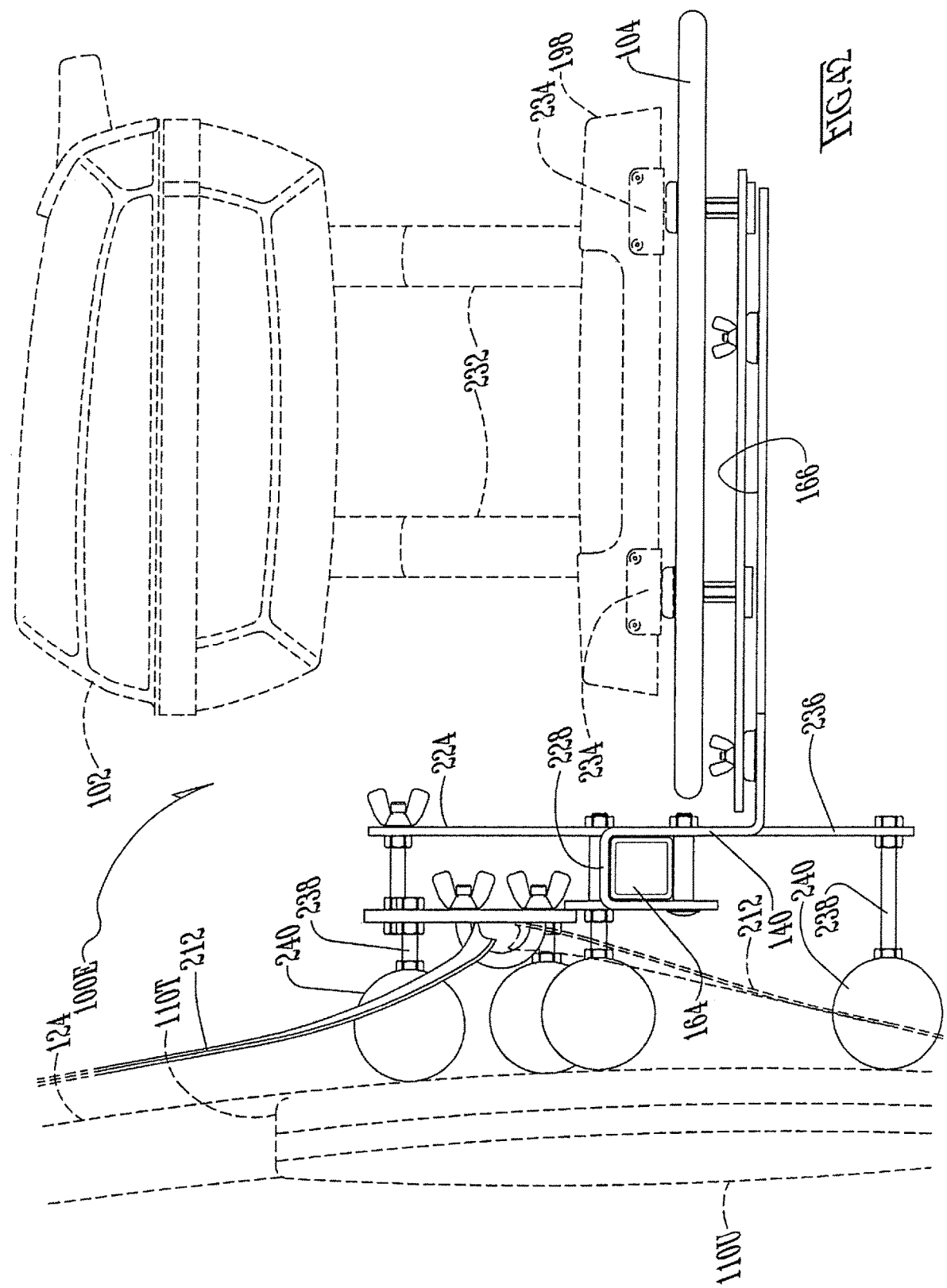
FIG. 42 is a side elevational view taken in the direction of arrows XLII-XLII in FIG. 41.

FIG. 40 is comparable to FIG. 36 except showing a fifth embodiment of a cooking apparatus/food service table support system 100E in accordance with the invention for the particular environment of hanging off the side of a passenger door 110U of a motor vehicle 124, wherein the strap tethering provisions 212 of FIG. 30 return in part. FIG. 41 is a perspective view comparable to FIG. 40 except with the grill 102 removed from view, and, with the table top 104 shown in broken lines. FIG. 42 is a side elevational view taken in the direction of arrows XLII-XLII in FIG. 41.

Figure 43:
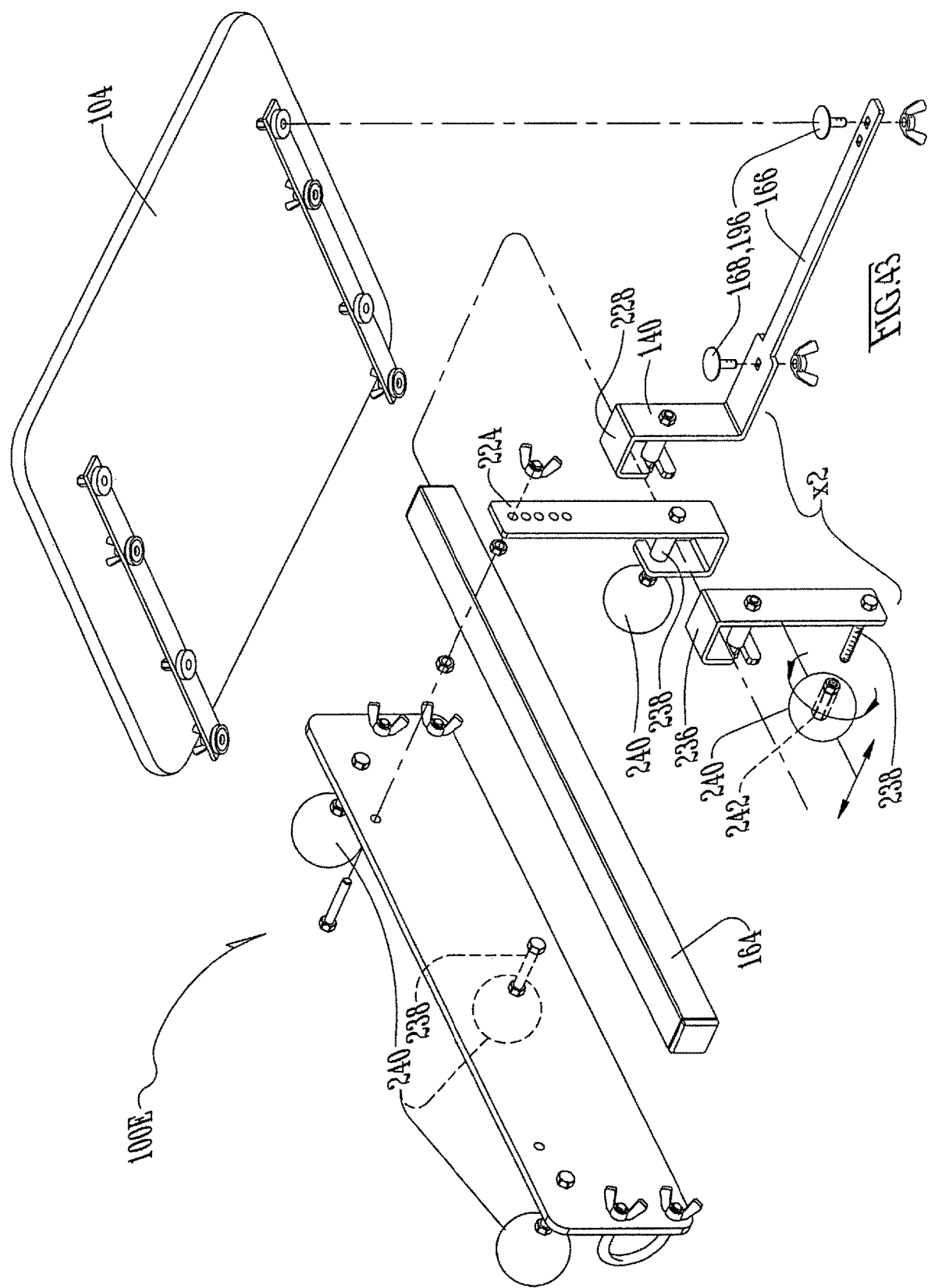
FIG. 43 is an exploded perspective view of FIG. 41, except with the table panel shown in solid lines.

The ball mounts 238 are the elongated threaded shanks (238) of machine screws. As better shown in FIG. 43, the elastomeric balls 240 themselves have internally-threaded tubular sockets 242 embedded in them. Hence the elastomeric balls 240 screw onto the machine screw threads 242 and are extended inward toward the vehicle door 110U. The elastomeric balls 240 are nominally two inches in diameter, and correspondingly the tubular sockets 242 are more or less two inches in length. The machine screw shanks 238 can be any length, but preferably any length greater than two inches. The length of the machine screw shanks 238 is chosen for fitting various classes of motor vehicle doors 110U, but the two inch length of the sockets 242 allows for adjustability for relative inward or outward locations and hence individual customization by the user to fit his or her vehicle door 110U better, and level out the grill 102 and/or table top 104.

The elastomeric balls 240 are disposed at the corners of an imaginary rectangle which is preferably wider than tall.

Figure 44:
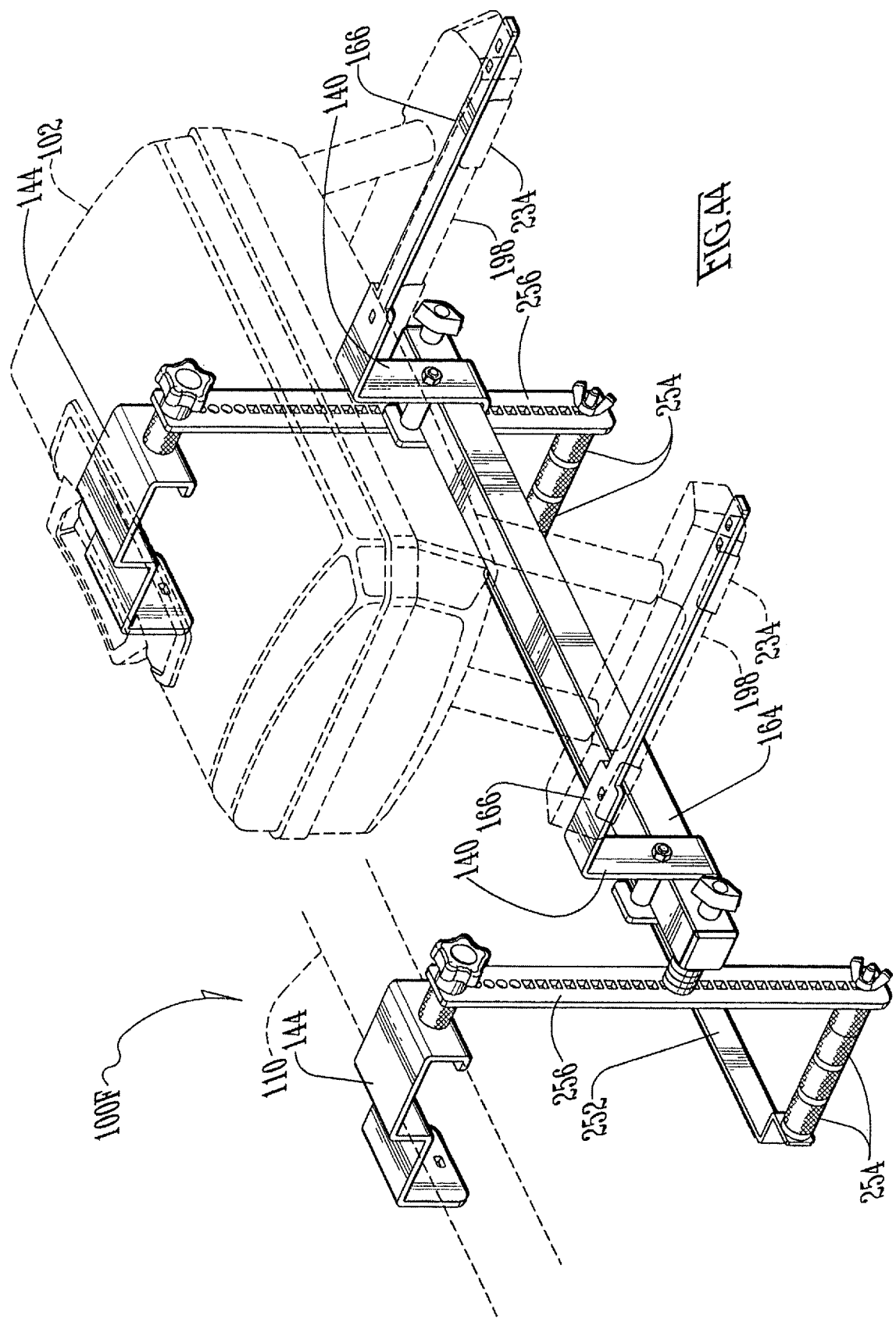
FIG. 44 is a perspective view comparable to any of FIG. 1, FIG. 12, FIG. 14, FIG. 22, FIG. 30, FIG. 36, FIG. 40 as well as others in this series representing a foldable bracket assembly in accordance with the invention for supporting a grill or table (eg., a cooking apparatus or else a food service table support system) for attaching to a supporting structure except of an additional embodiment, wherein the grill is shown in broken lines.

FIG. 44 is a perspective view comparable to any of FIG. 1, FIG. 12, FIG. 14, FIG. 22, FIG. 30, FIG. 36, FIG. 40 as well as others in this series representing a foldable bracket assembly 100F in accordance with the invention for supporting a grill 102 or table 104 (eg., a cooking apparatus/food service table support system 100F) for attaching to a supporting structure 110, except here, this is an additional embodiment. Wherein the grill 102 is shown in broken lines. The bracket assembly 100F is adjustable on three axes, eg., X-, Y- and Z- axis. The components can be individually adjusted to conform a multitude of irregular contours or surfaces 110P/110Q, 110T/110U, 110V/110W, 110X/110Y and so on, of a wide variety of support structures 110. The materials can be stainless, aluminum, and/or mild steels with tubes (generally rectangular or square), flats and machined components.

Figure 45:
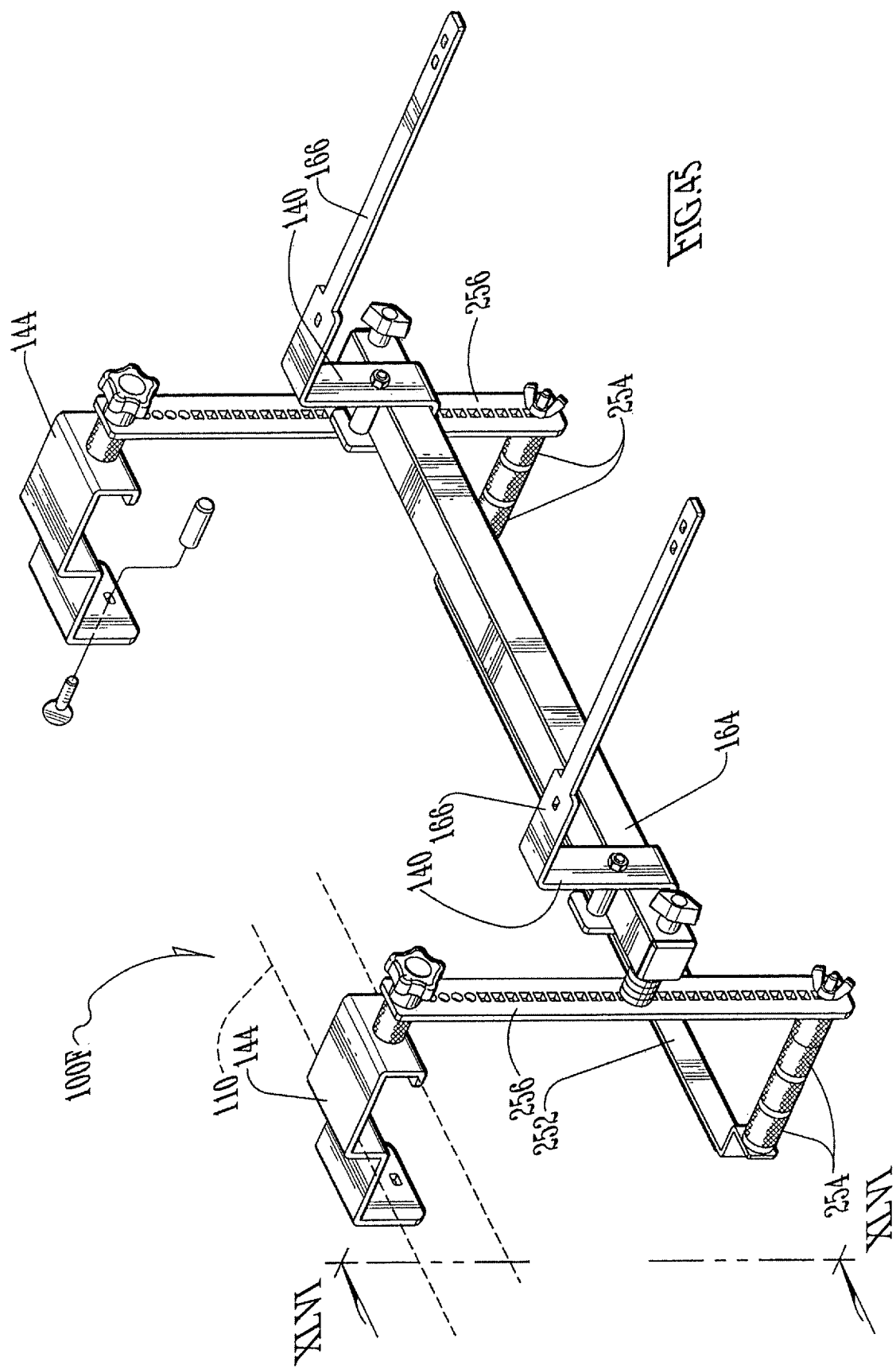
FIG. 45 is a perspective view comparable to FIG. 44, except with the grill removed from view.

FIG. 45 is a perspective view comparable to FIG. 44, except with the grill 102 removed from view. FIG. 45 shows the counter-balance beam 252 being extended inboard using machined bushings 254, which further displays adjustability by components.

Figure 46:
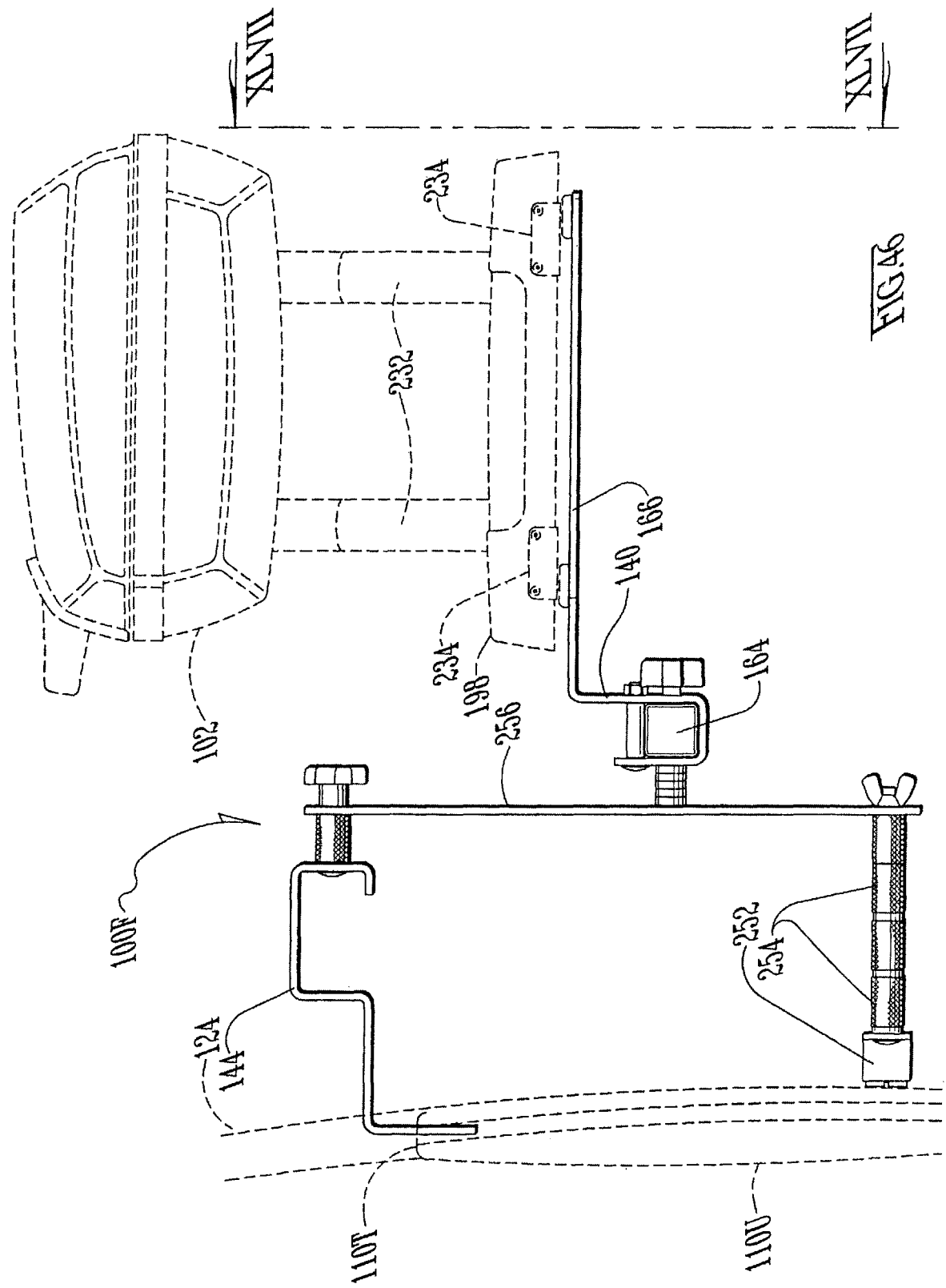
FIG. 46 is a side elevational view taken in the direction of arrows XLVI-XLVI in FIG. 45, and wherein the grill is returned to the view in broken lines.

FIG. 46 is a side elevational view taken in the direction of arrows XLVI-XLVI in FIG. 45, and wherein the grill 102 is returned to the view in broken lines. FIG. 46 shows the grill feet 198 having a magnet option 234 for magnetically coupling with the horizontal runs 166 of the grill bracket 140 (or heads 196 of elevator bolts 168 if those are used).

Figure 47:
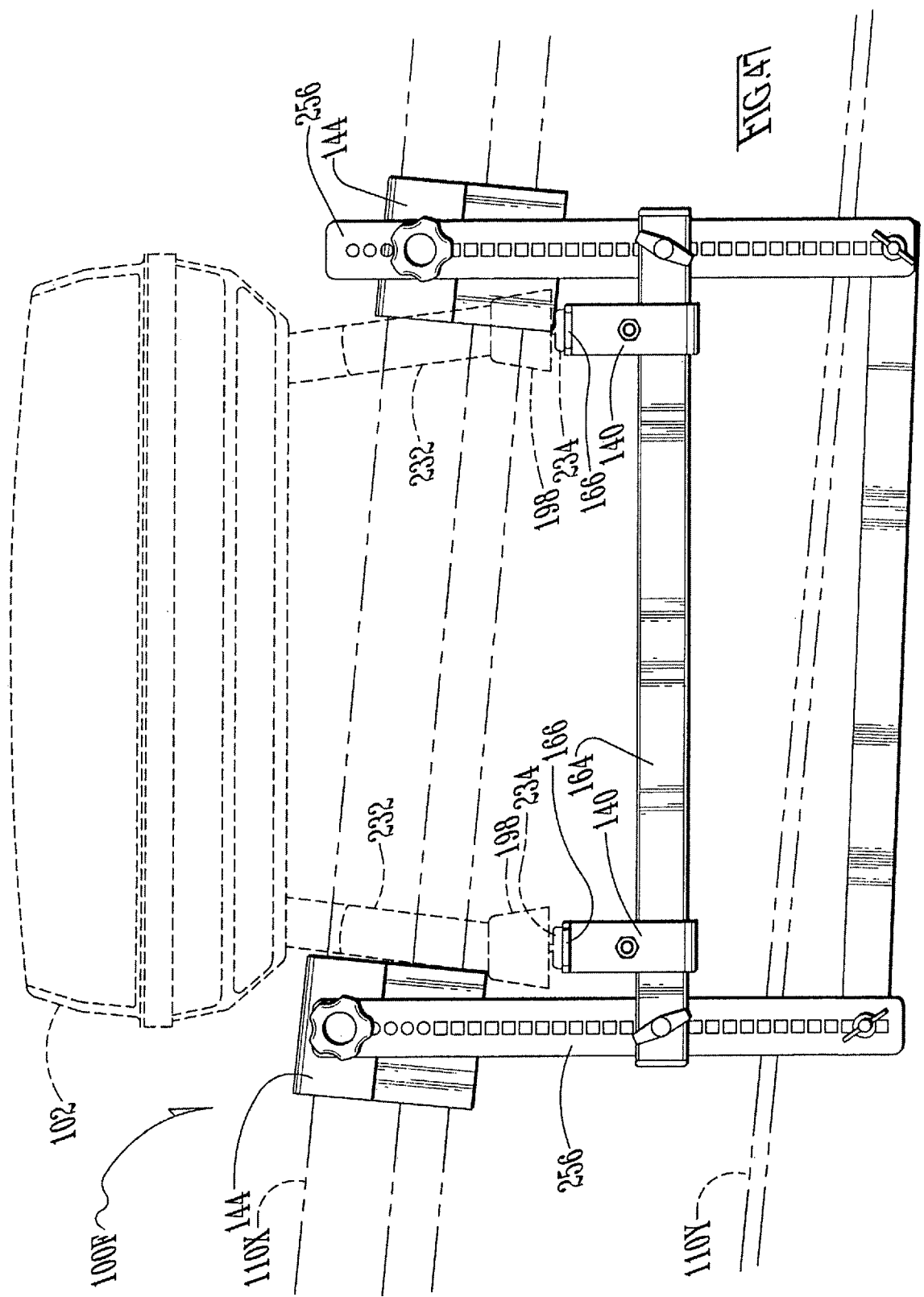
FIG. 47 is a side elevational view taken in the direction of arrows XLVII-XLVII in FIG. 46, and showing that the supporting structure in not horizontally level.

FIG. 47 is a side elevational view taken in the direction of arrows XLVII-XLVII in FIG. 46, and showing that the supporting structure 110P, 110T, 110V, 110X or the like is not horizontally level. FIG. 47 shows the left and right side arms 256 being independently adjusted to accommodate a structure like a boat gunwale 110X or the like. Also the counter-balance beam 252 is adjusted to fit flat against the contour 110Y.

Figure 48:
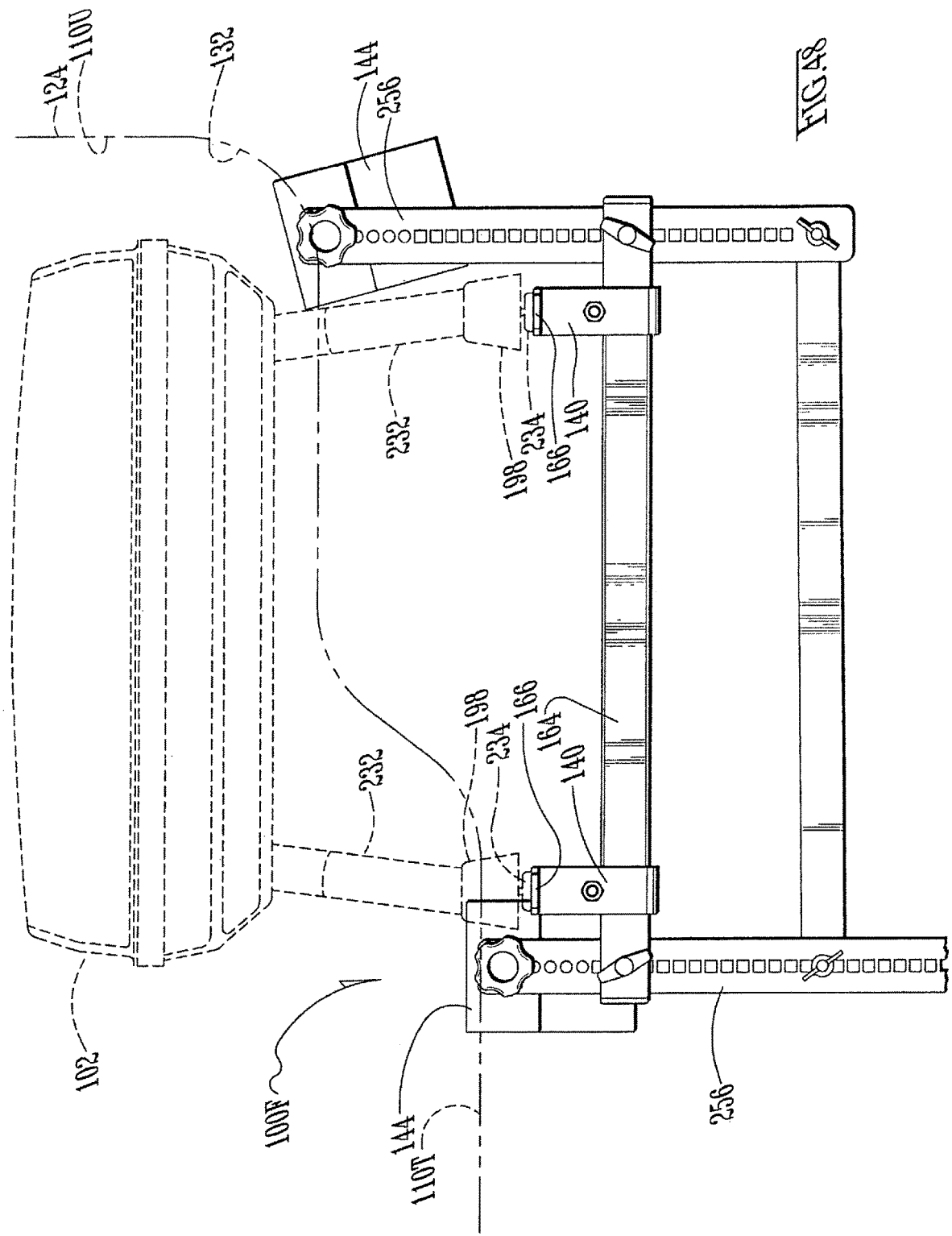
FIG. 48 is a side elevational view comparable to FIG. 47, except showing a different configuration of a non-horizontally level supporting structure which is shown in broken lines.

FIG. 48 is a side elevational view comparable to FIG. 47, except showing a different configuration of a non-horizontally level supporting structure 110P, 110T, 110V, 110X which is shown in broken lines. The contour 110T shown in FIG. 48 is similar to a FORD® pick-up truck 124 door window 132. Again this shows adjustability to conform to the contour 110T and 110U provided by the support structure 110. This is accomplished in part by the numerous components of the foldable bracket assembly 100F in accordance with the invention being independently adjustable, resulting in a level grill-support surface 104 and 166.

Figure 49:
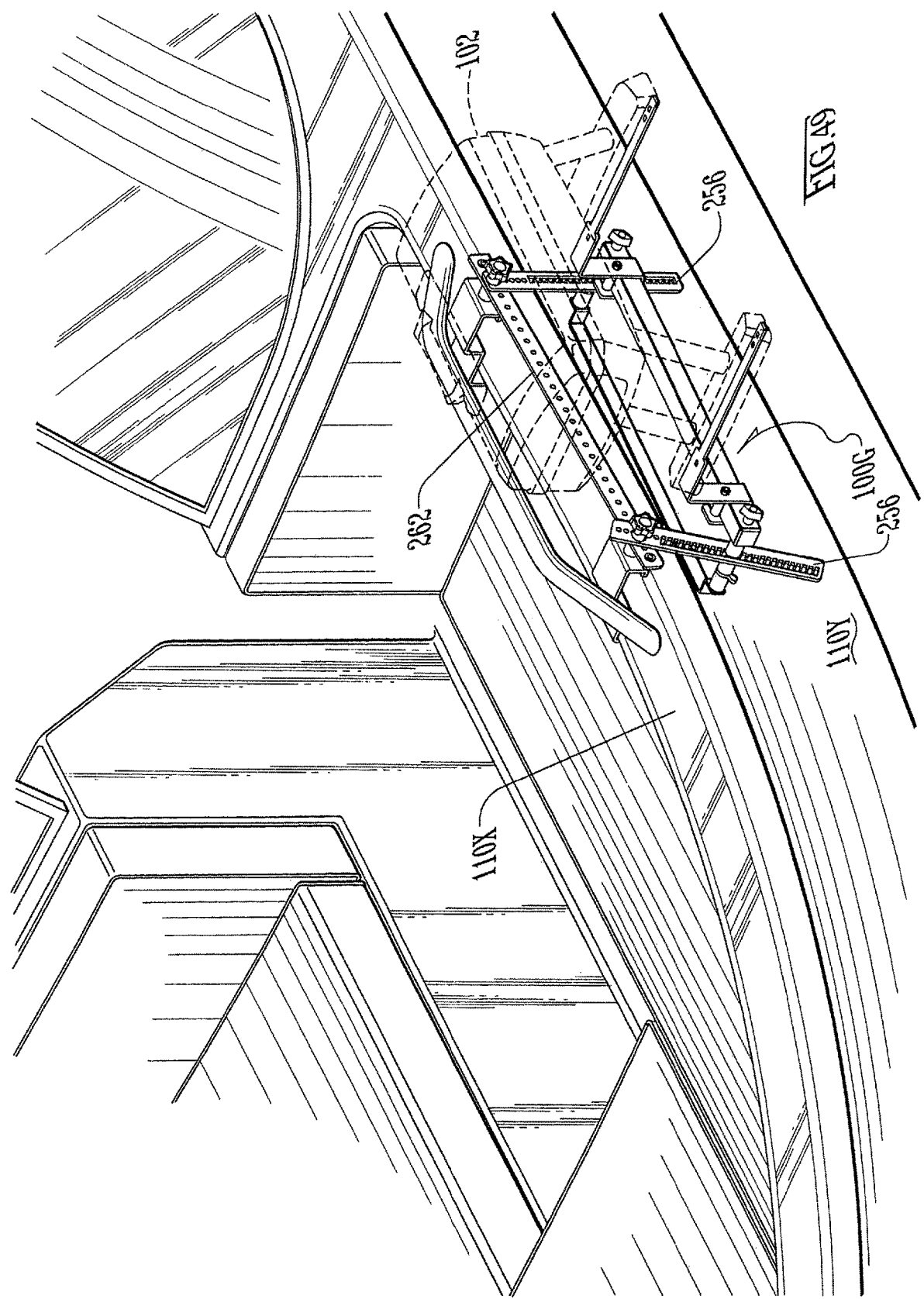
FIG. 49 is a perspective view comparable to any of FIG. 1, FIG. 12, FIG. 14, FIG. 22, FIG. 30, FIG. 36, FIG. 40, FIG. 44 as well as others in this series representing a foldable bracket assembly in accordance with the invention for supporting a grill or table (eg., a cooking apparatus or else a food service table support system) for attaching to a supporting structure except of a further embodiment, wherein the grill is shown in broken lines and the different configuration of a supporting structure hereof in this view is shown in solid lines.

FIG. 49 is a perspective view comparable to any of FIG. 1, FIG. 12, FIG. 14, FIG. 22, FIG. 30, FIG. 36, FIG. 40, FIG. 44 as well as others in this series representing a foldable bracket assembly 100G in accordance with the invention for supporting a grill 102 or table 104 (eg., a cooking apparatus/food service table support system 100G) for attaching to a supporting structure 110P/110Q, 110T/110U, 110V/110W, 110X/110Y and so on, except of a further embodiment, wherein the grill 102 is shown in broken lines and the different configuration of a supporting structure 110X and 110Y hereof in this view is shown in solid lines. FIG. 49 shows the adjustability with the addition of a spreader bar 262 that allows for tilting of the adjustable side arms 256.

Figure 50:
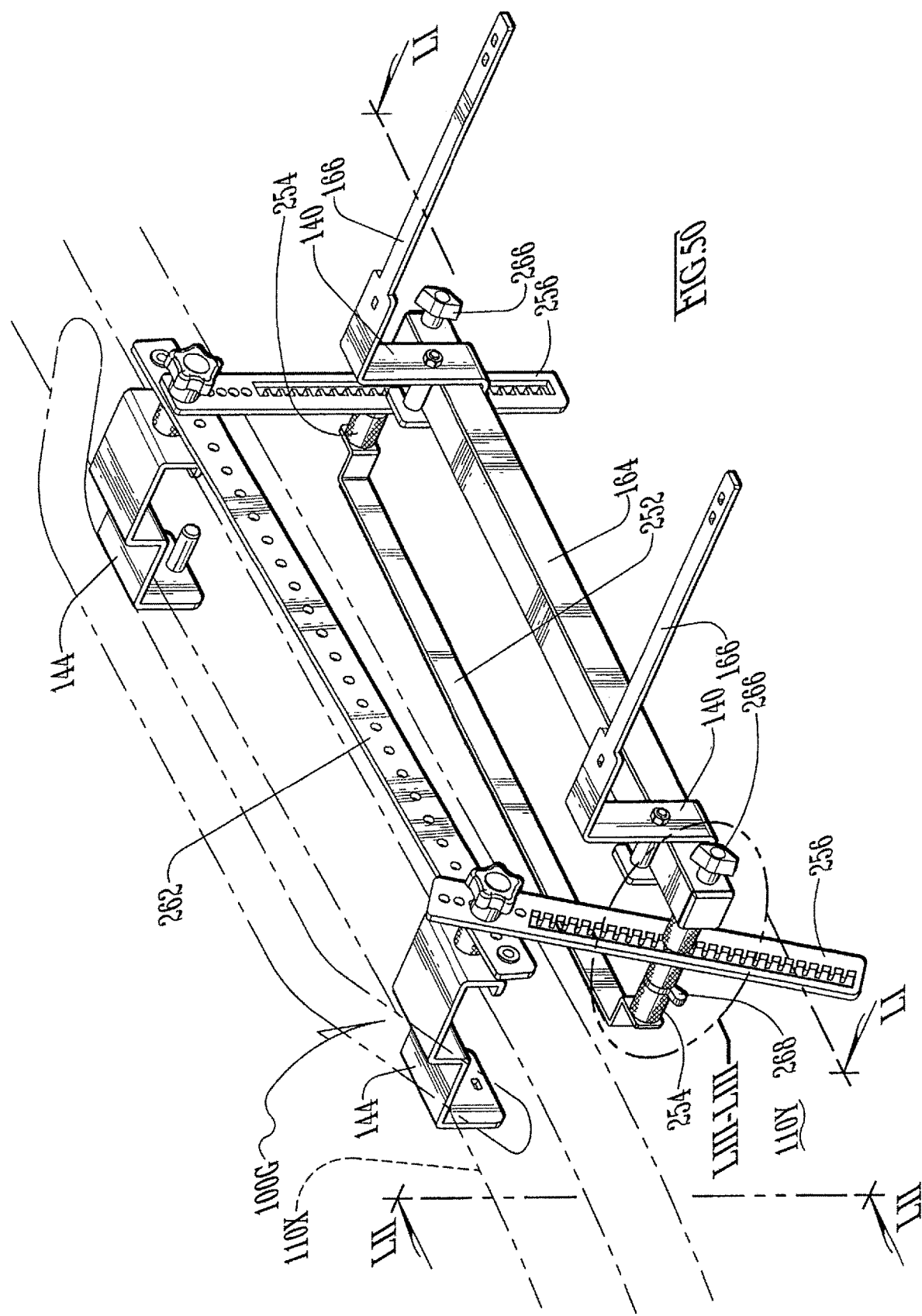
FIG. 50 is an enlarged-scale perspective view of FIG. 49 except with the grill and supporting structure removed from view.

FIG. 50 is an enlarged-scale perspective view of FIG. 49 except with the grill 102 and supporting structure 110X and 110Y removed from view. In FIG. 50, the inverted-hooks 144 hanging on the boat gunwale 110X can be independently moved inboard on the spreader bar 262 (ie., towards each other) relative to how actually shown.

Figure 51:
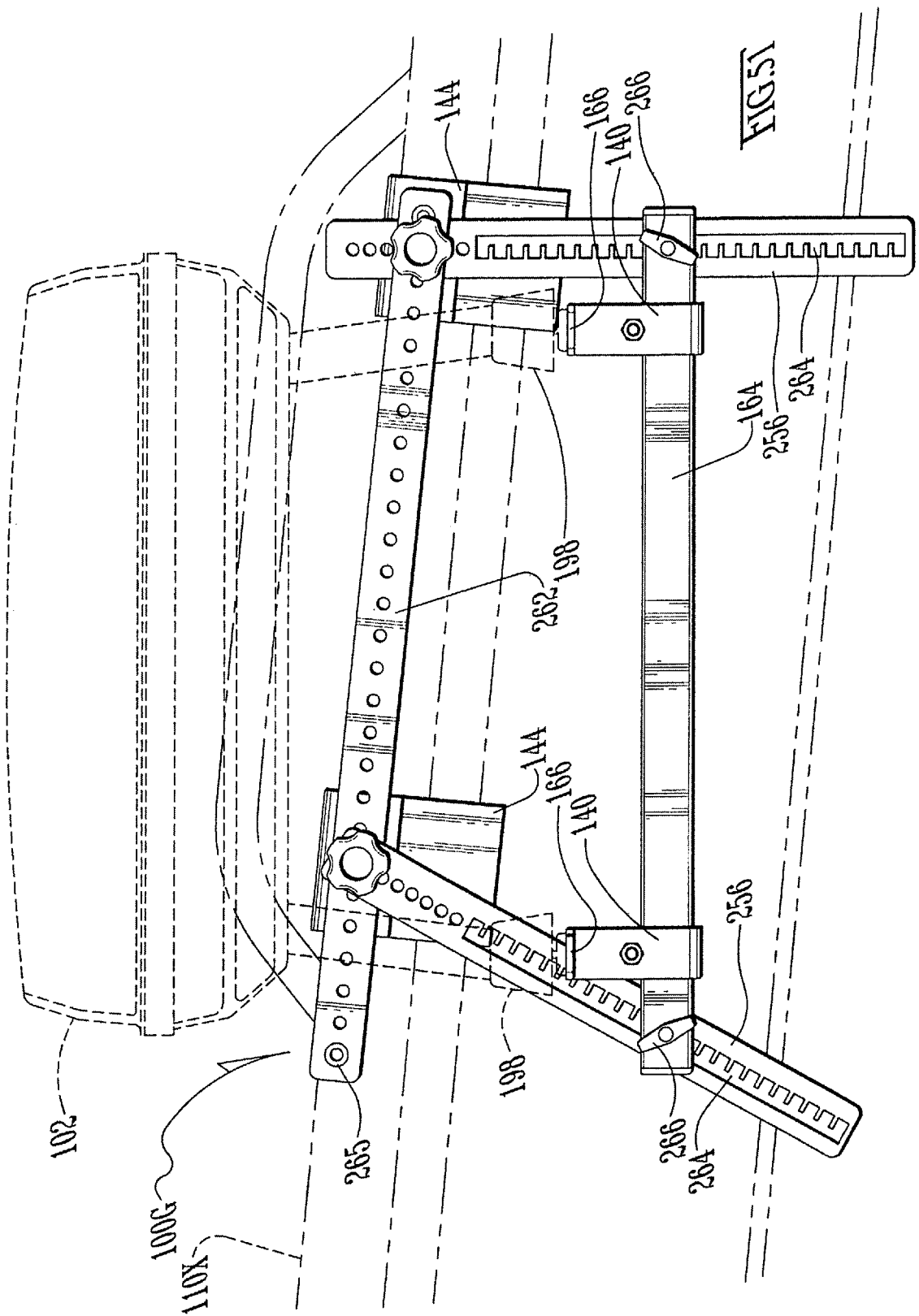
FIG. 51 is an elevational view taken in the direction of arrows LI-LI in FIG. 50.

FIG. 51 is an elevational view taken in the direction of arrows LI-LI in FIG. 50. In FIG. 51, if the left side-arm 256 were mounted straight up and down, then the left inverted-hook 144 would have been mounted more inboard on the spreader bar 262. The side arms 256 are not perforated with a series of holes, but a toothed vertically-elongate main aperture 264. This allows ladder-like vertical adjustment of the fasteners 266 without having completely withdraw such fasteners 266. The ends of the spreader bar 262 have press nuts 265 (better shown in FIG. 56 in lower right corner).

Figure 52:
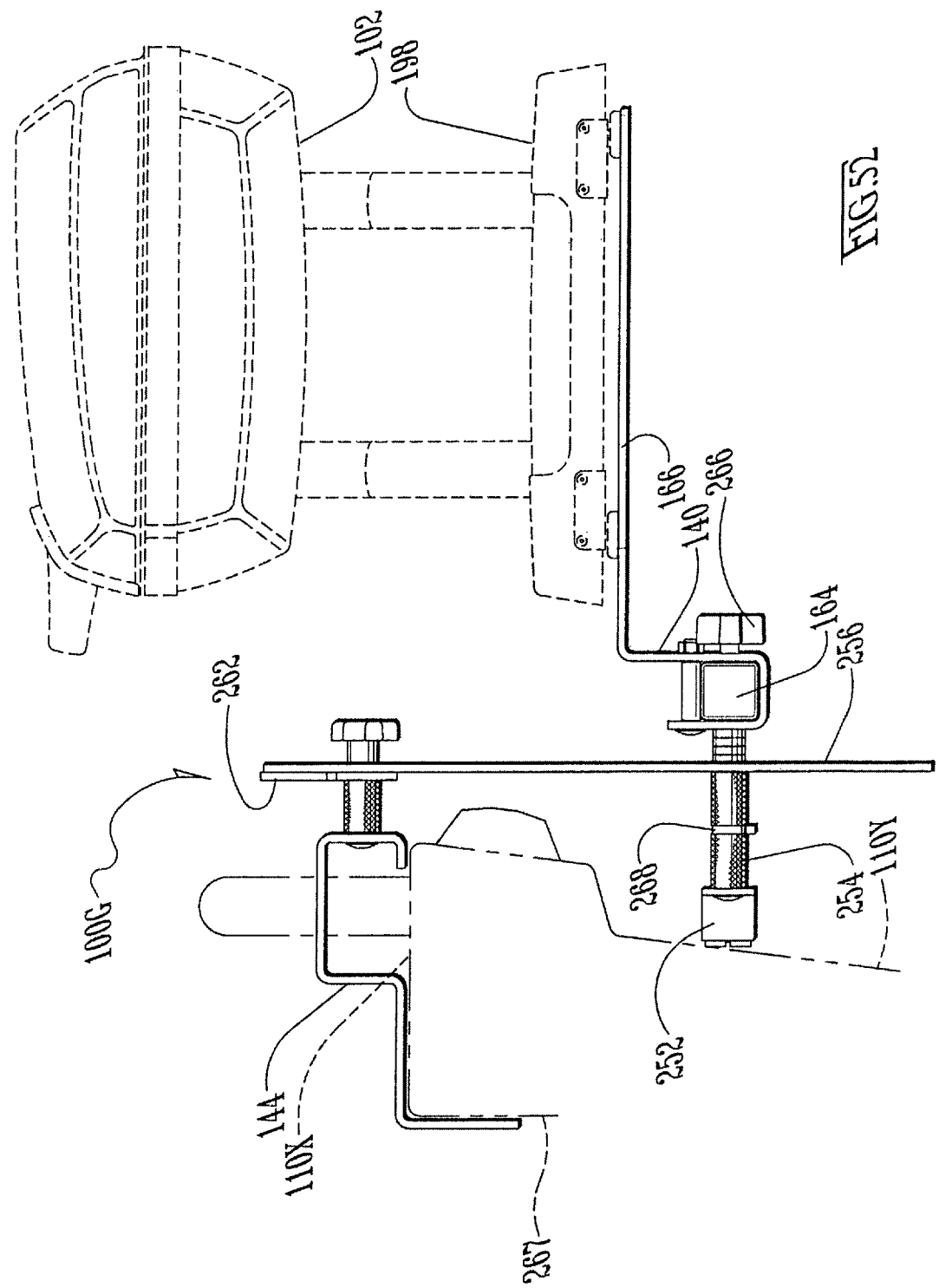
FIG. 52 is a side elevational view taken in the direction of arrows LII-LII in FIG. 50.

FIG. 52 is a side elevational view taken in the direction of arrows LII-LII in FIG. 50. In FIG. 52, the inverted hook 144 conforms to the boat gunwale 110X's upper inner surface margin 267.

Figure 53:
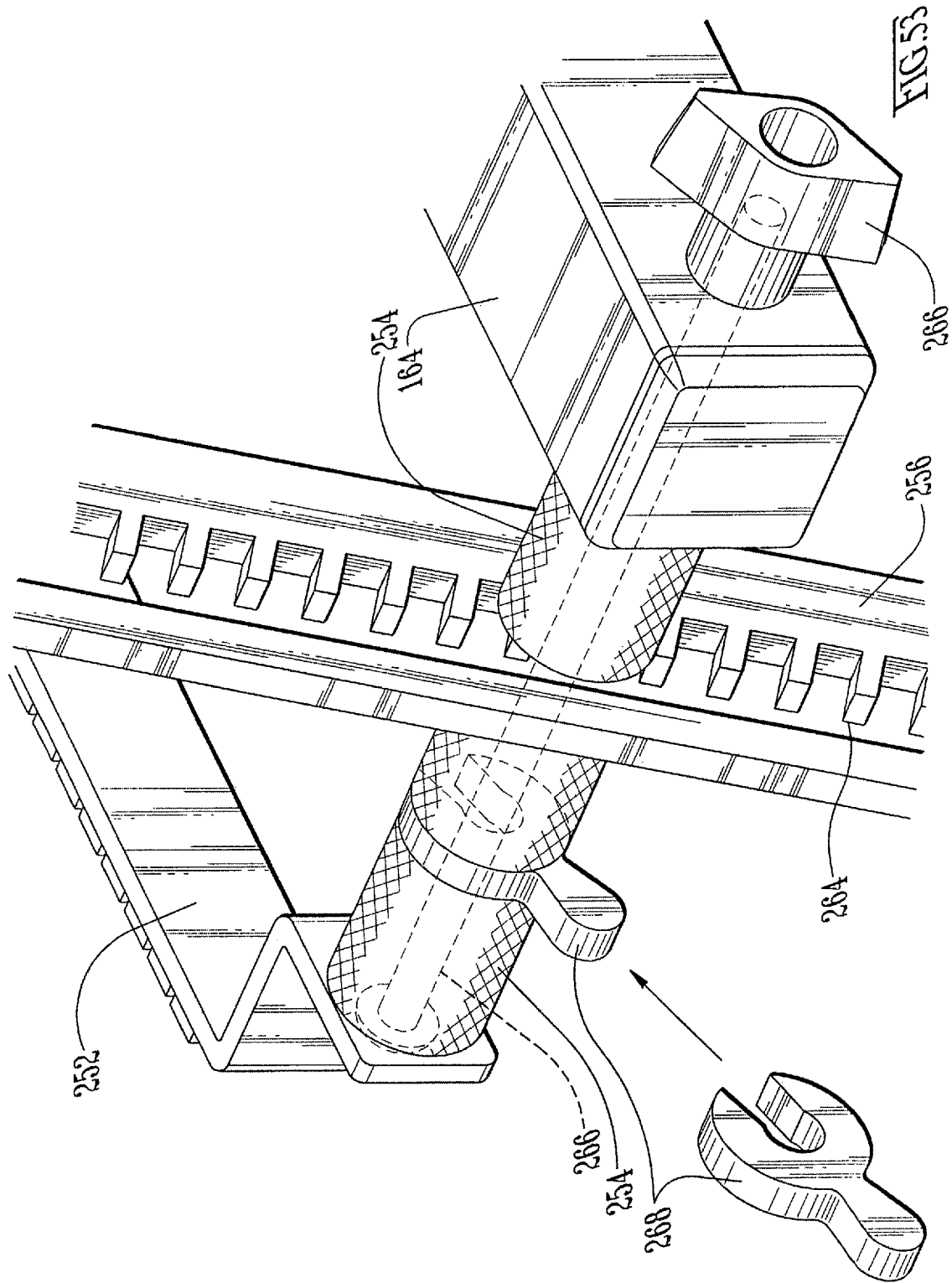
FIG. 53 is an enlarged-scale detail taken of detail LIII-LIII in FIG. 50, and adding a wrenching tool.

FIG. 53 is an enlarged-scale detail taken of detail LIII-LIII in FIG. 50. That is, FIG. 53 shows a tabbed spacer 268 design for shimming the counter-balance beam 164 away from the vertical side arms 256. FIG. 53 also better shows the toothed vertically-elongate main aperture 264 in the side arm 256.

Figure 54:
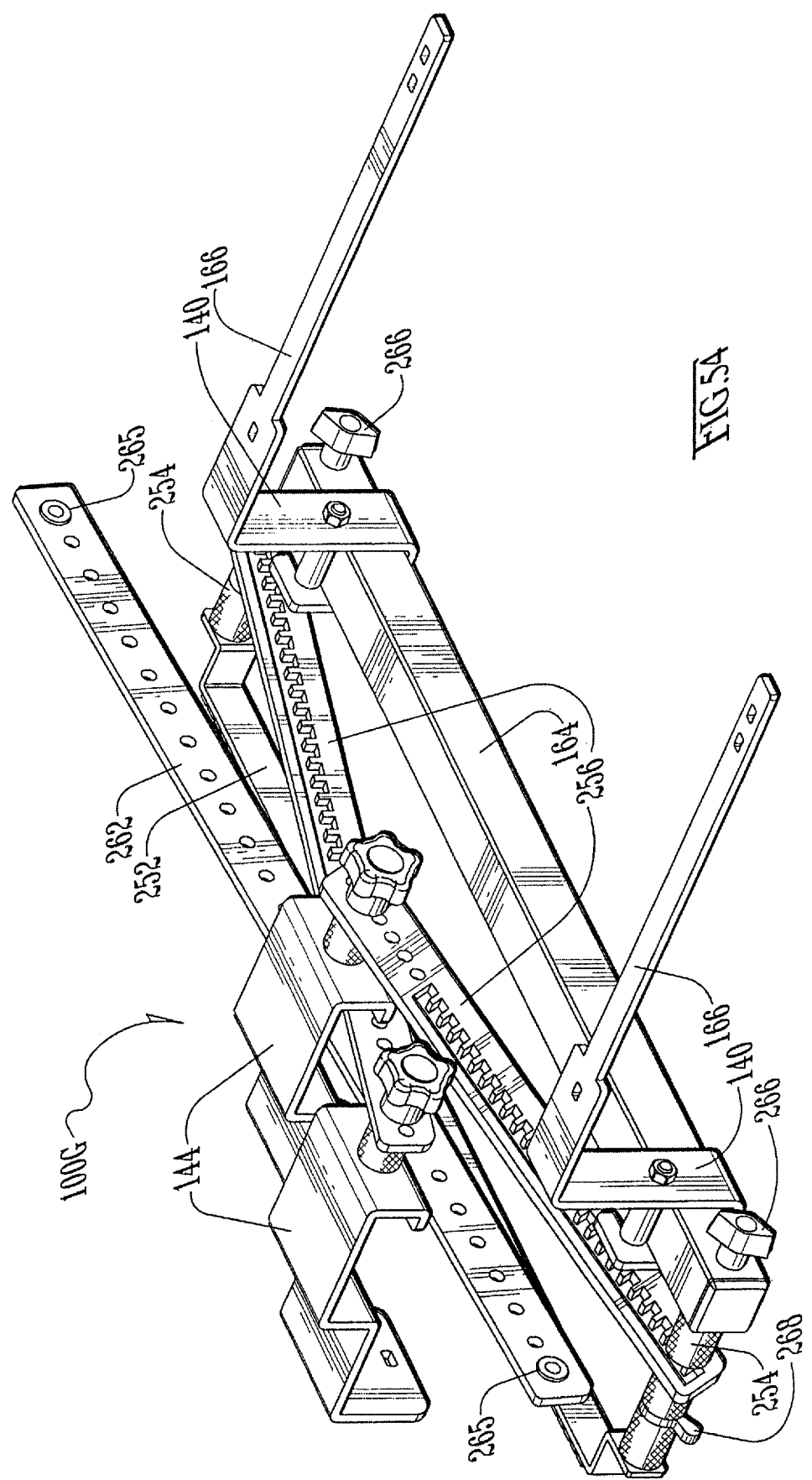
FIG. 54 is a perspective view comparable to FIG. 54 except showing a folded state.

FIG. 54 is a perspective view comparable to FIG. 54 except showing a folded (or collapsed) state.

Figure 55:
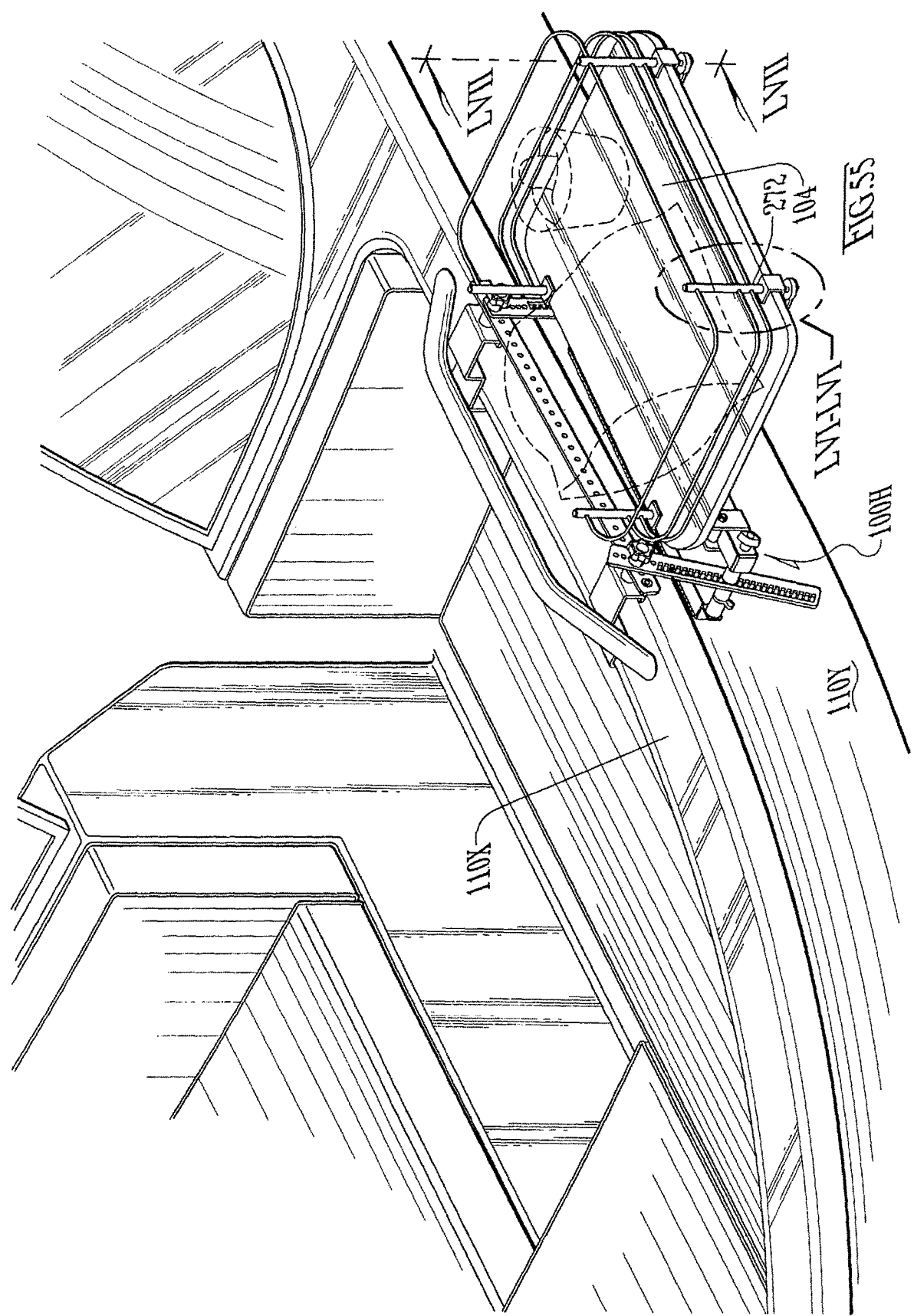
FIG. 55 is a perspective view comparable to FIG. 49 representing a foldable bracket assembly in accordance with the invention for supporting a grill or table (eg., a cooking apparatus or else a food service table support system) for attaching to a supporting structure except of still a further embodiment, wherein table and supporting structure hereof in this view are shown in solid lines.

FIG. 55 is a perspective view comparable to FIG. 49 representing a foldable bracket assembly 100H in accordance with the invention for supporting a grill 102 or table 104 (eg., a cooking apparatus/food service table support system 100H) for attaching to a supporting structure 110P/110Q, 110T/110U, 110V/110W, 110X/110Y and so on, except of still a further embodiment, wherein table 104 and supporting structure 110X and 110Y hereof in this view are shown in solid lines. FIG. 55 represents the beginning views of the table top 104 with guard-rail/railing system 272 (ie., to prevent wind from blowing articles off the table top 104). A representative bag of chips and cup are shown in dashed lines.

Figure 56:
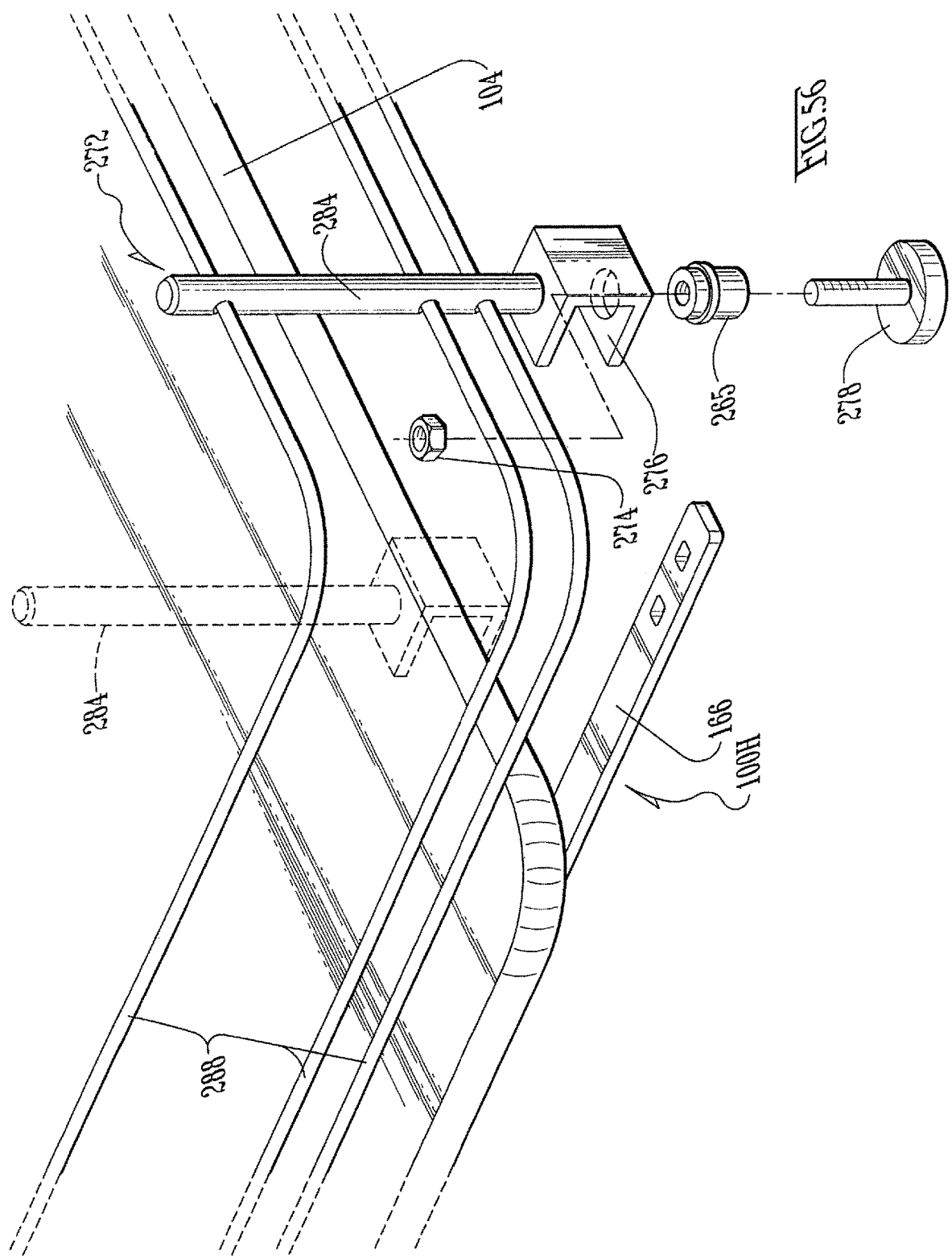
FIG. 56 is an enlarged-scale detail taken of detail LVI-LVI in FIG. 55, partly exploded.

FIG. 56 is an enlarged-scale detail taken of detail LVI-LVI in FIG. 55, partly exploded. FIG. 56 shows that the guard-rail/railing system 27 is removable, wherein a ny-lock nut 274 presses into the underside of the table 104. Again, the lower right corner shows a press nut 265 prior to press fitting into the aluminum channel bracket 276. The press nut 265's fastener is studded knob 278 and is likewise shown exploded.

FIG. 57 is an enlarged-scale perspective view taken along line LVII-LVII in FIG. 55. FIG. 57 shows the all fasteners and hardware in an assembled (ie., not exploded) state. Starting from the bottom, there is studded knob 278, press nut 265, lower flange of aluminum channel bracket 276, ny-lock nut 274, table panel 104, flat head machine screw 282 countersunk into upper flange of aluminum channel bracket 276, threading into corner post 284 of the guardrail/railing system 272 with three set screws 286 binding the individual rails 288 to the corner post 284. The corner post 284 is chamfered at the top.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A cooking apparatus/food service table support system for hanging off the side of a land or marine vehicle having a hook-over structure including a sill of a passenger door window opening of a motor vehicle or a gunwale of a boat hull, comprising:
   a spaced pair of inverted-J shaped vertical hangers which have columnar vertical runs terminating in upper hanger provisions which hook over the respective hook-over structure;
   a cross member (164) connected to and horizontally spacing the inverted-J shaped vertical hangers;
   a pair of spaced outboard projecting horizontal runs (166) extending out from bases affixed to either the cross member (164) or the inverted-J shaped vertical hangers;
   a framework affixed to either the cross member (164) or the inverted-J shaped vertical hangers supporting an array of spaced ball mounts (238);
   said ball mounts (238) comprising elongated externally threaded rods (238) and project horizontally inward in the direction of the side of the land or marine vehicle;
   a plurality of elastomeric balls (240), each embedded with an elongated internally-threaded tubular socket (242) for screwing onto the ball mounts (238) whereby the elastomeric balls (240) can abut the side of the land or marine vehicle without damage;
   wherein the elastomeric balls (240) are adjustable in or out for truing the level of the horizontal runs (166) by screwing the elastomeric balls (242) with the embedded elongated internally-threaded tubular socket (242) therein on the respective elongated externally-threaded rod ball mount (238).

2. The cooking apparatus/food service table support system of claim 1, wherein:
   the elastomeric balls (240) are disposed at the corners of an imaginary rectangle which is wider than tall.

3. The cooking apparatus/food service table support system of claim 2, further comprising:
   a fifth the elongated externally-threaded rod ball mounts (238), elastomeric ball (240) and embedded elongated internally-threaded tubular socket (242) disposed at the center of the imaginary rectangle.

4. The cooking apparatus/food service table support system of claim 2, wherein:
   the elongated externally-threaded rod ball mounts (238) comprise elongated threaded shanks of machine screws.

5. The cooking apparatus/food service table support system of claim 4, wherein:
   each of the elongated externally-threaded rod ball mounts (238) disposed at the corners of the imaginary rectangle has a chosen nominal length; and
   any elongated externally-threaded rod ball mount (238) of any given chosen nominal length can be replaced by other elongated externally-threaded rod ball mounts (238) of different, longer or shorter, chosen nominal lengths.

6. The cooking apparatus/food service table support system of claim 1, wherein:
   the elongated externally-threaded rod ball mounts (238) comprise elongated threaded shanks of machine screws.

7. The cooking apparatus food service table support system of claim 6, wherein:
   the elastomeric balls (240) have a nominal diameter D,
   the embedded elongated internally-threaded tubular sockets (242) have a characteristic nominal length, nominally also D; and
   the elongated externally-threaded rod ball mounts (238) have various chosen nominal lengths, all greater than D, which various chosen nominal lengths are chosen for individual customization fitting various classes of side surfaces (110U, 110W, 110Y).

8. The cooking apparatus/food service table support system of claim 7, wherein:
   D is nominally two inches (nominally 5.05 cm).

9. The cooking apparatus/food service table support system of claim 7, wherein:
   any elongated externally-threaded rod ball mount (238) of a given chosen nominal length greater than D is interchangeable with another elongated externally-threaded rod ball mount (238) of a different, longer or shorter, chosen nominal length, but also greater than D.

10. A cooking apparatus/food service table support system for hanging off the side of a railing or the side of a land or marine vehicle having a hook-over structure amenable to being hooked over by hanger provisions, comprising:
    a spaced pair of inverted-J shaped vertical hangers which have columnar vertical runs (256) terminating in upper hanger provisions which hook over the respective hook-over structure;
    a cross member (164) connected to and horizontally spacing the inverted-J shaped vertical hangers;
    a pair of spaced outboard projecting horizontal runs extending out from bases affixed to either the cross member (164) or the inverted-J shaped vertical hangers;
    a counter-balance beam (252) and a spaced pair of fasteners (266) connecting the columnar vertical runs (256) and counter-balance beam (252) together;
    wherein the counter-balance beam (252) is disposed inboard of the columnar vertical runs (256) and the cross member (164);
    wherein the railing has a relative inward side relative the columnar vertical runs (256) and cross member (164) and a relative away side; and
    wherein the counter-balance beam (252) is sized and disposed to clamp the relative away side of the railing with the cross member (164) on the inward side, or abut the relative inward side of the railing or side of the land or marine vehicle and thereby stabilize the pair of spaced outboard projecting horizontal runs in more or less a horizontal plane.

11. The cooking apparatus/food service table support system of claim 10, wherein:
the spaced pair of fasteners (266) connect the columnar vertical runs (256), the cross member (164) and counter-balance beam (252) together.

12. The cooking apparatus/food service table support system of claim 10, wherein:
the counter-balance beam (252) is sized and disposed to clamp the relative away side of the railing with the cross member (164) on the inward side.

13. The cooking apparatus/food service table support system of claim 10, wherein:
the counter-balance beam (252) is sized and disposed to abut the relative inward side of the railing or side of the land or marine vehicle.

14. The cooking apparatus/food service table support system of claim 13, wherein:
the spaced pair columnar vertical runs (256) are perforated; and
wherein the cross member (164) is connected by fasteners proximate opposite ends thereof to one and the other of the spaced pair columnar vertical runs (256) such that the cross member (164) can be trued toward level when the upper hanger provisions are at different elevations.

15. The cooking apparatus/food service table support system of claim 14, wherein:
the counter-balance beam (252) is connected by the fasteners (266) proximate opposite ends thereof to one and the other of the spaced pair columnar vertical runs (256) such that the counter-balance beam (252) can be trued toward level when the upper hanger provisions are at different elevations.

16. The cooking apparatus/food service table support system of claim 14, wherein:
the upper hanger provisions comprise a pair of hanger provisions (144) fastened to a perforated spreader bar (262) which is connected by fasteners proximate opposite ends thereof to one and the other of the spaced pair columnar vertical runs (256); and
wherein the hanger provisions (144) can be fastened in a plurality of alternative dispositions on the spreader bar (262) ranging from relative inward dispositions to relatively spread apart positions.

17. The cooking apparatus/food service table support system of claim 13, wherein:
the spaced pair columnar vertical runs (256) are each formed with a toothed vertically-elongate main aperture (264); and
wherein the cross member (164) is connected by fasteners (266) proximate opposite ends thereof to one and the other of the spaced pair columnar vertical runs (256) through the respective toothed vertically-elongate main aperture (264) such that the cross member (164) can be trued toward level when the upper hanger provisions are at different elevations by ladder-like adjustment of the fasteners (266) without have to completely undo the fasteners (266) whereby obviating completely undoing the fasteners (266) as with a series of perforated holes.

18. The cooking apparatus/food service table support system of claim 17, wherein:
the upper hanger provisions comprise a pair of hanger provisions (144) fastened to a perforated spreader bar (262) which is connected by fasteners proximate opposite ends thereof to one and the other of the spaced pair columnar vertical runs (256);
wherein the hanger provisions (144) can be fastened in a plurality of alternative dispositions on the spreader bar (262) ranging from relative inward dispositions to relatively spread apart positions; and
wherein the spaced pair columnar vertical runs (256) can be oriented in non-parallel alignments all the while that the can be cross member (164) trued toward level when the upper hanger provisions (144) are at different elevations.

19. The cooking apparatus/food service table support system of claim 13, wherein:
the counter-balance beam (252) is connected proximate the opposite ends thereof by the spaced pair of fasteners (266) to a respective one of the spaced pair of columnar vertical runs (256) with one more bushings (254) or shims (268) interposed on the fasteners (266), wherein the spacing at the opposite ends of the counter-balance beam (252) to the respective columnar vertical run differs at each end.

20. The cooking apparatus/food service table support system of claim 19, further comprising:
press fit shims (268) wherein the spacing at the opposite ends of the counter-balance beam (252) to the respective columnar vertical run can be adjusted by adding or withdrawing one or more press fit shims (268) onto the shanks of the fasteners (266) without having to completely undo the fasteners (266).

* * * * *